United States Patent
Salem et al.

(10) Patent No.: US 11,503,622 B2
(45) Date of Patent: *Nov. 15, 2022

(54) GRANT-FREE UPLINK TRANSMISSION IN UNLICENSED SPECTRUM

(71) Applicant: Huawei Technologies Co., Ltd., Shenzhen (CN)

(72) Inventors: Mohamed Adel Salem, Kanata (CA); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,481

(22) Filed: Sep. 24, 2020

(65) Prior Publication Data
US 2021/0014878 A1    Jan. 14, 2021

Related U.S. Application Data

(63) Continuation of application No. 16/518,641, filed on Jul. 22, 2019, now Pat. No. 10,791,569, which is a
(Continued)

(51) Int. Cl.
*H04W 72/12* (2009.01)
*H04W 74/00* (2009.01)
(Continued)

(52) U.S. Cl.
CPC ....... *H04W 72/1268* (2013.01); *H04W 16/14* (2013.01); *H04W 72/1289* (2013.01);
(Continued)

(58) Field of Classification Search
CPC ......... H04W 72/1268; H04W 72/1289; H04W 16/14; H04W 72/0446
See application file for complete search history.

(56) References Cited

U.S. PATENT DOCUMENTS

| 7,215,659 | B1 * | 5/2007 | Chen | H04W 16/14 370/338 |
| 2004/0013135 | A1 * | 1/2004 | Haddad | H04L 1/1664 370/493 |

(Continued)

FOREIGN PATENT DOCUMENTS

| CN | 105376862 A | 3/2016 |
| CN | 106060937 A | 10/2016 |

(Continued)

OTHER PUBLICATIONS

Asustek, "Discussion on Autonomous Uplink Access for LAA," 3GPP TSG RAN WG1 Meeting #89, R1-1709048, May 15-19, 2017, Hangzhou, China.

(Continued)

*Primary Examiner* — Afshawn M Towfighi
(74) *Attorney, Agent, or Firm* — Slater Matsil, LLP

(57) ABSTRACT

Methods and devices for grant-free uplink transmission in unlicensed spectrum are provided. A base station (BS) transmits grant-free resource configuration information to one or more electronic devices (EDs). The grant-free resource configuration information is used to configure the ED for GF uplink transmission in unlicensed spectrum. The GF resource configuration information includes GF ED group-specific resource configuration information indicating GF ED group-specific time-frequency (T/F) resources of the unlicensed spectrum for GF uplink transmission. The ED(s) transmit grant-free uplink transmissions over the unlicensed spectrum in accordance with the GF resource configuration information.

19 Claims, 29 Drawing Sheets

Related U.S. Application Data continuation of application No. 15/694,558, filed on Sep. 1, 2017, now Pat. No. 10,362,593.

(51) Int. Cl.
*H04W 16/14* (2009.01)
*H04W 74/08* (2009.01)
*H04W 72/04* (2009.01)

(52) U.S. Cl.
CPC ...... *H04W 74/006* (2013.01); *H04W 72/0446* (2013.01); *H04W 74/0808* (2013.01)

(56) References Cited

U.S. PATENT DOCUMENTS

| | | | | |
|---|---|---|---|---|
| 2006/0165113 | A1* | 7/2006 | Nonoyama | H04B 7/18506 370/442 |
| 2013/0107838 | A1* | 5/2013 | Li | H04W 72/0453 370/329 |
| 2017/0034845 | A1 | 2/2017 | Liu et al. | |
| 2018/0199381 | A1* | 7/2018 | Rong | H04W 74/08 |
| 2018/0227936 | A1* | 8/2018 | Yerramalli | H04L 1/0067 |
| 2019/0053222 | A1* | 2/2019 | Bhorkar | H04W 72/1284 |

FOREIGN PATENT DOCUMENTS

| | | |
|---|---|---|
| CN | 106507486 A | 3/2017 |
| CN | 106507497 A | 3/2017 |
| CN | 106788943 A | 5/2017 |

OTHER PUBLICATIONS

Ericsson, "Autonomous UL Access for LAA Unlicensed Cells," 3GPP TSG RAN WG1 Meeting #88bis, R1-1705950, Apr. 3-7, 2017, Spokane, USA.

Intel Corporation, "Considerations for Autonomous Uplink access on LAA SCells," 3GPP TSG RAN WG1 Meeting #88bis, R1-1704683, Apr. 3-7, 2017, Spokane, USA.

ZTE, "UL framework for LAA", 3GPP TSG RAN WG1 Meeting #83, R1-156994, Nov. 15-22, 2015, 6 Pages, Anaheim, USA.

Huawei et al., "Resource allocation and management for grant-free UL", 3GPP TSG RAN WG1 Meeting #86bis, R1-1608861, Oct. 10-14, 2016, 5 Pages, Lisbon, Portugal.

LG Electronics, "Multi-subframe scheduling in LAA", 3GPP TSG RAN WG1 meeting #84bis, R1-162466, Apr. 11-15, 2016, 5 pages, Busan, Korea.

Huawei et al, "Discussion on grant-free transmission", 3GPP TSG RAN WG1 Meeting #86, R1-166095, Aug. 22-26, 2016, 5 Pages, Gothenburg, Sweden.

ZTE et al., "Discussion on NR operation in unlicensed spectrum", 3GPP TSG RAN WG1 Meeting #88, R1-1701619, Feb. 13-17, 2017, 8 Pages, Athens, Greece.

Huawei, et al., "UL Grant-free transmission", 3GPP TSG RAN WG1 Meeting #88, R1-1701665, Feb. 13-17, 2017, 15 Pages, Athens, Greece.

NTT Docomo, "Offline discussions on UL data transmission without grant", 3GPP TSG RAN WG1 NR Ad Hoc Meeting, R1-1711969, Agenda Item: 5.1.3.3.3, Jun. 27-30, 2017, 7 Pages, Qingdao, China.

Qualcomm Incorporated, "Resource allocation for autonomous UL access", 3GPP TSG RAN WG1 #90, R1-1713026, Aug. 21-25, 2017, 4 Pages, Prague, Czech.

Nokia et al., "Autonomous uplink access", 3GPP TSG-RAN WG2 #99, R2-1708483, Aug. 21-25, 2017, 7 Pages, Berlin, Germany.

* cited by examiner

| Frame Structure | | Reservation Overhead | | |
|---|---|---|---|---|
| | | OS < STG < CCA | STG ≤ OS < CCA | STG < CCA ≤ OS |
| CCA Before Beginning of New Cycle | No DL Feedback — A | 0 | 0 | 0 |
| | DL Feedback — B | OS *Ceil(STG/OS) - STG | OS - STG | OS - STG |
| CCA After Beginning of New Cycle | No DL Feedback — C | OS *Ceil(CCA/OS) - CCA | OS *Ceil(CCA/OS) - CCA | OS - CCA |
| | DL Feedback — D | B+C | B+C | B+C |

FIG. 5

| | | | | UL MCOT (Frame Structure A) | |
|---|---|---|---|---|---|
| Priority Class | UL GF Burst [msec] | CCA [μsec] | UL GF Tx Starts at Symbol | UL GF Data Burst [Slots] | Min. GF Tx Cycle Period [Slots] |
| 15 kHz SCS NCP | | | | | |
| 0 | 1 | 25 | 0 | 2 | 3 |
| 1 | 2 | 25 | 0 | 4 | 5 |
| 2 | 3 | 25 | 0 | 6 | 7 |
| 3 | 6 | 25 | 0 | 12 | 13 |
| 4 | 10 | 25 | 0 | 20 | 21 |
| 30 kHz SCS NCP | | | | | |
| 0 | 1 | 25 | 0 | 4 | 5 |
| 1 | 2 | 25 | 0 | 8 | 9 |
| 2 | 3 | 25 | 0 | 12 | 13 |
| 3 | 6 | 25 | 0 | 24 | 26 |
| 4 | 10 | 25 | 0 | 40 | 42 |
| 30 kHz SCS ECP | | | | | |
| 0 | 1 | 25 | 0 | 4 | 5 |
| 1 | 2 | 25 | 0 | 8 | 9 |
| 2 | 3 | 25 | 0 | 12 | 13 |
| 3 | 6 | 25 | 0 | 24 | 26 |
| 4 | 10 | 25 | 0 | 40 | 42 |
| 60 kHz SCS NCP | | | | | |
| 0 | 1 | 25 | 0 | 8 | 9 |
| 1 | 2 | 25 | 0 | 16 | 17 |
| 2 | 3 | 25 | 0 | 24 | 26 |
| 3 | 6 | 25 | 0 | 48 | 51 |
| 4 | 10 | 25 | 0 | 80 | 84 |
| 60 kHz SCS ECP | | | | | |
| 0 | 1 | 25 | 0 | 8 | 9 |
| 1 | 2 | 25 | 0 | 16 | 17 |
| 2 | 3 | 25 | 0 | 32 | 34 |
| 3 | 6 | 25 | 0 | 64 | 68 |
| 4 | 10 | 25 | 0 | 80 | 84 |

FIG. 10A

| | Priority Class | UL GF Burst [msec] | CCA [µsec] | UL GF Tx Starts at Symbol | UL MCOT (Frame Structure B) | | | | | Min. GF Tx Cycle Period [Slots] |
|---|---|---|---|---|---|---|---|---|---|---|
| | | | | | UL GF Data Burst [Slots] | Partial Subframe Length [Symbols] | RSRV2 [µsec] | Short Time Gap [µsec] | DL SB-Group Fdbk [Symbols] | |
| SCS NCP 15 kHz | 0 | 1 | 25 | 0 | 2 | 6 | 55.429 | 16 | 2 | 4 |
| | 1 | 2 | 25 | 0 | 4 | 6 | 55.429 | 16 | 2 | 6 |
| | 2 | 3 | 25 | 0 | 6 | 6 | 55.429 | 16 | 2 | 8 |
| | 3 | 6 | 25 | 0 | 16 | 6 | 55.429 | 16 | 2 | 14 |
| SCS NCP 30 kHz | 0 | 1 | 25 | 0 | 4 | 6 | 19.714 | 16 | 2 | 6 |
| | 1 | 2 | 25 | 0 | 8 | 6 | 19.714 | 16 | 2 | 10 |
| | 2 | 3 | 25 | 0 | 12 | 6 | 19.714 | 16 | 2 | 14 |
| | 3 | 6 | 25 | 0 | 24 | 6 | 19.714 | 16 | 2 | 27 |
| SCS ECP 30 kHz | 0 | 1 | 25 | 0 | 4 | 5 | 25.667 | 16 | 2 | 6 |
| | 1 | 2 | 25 | 0 | 8 | 5 | 25.667 | 16 | 2 | 10 |
| | 2 | 3 | 25 | 0 | 12 | 5 | 25.667 | 16 | 2 | 14 |
| | 3 | 6 | 25 | 0 | 24 | 5 | 25.667 | 16 | 2 | 27 |
| SCS NCP 60 kHz | 0 | 1 | 25 | 0 | 8 | 6 | 1.857 | 16 | 2 | 10 |
| | 1 | 2 | 25 | 0 | 16 | 6 | 1.857 | 16 | 2 | 19 |
| | 2 | 3 | 25 | 0 | 24 | 6 | 1.857 | 16 | 2 | 27 |
| | 3 | 6 | 25 | 0 | 48 | 6 | 1.857 | 16 | 2 | 52 |
| SCS ECP 60 kHz | 0 | 1 | 25 | 0 | 8 | 5 | 4.833 | 16 | 2 | 10 |
| | 1 | 2 | 25 | 0 | 16 | 5 | 4.833 | 16 | 2 | 19 |
| | 2 | 3 | 25 | 0 | 24 | 5 | 4.833 | 16 | 2 | 27 |
| | 3 | 6 | 25 | 0 | 48 | 5 | 4.833 | 16 | 2 | 52 |

FIG. 10B

| | | | | UL MCOT (Frame Structure C) | | |
|---|---|---|---|---|---|---|---|
| Priority Class | UL GF Burst [msec] | CCA [μsec] | UL GF Tx Starts at Symbol | Partial Subframe Length [μsec] | Partial Subframe Length [Symbols] | UL GF Data Burst [Slots] | Min. GF Tx Cycle Period [Slots] |
| 0 | 1 | 25 | 1 | 46.429 | 6 | 2 | 4 |
| 1 | 2 | 25 | 1 | 46.429 | 6 | 4 | 6 |
| 2 | 3 | 25 | 1 | 46.429 | 6 | 6 | 8 |
| 3 | 6 | 25 | 1 | 46.429 | 6 | 12 | 14 |
| 0 | 1 | 25 | 1 | 10.714 | 6 | 4 | 6 |
| 1 | 2 | 25 | 1 | 10.714 | 6 | 8 | 10 |
| 2 | 3 | 25 | 1 | 10.714 | 6 | 12 | 14 |
| 3 | 6 | 25 | 1 | 10.714 | 6 | 24 | 27 |
| 0 | 1 | 25 | 1 | 16.667 | 5 | 4 | 6 |
| 1 | 2 | 25 | 1 | 16.667 | 5 | 8 | 10 |
| 2 | 3 | 25 | 1 | 16.667 | 5 | 12 | 14 |
| 3 | 6 | 25 | 1 | 16.667 | 5 | 24 | 27 |
| 0 | 1 | 25 | 2 | 10.714 | 5 | 8 | 10 |
| 1 | 2 | 25 | 2 | 10.714 | 5 | 16 | 18 |
| 2 | 3 | 25 | 2 | 10.714 | 5 | 24 | 27 |
| 3 | 6 | 25 | 2 | 10.714 | 5 | 48 | 52 |
| 0 | 1 | 25 | 2 | 16.667 | 4 | 8 | 10 |
| 1 | 2 | 25 | 2 | 16.667 | 4 | 16 | 18 |
| 2 | 3 | 25 | 2 | 16.667 | 4 | 24 | 27 |
| 3 | 6 | 25 | 2 | 16.667 | 4 | 48 | 52 |

Rows grouped by: 15 KHz SCS NCP, 30 KHz SCS NCP, 30 KHz SCS ECP, 60 KHz SCS NCP, 60 KHz SCS ECP.

FIG. 10C

| | Priority Class | UL GF Burst [msec] | CCA [µsec] | UL GF Tx Starts at Symbol | RSRV1 [µsec] | Partial Subframe Length [Symbols] | UL MCOT (Frame Structure D) ||| Short Time Gap [µsec] | DL SB-Group Fdbk [Symbols] | Min. GF Tx Cycle Period [Slots] |
|---|---|---|---|---|---|---|---|---|---|---|---|---|
| | | | | | | | UL GF Data Burst [Slots] | Partial Subframe Length [Symbols] | RSRV2 [µsec] | | | |
| 15 KHz SCS NCP | 0 | 1 | 25 | 1 | 46.429 | 6 | 2 | 6 | 55.429 | 16 | 2 | 5 |
| | 1 | 2 | 25 | 1 | 46.429 | 6 | 4 | 6 | 55.429 | 16 | 2 | 7 |
| | 2 | 3 | 25 | 1 | 46.429 | 6 | 6 | 6 | 55.429 | 16 | 2 | 9 |
| | 3 | 6 | 25 | 1 | 46.429 | 6 | 12 | 6 | 55.429 | 16 | 2 | 15 |
| 30 KHz SCS NCP | 0 | 1 | 25 | 1 | 10.714 | 6 | 4 | 6 | 19.714 | 16 | 2 | 7 |
| | 1 | 2 | 25 | 1 | 10.714 | 6 | 8 | 6 | 19.714 | 16 | 2 | 11 |
| | 2 | 3 | 25 | 1 | 10.714 | 6 | 12 | 6 | 19.714 | 16 | 2 | 15 |
| | 3 | 6 | 25 | 1 | 10.714 | 6 | 24 | 6 | 19.714 | 16 | 2 | 28 |
| 30 KHz SCS ECP | 0 | 1 | 25 | 1 | 16.667 | 5 | 4 | 5 | 25.667 | 16 | 2 | 7 |
| | 1 | 2 | 25 | 1 | 16.667 | 5 | 8 | 5 | 25.667 | 16 | 2 | 11 |
| | 2 | 3 | 25 | 1 | 16.667 | 5 | 12 | 5 | 25.667 | 16 | 2 | 15 |
| | 3 | 6 | 25 | 1 | 16.667 | 5 | 24 | 5 | 25.667 | 16 | 2 | 28 |
| 60 KHz SCS NCP | 0 | 1 | 25 | 2 | 10.714 | 5 | 8 | 6 | 1.857 | 16 | 2 | 11 |
| | 1 | 2 | 25 | 2 | 10.714 | 5 | 16 | 6 | 1.857 | 16 | 2 | 19 |
| | 2 | 3 | 25 | 2 | 10.714 | 5 | 24 | 6 | 1.857 | 16 | 2 | 28 |
| | 3 | 6 | 25 | 2 | 10.714 | 5 | 48 | 6 | 1.857 | 16 | 2 | 53 |
| 60 KHz SCS ECP | 0 | 1 | 25 | 2 | 16.667 | 4 | 8 | 5 | 4.833 | 16 | 2 | 11 |
| | 1 | 2 | 25 | 2 | 16.667 | 4 | 16 | 5 | 4.833 | 16 | 2 | 20 |
| | 2 | 3 | 25 | 2 | 16.667 | 4 | 24 | 5 | 4.833 | 16 | 2 | 28 |
| | 3 | 6 | 25 | 2 | 16.667 | 4 | 48 | 5 | 4.833 | 16 | 2 | 53 |

| | Priority Class | UL GF Burst [msec] | CCA [μsec] | UL GF Tx Starts at Symbol | UL MCOT (Frame Structure A) | |
|---|---|---|---|---|---|---|
| | | | | | UL GF Data Burst [Slots] | Min. GF Tx Cycle Period [Slots] |
| 240 KHz SCS NCP | 0 | 1 | 25 | 0 | 32 | 34 |
| | 1 | 2 | 25 | 0 | 64 | 68 |
| | 2 | 3 | 25 | 0 | 96 | 101 |
| | 3 | 6 | 25 | 0 | 192 | 202 |
| | 4 | 10 | 25 | 0 | 320 | 336 |
| 480 KHz SCS NCP | 0 | 1 | 25 | 0 | 64 | 68 |
| | 1 | 2 | 25 | 0 | 128 | 135 |
| | 2 | 3 | 25 | 0 | 192 | 202 |
| | 3 | 6 | 25 | 0 | 384 | 404 |
| | 4 | 10 | 25 | 0 | 640 | 672 |
| 480 KHz SCS ECP | 0 | 1 | 25 | 0 | 64 | 68 |
| | 1 | 2 | 25 | 0 | 128 | 135 |
| | 2 | 3 | 25 | 0 | 192 | 202 |
| | 3 | 6 | 25 | 0 | 384 | 404 |
| | 4 | 10 | 25 | 0 | 640 | 672 |
| 960 KHz SCS NCP | 0 | 1 | 25 | 0 | 128 | 135 |
| | 1 | 2 | 25 | 0 | 256 | 269 |
| | 2 | 3 | 25 | 0 | 384 | 404 |
| | 3 | 6 | 25 | 0 | 768 | 807 |
| | 4 | 10 | 25 | 0 | 1280 | 1344 |
| 960 KHz SCS ECP | 0 | 1 | 25 | 0 | 128 | 135 |
| | 1 | 2 | 25 | 0 | 256 | 269 |
| | 2 | 3 | 25 | 0 | 384 | 404 |
| | 3 | 6 | 25 | 0 | 768 | 807 |
| | 4 | 10 | 25 | 0 | 1280 | 1344 |

| | Priority Class | UL GF Burst [msec] | CCA [μsec] | UL GF Tx Starts at Symbol | UL MCOT (Frame Structure B) | | | | | | |
|---|---|---|---|---|---|---|---|---|---|---|---|
| | | | | | UL GF Data Burst [Slots] | Partial Subframe Length [Symbols] | RSRV2 [μsec] | Short Time Gap [μsec] | DL SB-Group Fdbk [Symbols] | Min. GF Tx Cycle Period [Slots] |
| SCS NCP 240 KHz | 0 | 1 | 25 | 0 | 32 | 3 | 1.857 | 16 | 2 | 35 |
| | 1 | 2 | 25 | 0 | 64 | 3 | 1.857 | 16 | 2 | 69 |
| | 2 | 3 | 25 | 0 | 96 | 3 | 1.857 | 16 | 2 | 103 |
| | 3 | 6 | 25 | 0 | 192 | 3 | 1.857 | 16 | 2 | 203 |
| SCS NCP 480 KHz | 0 | 1 | 25 | 0 | 64 | 6 | 1.857 | 16 | 2 | 70 |
| | 1 | 2 | 25 | 0 | 128 | 6 | 1.857 | 16 | 2 | 137 |
| | 2 | 3 | 25 | 0 | 192 | 6 | 1.857 | 16 | 2 | 204 |
| | 3 | 6 | 25 | 0 | 384 | 6 | 1.857 | 16 | 2 | 406 |
| SCS ECP 480 KHz | 0 | 1 | 25 | 0 | 64 | 5 | 2.229 | 16 | 2 | 70 |
| | 1 | 2 | 25 | 0 | 128 | 5 | 2.229 | 16 | 2 | 137 |
| | 2 | 3 | 25 | 0 | 192 | 5 | 2.229 | 16 | 2 | 205 |
| | 3 | 6 | 25 | 0 | 384 | 5 | 2.229 | 16 | 2 | 406 |
| SCS NCP 960 KHz | 0 | 1 | 25 | 0 | 128 | 6 | 0.741 | 16 | 2 | 138 |
| | 1 | 2 | 25 | 0 | 256 | 6 | 0.741 | 16 | 2 | 273 |
| | 2 | 3 | 25 | 0 | 384 | 6 | 0.741 | 16 | 2 | 407 |
| | 3 | 6 | 25 | 0 | 768 | 6 | 0.741 | 16 | 2 | 810 |
| SCS ECP 960 KHz | 0 | 1 | 25 | 0 | 128 | 5 | 0.927 | 16 | 2 | 138 |
| | 1 | 2 | 25 | 0 | 256 | 5 | 0.927 | 16 | 2 | 273 |
| | 2 | 3 | 25 | 0 | 384 | 5 | 0.927 | 16 | 2 | 407 |
| | 3 | 6 | 25 | 0 | 768 | 5 | 0.927 | 16 | 2 | 810 |

FIG. 11B

| | Priority Class | UL GF Burst [msec] | CCA [μsec] | UL GF Tx Starts at Symbol | UL MCOT (Frame Structure C) | | | Min. GF Tx Cycle Period [Slots] |
|---|---|---|---|---|---|---|---|---|
| | | | | | Partial Subframe Length [μsec] | Partial Subframe Length [Symbols] | UL GF Data Burst [Slots] | |
| 240 KHz SCS NCP | 0 | 1 | 25 | 6 | 1.786 | 1 | 32 | 34 |
| | 1 | 2 | 25 | 6 | 1.786 | 1 | 64 | 68 |
| | 2 | 3 | 25 | 6 | 1.786 | 1 | 96 | 102 |
| | 3 | 6 | 25 | 6 | 1.786 | 1 | 192 | 202 |
| 480 KHz SCS NCP | 0 | 1 | 25 | 12 | 1.786 | 2 | 64 | 68 |
| | 1 | 2 | 25 | 12 | 1.786 | 2 | 128 | 135 |
| | 2 | 3 | 25 | 12 | 1.786 | 2 | 192 | 203 |
| | 3 | 6 | 25 | 12 | 1.786 | 2 | 384 | 404 |
| 480 KHz SCS ECP | 0 | 1 | 25 | 10 | 1.042 | 2 | 64 | 68 |
| | 1 | 2 | 25 | 10 | 1.042 | 2 | 128 | 135 |
| | 2 | 3 | 25 | 10 | 1.042 | 2 | 192 | 203 |
| | 3 | 6 | 25 | 10 | 1.042 | 2 | 384 | 404 |
| 960 KHz SCS NCP | 0 | 1 | 25 | 23 | 0.670 | 5 | 128 | 136 |
| | 1 | 2 | 25 | 23 | 0.670 | 5 | 256 | 270 |
| | 2 | 3 | 25 | 23 | 0.670 | 5 | 384 | 405 |
| | 3 | 6 | 25 | 23 | 0.670 | 5 | 768 | 808 |
| 960 KHz SCS ECP | 0 | 1 | 25 | 20 | 1.042 | 4 | 128 | 136 |
| | 1 | 2 | 25 | 20 | 1.042 | 4 | 256 | 270 |
| | 2 | 3 | 25 | 20 | 1.042 | 4 | 384 | 405 |
| | 3 | 6 | 25 | 20 | 1.042 | 4 | 768 | 808 |

FIG. 11C

| | Priority Class | UL GF Burst [msec] | CCA [µsec] | UL GF Tx Starts at Symbol | RSRV1 [µsec] | Partial Subframe Length [Symbols] | UL GF Data Burst [Slots] | Partial Subframe Length [Symbols] | RSRV2 [µsec] | Short Time Gap [µsec] | DL SB-Group Fdbk [Symbols] | Min. GF Tx Cycle Period [Slots] |
|---|---|---|---|---|---|---|---|---|---|---|---|---|
| | | | | | | | UL MCOT (Frame Structure D) | | | | | |
| SCS NCP 240 KHz | 0 | 1 | 25 | 6 | 1.786 | 1 | 32 | 3 | 1.857 | 16 | 2 | 36 |
| | 1 | 2 | 25 | 6 | 1.786 | 1 | 64 | 3 | 1.857 | 16 | 2 | 69 |
| | 2 | 3 | 25 | 6 | 1.786 | 1 | 96 | 3 | 1.857 | 16 | 2 | 103 |
| | 3 | 6 | 25 | 6 | 1.786 | 1 | 192 | 3 | 1.857 | 16 | 2 | 204 |
| SCS NCP 480 KHz | 0 | 1 | 25 | 12 | 1.786 | 2 | 64 | 6 | 1.857 | 16 | 2 | 71 |
| | 1 | 2 | 25 | 12 | 1.786 | 2 | 128 | 6 | 1.857 | 16 | 2 | 138 |
| | 2 | 3 | 25 | 12 | 1.786 | 2 | 192 | 6 | 1.857 | 16 | 2 | 205 |
| | 3 | 6 | 25 | 12 | 1.786 | 2 | 384 | 6 | 1.857 | 16 | 2 | 407 |
| SCS ECP 480 KHz | 0 | 1 | 25 | 10 | 1.042 | 2 | 64 | 5 | 2.229 | 16 | 2 | 71 |
| | 1 | 2 | 25 | 10 | 1.042 | 2 | 128 | 5 | 2.229 | 16 | 2 | 138 |
| | 2 | 3 | 25 | 10 | 1.042 | 2 | 192 | 5 | 2.229 | 16 | 2 | 205 |
| | 3 | 6 | 25 | 10 | 1.042 | 2 | 384 | 5 | 2.229 | 16 | 2 | 407 |
| SCS NCP 960 KHz | 0 | 1 | 25 | 23 | 0.670 | 5 | 128 | 6 | 0.741 | 16 | 2 | 139 |
| | 1 | 2 | 25 | 23 | 0.670 | 5 | 256 | 6 | 0.741 | 16 | 2 | 274 |
| | 2 | 3 | 25 | 23 | 0.670 | 5 | 384 | 6 | 0.741 | 16 | 2 | 408 |
| | 3 | 6 | 25 | 23 | 0.670 | 5 | 768 | 6 | 0.741 | 16 | 2 | 811 |
| SCS ECP 960 KHz | 0 | 1 | 25 | 20 | 1.042 | 4 | 128 | 5 | 0.927 | 16 | 2 | 139 |
| | 1 | 2 | 25 | 20 | 1.042 | 4 | 256 | 5 | 0.927 | 16 | 2 | 274 |
| | 2 | 3 | 25 | 20 | 1.042 | 4 | 384 | 5 | 0.927 | 16 | 2 | 408 |
| | 3 | 6 | 25 | 20 | 1.042 | 4 | 768 | 5 | 0.927 | 16 | 2 | 811 |

FIG. 11D

GRANT-FREE UPLINK TRANSMISSION IN UNLICENSED SPECTRUM

CROSS-REFERENCE TO RELATED APPLICATIONS

This application is a continuation of U.S. patent application Ser. No. 16/518,641, filed on Jul. 22, 2019 and entitled "Grant-Free Uplink Transmission in Unlicensed Spectrum," which is a continuation of U.S. patent application Ser. No. 15/694,558, filed on Sep. 1, 2017 (Now U.S. Pat. No. 10,362,593 issued on Jul. 23, 2019) and entitled "Grant-Free Uplink Transmission in Unlicensed Spectrum," which applications are hereby incorporated herein by reference as if reproduced in its entirety.

TECHNICAL FIELD

The present disclosure relates generally to wireless communications, and in particular embodiments, to grant-free uplink transmissions in unlicensed spectrum.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to a base station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and during a particular time slot. The frequency and time slot used is an example of a physical communication resource.

In an LTE grant-based transmission, the required transmission control parameters are typically communicated via a Physical Uplink Control Channel (PUCCH) and/or Physical Downlink Control Channel (PDCCH). The base station is aware of the identity of the ED sending the uplink transmission using the granted uplink resources, because the base station specifically granted those uplink resources to that ED. In a grant-free transmission, different EDs may send uplink transmissions using uplink resources shared by the EDs, without specifically requesting use of the resources and without specifically being granted the resources by the base station. One advantage of grant-free transmission is low latency resulting from not having to request and receive a grant for an allocated time slot from the base station. Furthermore, in a grant-free transmission, the scheduling overhead may be reduced. However, the base station does not have information which ED, if any, is sending a grant-free uplink transmission at a particular moment of time, which may require blind detection of grant-free transmissions received at the base station. In other words, the base station is required to determine which ED is transmitting. Therefore, the BS can use the combination of uplink reference symbols (RS) and occupied time-frequency resources to identify a grant-free ED as well as the transport block being received from that grant-free ED.

Some modes of communication may enable communications with an ED over an unlicensed spectrum band, or over different spectrum bands (e.g., an unlicensed spectrum band and/or a licensed spectrum band) of a wireless network. Given the scarcity and expense of bandwidth in the licensed spectrum, exploiting the vast and free-of-charge unlicensed spectrum to offload at least some communication traffic is an approach that has garnered interest from mobile broadband (MBB) network operators. For example, in some cases uplink transmissions may be transmitted over an unlicensed spectrum band. Accordingly, efficient and fair mechanisms for grant-free uplink transmissions in the unlicensed spectrum may be desirable.

SUMMARY

According to a first aspect, the present disclosure provides a method for an ED in a wireless communication network. The method includes an ED receiving grant-free (GF) resource configuration information from a base station. The GF resource configuration information is used to configure the ED for GF uplink transmission in unlicensed spectrum. The GF resource configuration information includes GF ED group-specific resource configuration information indicating GF ED group-specific time-frequency (T/F) resources of the unlicensed spectrum for GF uplink transmission. The ED transmits grant-free uplink transmissions over the unlicensed spectrum in accordance with the GF resource configuration information.

In some embodiments of the first aspect, the GF resource configuration information further comprises a GF ED group-specific radio network temporary identifier (GFG-RNTI) for the ED to receive GFG common DCI messages from the base station.

In some embodiments of the first aspect, the method further includes performing a clear channel assessment (CCA) in the unlicensed spectrum in accordance with the GF resource configuration information, wherein transmitting a GF uplink transmission over the unlicensed spectrum comprises starting the GF uplink transmission in accordance with the GF resource configuration information if the CCA is successful.

In some embodiments of the first aspect, the GF uplink transmission of one ED or multiple ED of the group over the unlicensed spectrum is aligned to: a common GF transmission cycle; a downlink (DL) group common time alignment signal; a DL burst containing a Control Resource Set (CORESET) that includes ED-specific and/or group common DCI triggers; or a combination of two or more of the above.

In some embodiments of the first aspect, the GF resource configuration information is received at least partially via at least one of: a group-specific configuration message comprising the GF ED group-specific resource configuration information to configure the EDs in the group for GF uplink transmission in the unlicensed spectrum; and an ED-specific configuration message.

In some embodiments of the first aspect, the GF resource configuration information is received entirely via radio resource control (RRC) signaling.

In some embodiments of the first aspect, the GF resource configuration information is received in part via RRC signaling and in part via downlink control information (DCI) that is part of an ED-specific or a group common trigger.

In some embodiments of the first aspect, the GF resource configuration information further includes information indicating a reference start time and a GF transmission cycle period. In such embodiments, the ED may align the ED's GF uplink transmission in the T/F resources to the common GF transmission cycle defined by the common GF transmission cycle reference start time and the common GF transmission cycle period.

In some embodiments of the first aspect, the GF resource configuration information further includes information indicating a plurality of potential GF occasions within a GF transmission cycle at which the ED could potentially start a GF uplink transmission.

In some embodiments of the first aspect, the reference start time is an absolute start time expressed as the index of an alignment time unit (ATU).

In some embodiments of the first aspect, the reference start time is a time offset relative to any one of: radio resource control (RRC) signaling carrying at least part of the GF resource configuration information; and downlink control information (DCI) carrying at least part of the GF resource configuration information.

In some embodiments of the first aspect, the ED determines the reference start time based on the GF transmission cycle period and a current timer value of any one of: system frame number; subframe number; and slot number.

In some embodiments of the first aspect, the GF ED group-specific resource configuration information further includes an indication of one or more occupational bandwidth-compliant (OCB-compliant) frequency hopping patterns to be used by one or more EDs in the group for grant-free uplink transmission within the T/F resources. For example, one or more of the OCB-compliant frequency hopping patterns may include a sequence of frequency interlaces within the T/F resources, a sequence of unlicensed channels to occupy within the T/F resources, or some combination of the two.

In some embodiments of the first aspect, the GF ED group-specific resource configuration information further comprises an indication of an ED-specific field format for a grant-free group (GFG) common downlink control information (DCI) message.

In some embodiments of the first aspect, the GF ED group-specific resource configuration information further includes information indicating a grant-free frame structure to be used by the group of EDs for grant-free uplink transmission in the unlicensed spectrum. The ED may then transmit a grant-free uplink transmission over the unlicensed spectrum in accordance with the grant-free frame structure indicated in the GF ED group-specific resource configuration information.

In some embodiments of the first aspect, the ED also receives, over the unlicensed spectrum resources, a multi-cast grant-free group (GFG) common time-alignment signal for the group of EDs, and times the ED's group-aligned GF transmission in the unlicensed spectrum resources based on the GFG common time-alignment signal.

In some embodiments of the first aspect, the ED receives the multi-cast GFG common time-alignment signal by searching for the multi-cast GFG common time-alignment signal in a common time-frequency search space according to a target GF cycle periodicity.

In some embodiments of the first aspect, the method further includes the ED receiving a multi-cast group-specific grant-free group (GFG) feedback message on T/F resources of the unlicensed spectrum.

In some embodiments of the first aspect, the ED receives the multi-cast GFG feedback message after a last grant-free uplink burst from one of the EDs in the group ends and within a maximum channel occupancy time (MCOT).

In some embodiments of the first aspect, the ED receives the multi-cast GFG feedback message as part of a GFG common time-alignment message, the GFG feedback message comprising, for each of one or more EDs in the group, an information field that includes Ack/Nack feedback related to one or more transport blocks transmitted by the ED within one or more most recent grant-free uplink bursts preceding the GFG Ack/Nack feedback message.

In some embodiments of the first aspect, the method further includes the ED receiving, over the unlicensed spectrum resources, a downlink burst from the base station containing a control resource set (CORESET) that includes an ED-specific downlink control information (DCI) trigger for the ED. The ED may then time the ED's group-aligned GF transmission in the unlicensed spectrum resources based on the downlink burst.

In some embodiments of the first aspect, at least part of the GF resource configuration information may be received via the ED-specific downlink DCI trigger for the ED.

According to another broad aspect, the present disclosure provides an electronic device that includes a memory storage and one or more processors in communication with the memory storage. The memory storage includes instructions that the one or more processors execute to configure the ED for GF uplink transmission in unlicensed spectrum. The configuration is done in accordance with GF resource configuration information received from a base station, which includes GF ED group-specific resource configuration information indicating GF ED group-specific time-frequency (T/F) resources of the unlicensed spectrum for GF uplink transmission. The one or more processors also execute the instructions to transmit a grant-free uplink transmission over the unlicensed spectrum in accordance with the GF resource configuration information.

In some embodiments of the second aspect, the one or more processors execute the instructions to perform a clear channel assessment (CCA) in the unlicensed spectrum in accordance with the GF resource configuration information. The ED may then start the GF uplink transmission in accordance with the GF resource configuration information if the CCA is successful.

In some embodiments of the second aspect, the one or more processors execute the instructions to start the GF uplink transmission in alignment with the GF uplink transmission of one or more EDs in the GF group.

In some embodiments of the second aspect, the GF uplink transmission of one ED or multiple ED of the group over the unlicensed spectrum is aligned to: a common GF transmission cycle; a downlink (DL) group common time alignment signal; a DL burst containing a Control Resource Set (CORESET) that includes ED-specific and/or group common DCI triggers; or a combination of two or more of the above.

In some embodiments of the second aspect, the GF resource configuration information is received either: entirely via radio resource control (RRC) signaling, or in part via RRC signaling and in part via downlink control information (DCI) that is part of an ED-specific or a group common trigger.

In some embodiments of the second aspect, the GF resource configuration information further comprises information indicating a reference start time and a GF transmission cycle period. In such embodiments, the one or more processors execute the instructions to align the ED's GF uplink transmission in the T/F resources to the common GF transmission cycle defined by the common GF transmission cycle reference start time and the common GF transmission cycle period.

In some embodiments of the second aspect, the GF resource configuration information further comprises information indicating a plurality of potential GF occasions within a GF transmission cycle at which the ED could potentially start a GF uplink transmission.

In some embodiments of the second aspect, the GF ED group-specific resource configuration information further includes an indication of one or more occupational bandwidth-compliant (OCB-compliant) frequency hopping patterns to be used by one or more EDs in the group for grant-free uplink transmission within the T/F resources.

In some embodiments of the second aspect, one or more of the OCB-compliant frequency hopping patterns may include a sequence of frequency interlaces within the T/F resources, a sequence of unlicensed channels to occupy within the T/F resources, or some combination of the two.

In some embodiments of the second aspect, the one or more processors execute the instructions to receive, over the unlicensed spectrum resources, a multi-cast grant-free group (GFG) common time-alignment signal for the group of EDs, and time the ED's group-aligned GF transmission in the unlicensed spectrum resources based on the GFG common time-alignment signal.

In some embodiments of the second aspect, the one or more processors execute the instructions to search for the multi-cast GFG common time-alignment signal in a common time-frequency search space according to a target GF cycle periodicity.

In some embodiments of the second aspect, the one or more processors execute the instructions to receive a multicast group-specific grant-free group (GFG) feedback message on T/F resources of the unlicensed spectrum either i) after a last grant-free uplink burst from one of the EDs in the group ends and within a maximum channel occupancy time (MCOT), or ii) as part of a GFG common time-alignment message, the GFG feedback message comprising, for each of one or more EDs in the group, an information field that includes Ack/Nack feedback related to one or more transport blocks transmitted by the ED within one or more most recent grant-free uplink bursts preceding the GFG Ack/Nack feedback message.

In some embodiments of the second aspect, the one or more processors execute the instructions to receive, over the unlicensed spectrum resources, a downlink burst from the base station containing a control resource set (CORESET) that includes an ED-specific downlink control information (DCI) trigger for the ED, and time the ED's group-aligned GF transmission in the unlicensed spectrum resources based on the downlink burst.

BRIEF DESCRIPTION OF THE DRAWINGS

Embodiments of the present disclosure will be described in greater detail with reference to the accompanying drawings.

FIG. 5 is a table showing examples of reservation overhead associated with the four frame structures shown in FIGS. 4A and 4B for various relative lengths of OFDM symbol durations, short interframe space (short time gap) durations, and clear channel assessment (CCA) durations.

FIGS. 10A, 10B, 10C and 10D are four tables depicting priority classes and associated channel access parameters for different sub-band sub-carrier spacings and cyclic prefix lengths in a 5 GHz unlicensed spectrum band in accordance with an embodiment of the present disclosure.

FIGS. 11A, 11B, 11C and 11D are four tables depicting priority classes and associated channel access parameters for different sub-band sub-carrier spacings and cyclic prefix lengths in a 60 GHz unlicensed spectrum band in accordance with an embodiment of the present disclosure.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of this disclosure provide a grant-free transmission mode for uplink transmissions in unlicensed spectrum in a wireless network. In this disclosure, grant-free transmissions refer to data transmissions that are performed without communicating grant-based signaling.

Turning now to the figures, some specific example embodiments will be described.

Communication System

Figure 1:
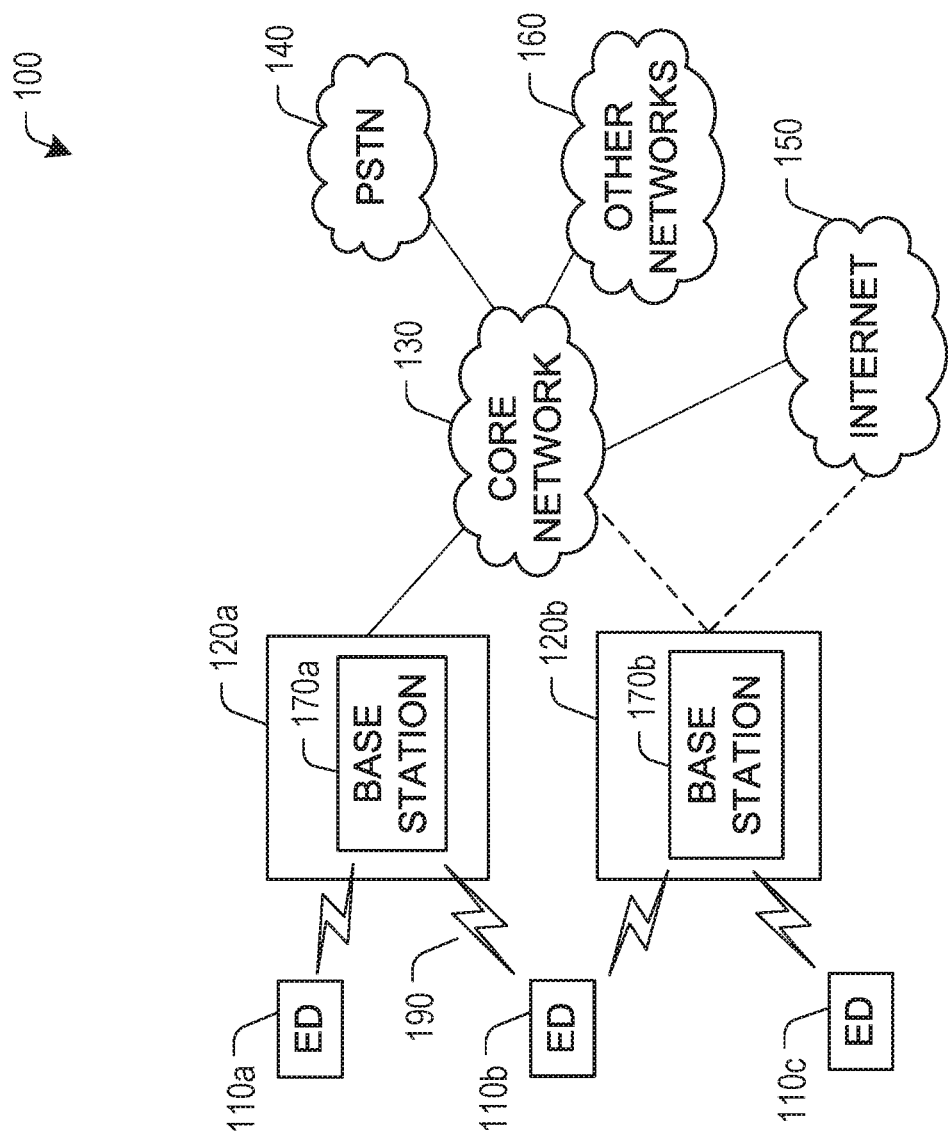
FIG. 1 is a schematic diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Grant-Free Transmissions

The base stations 170 are configured to support wireless communication with EDs no, which may each send grant-free uplink transmissions. Uplink transmissions from the EDs no are performed on a set of time-frequency resources. A grant-free uplink transmission is an uplink transmission that is sent using uplink resources without the base stations 170 dynamically allocating resources to request/grant mechanisms. By performing grant-free transmissions, total network overhead resources may be saved. Furthermore, time savings may be provided by bypassing the request/grant procedure. An ED sending a grant-free uplink transmission, or configured to send a grant-free uplink transmission, may be referred to as operating in grant-free mode. Grant-free uplink transmissions are sometimes called "grant-less", "schedule free", or "schedule-less" transmissions. Grant-free uplink transmissions from different EDs may be transmitted using shared designated resource units, in which case the grant-free uplink transmissions are contention-based transmissions. One or more base stations 170 may perform blind detection of the grant-free uplink transmissions.

In a wireless network according to an embodiment, any ED can be configured for grant-based or grant-free transmissions depending on, e.g., the application and device types and requirements. Usually, a grant-free transmission may require resource (pre-) configuration at the ED connection setup and have resource reconfiguration or an update during operation. In some embodiments, the grant-free resources can be configured for EDs by broadcast or multicast signaling in some scenarios. Two or more grant-free transmissions can share the same configured resources. Furthermore, in some embodiments, a grant-based transmission can use dedicated resources or can share resources (fully or partially) with grant-free resources in a time interval.

Any of the grant-free and grant-based transmissions can be used for any application traffic or services type, depending on the associated application requirements and quality of service (QoS). By way of a non-limiting example, grant-free transmission can be used for: ultra-reliable low latency communication (URLLC) traffic to satisfy the low latency requirement; enhanced mobile broadband (eMBB) traffic with short packets to save signaling overhead; and eMBB traffic to dynamically take advantage of link adaptation and enhance resource utilization and spectrum efficiency.

One ED or a group of EDs may have a group ID or Radio Network Temporary ID (RNTI; e.g., grant-free (GF)-RNTI or grant-based (GB) RNTI) to share the same parameter or resource configuration. The group ID can be pre-configured, or dynamically configured to each ED. The parameter or resource configuration to the ED(s) with the group ID can be done by semi-static or dynamic signaling. In some embodiments, the group ID can be used for, e.g., resource deactivation or activation for the EDs in the group. By way of a non-limiting example, the resources being activated or deactivated can include frequency, time, and reference signal (RS) associated with each ED in the group.

Grant-free transmission eliminates the latency and control overhead associated with the scheduling request/grant procedure of grant-based transmission and can allow for more transmission repetitions to increase the likelihood of successful detection or achieve a desired reliability.

Moreover, unlike contention-free schemes such as GB schemes, in a contention based grant-free scheme uplink resources are accessible to all grant-free EDs served by the same base station, i.e., controlled intra-cell contention/collisions are allowed, thus leading to an efficient utilization of resources and potentially increased system capacity.

For reasons such as the foregoing, uplink grant-free transmission has been agreed to be supported in the 3GPP study item for the 5G New Radio (NR) air interface.

However, for EDs experiencing bad channel conditions and/or persistent harmful collisions, switching a transport block (TB) to contention-free grant-based transmission is often desired to ensure successful decoding and/or to exploit link adaptation of uplink scheduling by the base station compared to the pre-configured transport formats used in grant-free transmission.

Grant-Free Resource Structure

To support grant-free transmissions, the associated resources configured for an ED or a group of EDs can include any or all of the following:

1) Frequency resources in a transmission time interval (TTI), e.g. a symbol, mini-slot or slot. In one example, a physical resource block (PRB) scheme is provided. The PRB scheme indicates physical starting frequency resource block (RB) and size of the RB.

2) Time resources, including starting/ending position of one data transmission time interval. For example, TTI can be one symbol, mini-slot, or slot.

3) Reference signal (RS) or RS configuration, where each ED can be configured with one or more reference signals (RSs) e.g. demodulation reference signals (DMRSs) depending on scenarios involved. For a group of EDs, each ED may or may not have a different RS or have a different set of RSs. Note that different RSs can be orthogonal or non-orthogonal to each other depending on an application, e.g., such as URLLC application or massive machine-type communication (mMTC) application.

4) ED/ED group specific hopping parameters, which may include one of the following two parameters. One parameter may include a hopping pattern cycle period. In one embodiment, an absolute reference duration (e.g., 20 TTI before repeating itself) is defined. During the absolute reference duration, the number of hopping steps (e.g., 10 times) to take before repeating the hopping pattern again can be determined based on periodicity of time interval resource accessible for grant-free transmissions (e.g., 2 TTI). In another embodiment, an absolute number of hopping times can be defined, for example hopping 20 times before repeating itself. Other parameter(s) may include a hopping pattern index or indices, where one ED may have one or more hopping pattern indices.

5) One or more hybrid automatic repeat request (HARQ) process IDs per ED.

6) One or more MCSs per ED, where a grant-free ED can indicate explicitly or implicitly which MCS to use for a transmission.

7) Number of grant-free transmission repetitions K, one or more K values can be configured for an ED, where which K value to use depends on certain rule taking into account ED channel conditions, service types, etc.

8) Power control parameters, including power ramping step size (e.g., for an ED).

9) Other parameters, including information associated with general grant-based data and control transmissions. Note that sometimes, a subset of grant-free resources can be referred to as "fixed" or "reserved" resources; whereas a subset of grant-based resources can be referred to as "flexible" resources, which can be dynamically scheduled by a base station.

Hybrid Automatic Repeat Requests

As discussed above, the ED no may be configured to use a particular set of resources for grant-free transmission. A collision may occur when two or more of the EDs no attempt to transmit data on a same set of uplink resources. To mitigate possible collisions, the EDs no may use retransmissions. A retransmission, without grant, of an original grant-free uplink transmission is referred to herein as a "grant-free retransmission". Any discussion of a grant-free retransmission herein should be understood to refer to either a first or a subsequent retransmission. Herein, the term "retransmission" includes both simple repetitions of the transmitted data, as well as retransmissions using an asynchronous hybrid automatic repeat request (HARQ), that is, a combination of high-rate forward error-correcting coding and physical layer automatic repeat request (ARQ) error control.

In an embodiment, a number of automatic grant-free retransmissions may be pre-configured, to improve reliability and eliminate latency associated with waiting for an acknowledgement (ACK) or a negative acknowledgement (NACK) message. The retransmissions may be performed by the ED no until at least one of the following conditions is met:

(1) An ACK message is received from the base station 170 indicating that the base station 170 has successfully received and decoded the TB. The ACK may be sent in a dedicated downlink acknowledgement channel, sent as individual Downlink Control Information (DCI), sent in a data channel, sent as part of a group ACK/NACK, etc.

(2) The number of repetitions reaches K. In other words, if the ED no has performed K retransmissions and an ACK is still not received from the base station 170, then the ED no gives up trying to send the data to the base station 170. In some embodiments, K is semi-statically configured by the base station 170, such that the base station 170 or the network can adjust K over time.

(3) A grant is received from the base station 170 performing a grant-free to grant-based switch.

In an embodiment, the grant-free retransmission may be triggered by receiving a negative acknowledgment (NACK) message, or failing to receive an acknowledgment (ACK) message. In an alternative embodiment, K grant-free retransmissions are performed irrespective of the response from the base station 170.

The resources over which the one or more grant-free retransmissions are performed may be pre-configured, in which case the base station determines the resources based on a priori information. Alternatively, the resources over which the grant-free initial transmission or one or more retransmissions are performed may be determined e.g. according to an identifier in a pilot signal of the original grant-free uplink transmission. This may allow the base station to predict, or otherwise identify, which uplink resources will carry the one or more retransmissions upon detecting the identifier in the pilot symbol.

Grant-free transmission reduces latency and control overhead associated with grant-based procedures, and can allow for more retransmissions/repetitions to increase reliability. However, due to the lack of uplink scheduling and grant signaling, grant-free EDs may have to be pre-configured to use a fixed modulation and coding scheme (MCS) level at least for initial grant-free transmission. In one embodiment, grant-free EDs are configured to use the most reliable MCS level for a given resource unit for grant-free uplink transmissions.

Link Adaptation for Grant-Free Transmissions

The use of link adaptation for grant-free transmissions and retransmissions potentially offers several benefits, such as:

Uplink transmissions may occupy fewer resources. For example, EDs with good link quality may be able to use fewer resources by using higher MCS levels.

Spectral efficiency may be increased, and thus the grant-free system capacity may similarly be increased.

Target reliability as characterized e.g. by target residual block error rate (BLER), may be attained more efficiently.

The link adaptation for grant-free communications may be provided by using a semi-static or dynamic signaling, e.g., periodic signaling with a configurable period. This mechanism may follow an approach similar to that of grant-based uplink dynamic closed loop transmit power control to achieve a target performance metric, such as residual BLER. Other performance metrics that may serve as a target performance metric include, but are not limited to:

The percentage of decoding instances at the base station resulting in NACKs and/or the percentage of decoding failures, compared to a target threshold.

The percentage of decoding instances at the base station resulting in ACKs, and/or the percentage of decoding successes, compared to a target threshold.

The SINR gap between the received combined SINR (combined over all HARQ retransmissions of each TB) and the target SINR associated with the current MCS level in use. Decoding Log Likelihood Ratios (LLRs) calculated by the base station when attempting to decode a TB after combining all of its retransmissions and given the current MCS level in use.

A command for the ED to adjust MCS may be transmitted over a dedicated downlink control channel, e.g. the Physical Downlink Control Channel (PDCCH) or combined with acknowledgement messages over a dedicated downlink acknowledgement channel, e.g. combined with Hybrid Automatic Repeat Request (HARQ) acknowledgements (ACKs/NACKs) transmitted over the Physical HARQ Indicator Channel (PHICH) or other channels.

The grant-free link adaptation may also be initiated at the ED. In one embodiment, an ED can measure downlink channel conditions, and derive uplink channel conditions based on the measured downlink channel conditions. The ED may adapt various parameters of its uplink transmissions based on the assumed uplink channel conditions. The ED may then inform the base station of the adapted transmission parameters. Additionally or alternatively, based on the assumed uplink channel conditions, the ED may send to the base station an indication of a transmission adaptation.

Among the uplink transmission parameters that may be adapted are the MCS, packet size, the segmentation of packets, the repetition of packets, and numerology. The numerology may include the spacing of subcarriers in uplink transmissions and the length of the cyclic prefix used in uplink transmissions. Such adaptations may take into account the downlink channel quality measurements, the ED's mobility, pilot signal collisions, the QoS of the ED, including the latency requirement of the ED.

The link adaptation for grant-free communications may also be provided by pre-configuring resource groups that with different MCS levels for grant-free transmission with different link conditions. The resource groups can be of different numerologies to enable varying resource configurations. A grant-free ED's long term geometry or path loss and/or transport block packet size may be used to map to a particular one of the pre-configured resource groups.

Unlicensed Spectrum Access

As noted above, given the scarcity and expense of bandwidth in the licensed spectrum, and the increasing demand for data transmission capacity, there is increasing interest in offloading at least some communication traffic, such as uplink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

Licensed-Assisted Access (LAA) and enhanced LAA (eLAA) of 3GPP Rel 13 and Rel 14, respectively, aimed at porting the spectral-efficient MBB air interface (AI) to the vast and free-of-charge unlicensed spectrum through aggregating unlicensed component carriers (CCs) at the operator's small cells with the assistance of the anchor licensed carriers.

However, UL transmission in eLAA has been built around the GB scheme only. To present a global unlicensed solution, regulatory requirements such as Listen-Before-Talk (LBT) have to be imposed on the medium access design. As such, UL transmission in eLAA has been substantially disadvantaged in terms of latency and successful medium access opportunities due to the multiple contention levels for:

ED to transmit the scheduling request (SR)

Base station to schedule the ED among other EDs

Base station to transmit the scheduled grant (especially for self-carrier scheduling)

ED to pursue the GB transmission.

Aspects of the present disclosure address the challenges of uplink transmission in the unlicensed spectrum by enabling a GF transmission scheme as part of the unified NR-U air interface. In addition, given the plentiful resources available in the unlicensed spectrum, some embodiments of the present disclosure could potentially provide Ultra-Reliable Low-latency Communications (URLLC) applications in the unlicensed spectrum.

Before an ED can access unlicensed spectrum to transmit on an unlicensed spectrum sub-band, the ED performs a listen-before talk (LBT) operation (for example including initial clear channel assessment (ICCA) and an extended clear channel assessment (ECCA)) in order to check that the channel is idle before transmitting. A sub-band of an unlicensed spectrum band may include a group of frequency resources that comprises one or more unlicensed channels as defined by the IEEE 802.11 standard in the geographical region of operation, or one or more bandwidth parts (BWPs) as defined by 3GPP standard, for example.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting at an arbitrary time after a successful CCA. The CCA mechanism employed in such LBE LBT procedures may be the same CCA mechanism employed in WLAN, i.e. carrier sense multiple access with collision avoidance (CSMA/CA), or it may be based on an energy-detection-based CCA. For example, an energy-detection-based CCA may utilize a random backoff to determine the size of a contention window and a respective maximum channel occupancy time (MCOT) that determines the maximum amount of time that a device may transmit in the unlicensed spectrum once it has successfully contended for a transmission opportunity.

In FBE LBT procedures, a device attempting to access the unlicensed spectrum can start transmitting only at periodic instants after a short successful energy-detection-based CCA.

Figure 2:
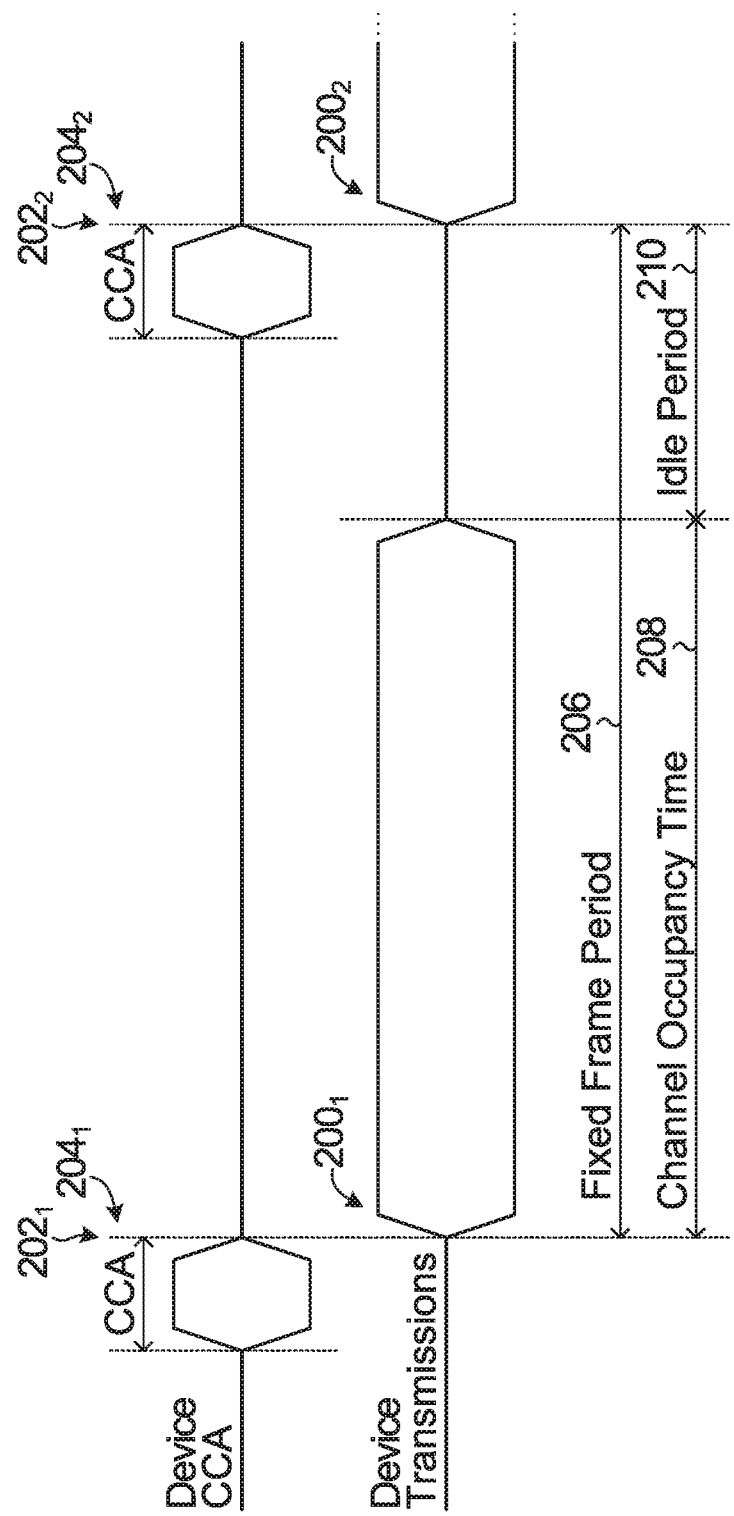
FIG. 2 is a timing diagram showing an example of a listen-before-talk (LBT) procedure in accordance with European regulatory requirements for frame based equipment (FBE).

FIG. 2 is a timing diagram showing an example of an LBT procedure in accordance with the European regulatory requirements set out in European Telecommunications Standards Institute (ETSI) EN 301 893 V1.7.1 for devices accessing unlicensed spectrum as FBE. As depicted in FIG. 2, a device accessing unlicensed spectrum as FBE starts transmissions $200_1$, $200_2$ over the unlicensed spectrum only at periodic instants $202_1$, $202_2$ after a short successful energy-detection-based CCA $204_1$, $204_2$ indicating that a channel in the unlicensed spectrum is available. The minimum time between such periodic instants $202_1$, $202_2$ is the fixed frame period 206, which encompasses the channel occupancy time 208 of the transmission and an idle period 210. Under the regulatory requirements set out in ETSI EN301 893 V1.7.1, the channel occupancy time 208 may be between 1 and 10 milliseconds (ms) and the idle period 210 must be at least 5% of the channel occupancy time 208, which means that the frame period 206 must be a minimum of 1.05 times the size of the channel occupancy time 208. In addition, under the regulatory requirements set out in ETSI EN301 893 V1.7.1, devices employ an energy-detection-based CCA in which a channel is determined to be busy if the total energy detected in the channel is greater than a CCA threshold value that is upper bounded by a function of the transmit power of the device. In particular, the upper bound of the CCA threshold has been regulated as follows:

$$CCA Threshold \geq -73 \frac{dBm}{MHz} + (23 - \max Tx\ EIRP)[dBm],$$

where max Tx EIRP is a device's maximum transmit equivalent isotropically radiated power (EIRP). As a result, the higher the max Tx power and/or the antenna gain, the lower the CCA threshold that is allowed. As such, an unlicensed spectrum access opportunity may depend on the result of the transmit power control mechanism that is used for unlicensed spectrum transmission. Under the regulatory requirements set out in ETSI EN301 893 V1.7.1, the CCA period must be at least 20 microseconds (μs) long, with 25 μs being typical.

If individual EDs accessed the unlicensed spectrum individually without coordination, it could create delay and potentially deteriorate performance. For example, If EDs perform independent LBT procedures, they may either start transmitting uplink data or send a reservation signal to ensure that other devices do not occupy an unlicensed channel before they are able to transmit. In both situations, if no coordination exists between EDs in terms of aligning their CCAs, sending of the reservation signals or starting of their uplink transmissions, then the channel may appear to be busy for other EDs, which can increase the latency of uplink transmission for those other EDs.

For example, in the CSMA/CA LBT procedure utilized in WiFi/WLAN, each device (e.g. WiFi access point (AP) or WiFi station (STA)) attempting to access the unlicensed spectrum independently generates a random backoff counter or contention window (CW) that is used to determine the length of an ECCA that is performed after an ICCA that is performed during an distributed coordination function inter-frame space (DIFS). In the CSMA/CA LBT procedure, if a CCA is terminated due to a 'busy' assessment, the backoff counter is frozen to maintain priority in the next access attempt. WiFi/WLAN APs or STAs of the same basic serving set (BSS) can block each other, because there is no synchronous group access in the CSMA/CA LBT procedure utilized in WiFi/WLAN. For a transmission from a source device to a destination device in WiFi/WLAN, if the source device successfully receives one or multiple medium access control protocol data units (MPDUs), e.g., an aggregated MPDU (AMPDU), an acknowledgement (ACK) signal is sent using a reliable modulation and coding scheme (MCS) from the destination device to the source device only. A time out for the transmission is detected by the source device if the source device does not receive/decode an ACK within a time frame defined by the duration of a short inter-frame space (SIFS) plus the duration of the ACK after the source device finishes the transmission.

The 3rd Generation Partnership Project (3GPP) Release 13 Long Term Evolution (LTE) specification provides a framework for Licensed Assisted Access (LAA) in unlicensed spectrum. The framework includes a Category 4 (CAT4) LBT procedure (LBT with random backoff or ECCA) that each device attempting to access the unlicensed spectrum must comply with. Similar to the LBT mechanism in CSMA/CA for WIFI/WLAN, in the 3GPP Release 13 CAT4 LBT mechanism each device independently generates a random backoff counter or contention window (CW), and if a CCA is terminated due to a 'busy' assessment, the backoff counter is frozen to maintain priority in the next access attempt. However, synchronous group access of neighboring small cell evolved Node Bs (eNBs) is supported in 3GPP Release 13 via backhaul connections by setting a common starting time for downlink (DL) transmissions from neighboring small cell eNBs. The eNB that finishes a successful CCA before the preset subframe starting point has to defer its transmission to that point. However, the eNB that has deferred its transmission cannot prevent WiFi or other LAA access during the defer time by transmitting a blank blocking/reservation signal because this will likely cause the ongoing CCAs of in-group eNBs to fail.

Gf Ul Transmission in Unlicensed Spectrum

Methods and devices are provided that address the above challenges associated with supporting grant-free uplink transmission in unlicensed spectrum. In some embodiments, EDs in the same group are configured to align their transmission starting times following the success of respective LBT CCA procedures in order to access the unlicensed spectrum simultaneously and share time-frequency resources of an unlicensed spectrum sub-band for grant-free uplink transmissions. Meanwhile, GF EDs in different groups can access the unlicensed spectrum in a contention-free manner.

As will be described in further detail later on, the potential GF transmissions of the group of EDs in unlicensed spectrum can be aligned to a common GF transmission cycle, a downlink (DL) group common time alignment signal, a DL burst containing a Control Resource Set (CORESET) that includes ED-specific and/or group common DCI triggers, or they may be aligned using a combination of the above methods.

The configuration/re-configuration can be done through DL RRC signaling and/or group common physical downlink control channel (PDCCH). The configuration can be carried in a grant free specific group common control PDCCH, a cyclic redundancy check (CRC) of which is scrambled with a grant-free ED group RNTI (GFG-RNTI). The configuration can be also carried in a general group common PDCCH, a CRC of which is scrambled by common control RNTI (CC-RNTI). Examples of RRC signaling are ED-specific, cell-specific, or group-specific RRC.

In some embodiments of the present disclosure, an ED that has been configured for grant-free uplink transmission may not need to monitor ED-specific downlink control information (DCI), unless functionality to switch transmission of a TB from grant-free mode to GB mode is enabled or ED-specific DCI triggers are used to align the GF transmissions of some or all of the group EDs.

For embodiments of the present disclosure in which a group of EDs are configured to align their transmission starting times to a common GF transmission cycle characterized by a GF transmission cycle reference time and a GF transmission cycle period, EDs configured with the same GF transmission cycle may be grouped into the same unlicensed spectrum sub-band. As mentioned earlier, an unlicensed spectrum sub-band may include one or more BWPs or one or more unlicensed spectrum channels, e.g. with a bandwidth of 20/40/80/100/160 MHz.

A grant-fee ED configured to align to a common GF transmission cycle can thus access the unlicensed spectrum sub-band as an ETSI Frame Based Equipment (FBE), i.e., if the grant-free ED needs to transmit, only a short one-shot LBT (Category 2 (CAT2) LBT) is required immediately before or immediately after the beginning of a new GF transmission cycle period without taking up part of a DL MCOT. Nonetheless, in some embodiments, a Category 4 (CAT4—LBT with random back-off with variable size of contention window or extended CCA) LBT procedure could be used and configured via RRC configuration. In such embodiments, the individual CCA starting or ending time for the group EDs can be determined every new cycle, based on the backoff counter value and whether self-deferral is applied before or after CCA, respectively, such that the grant-free UL burst starts at the designated periodic instant for that cycle.

Two or more GF ED groups, each configured to use a different GF transmission cycle on the time-frequency resources of a given sub-band, can coexist in the same sub-band if they refer to the same GF transmission cycle reference time, their GF transmission cycle periods are integer multiples of the shortest GF transmission cycle period amongst them, and their UL MCOTs are limited to the UL MCOT of the shortest GF transmission cycle period.

In some embodiments, a GF ED group configured to align their GF transmission starting times to a common GF transmission cycle may be configured to start their GF transmissions at one of multiple GF occasions within the GF cycle period. The occasion(s) within a GF transmission cycle can be defined by default from the beginning of the GF cycle period or can be configured through high layer signaling, e.g. indicating an offset from the start of the GF transmission cycle. A GF occasion may also be associated with a different set of GF parameters such as transport format, number of repetitions, frequency interlace/hopping patterns, etc. . . . . In such case, if one of the GFG EDs cannot start transmitting at the one of the occasion(s) due to a failed CAT2 LBT, for instance, it can defer the CAT2 LBT such that it may start transmitting at a following occasion upon LBT success. If CAT4 LBT is used instead, a GFG ED that cannot start transmitting at one of the occasions due to a failed CAT4 LBT may freeze its backoff counter and can either defer the CAT4 LBT and redo it using the frozen backoff counter such that it may start transmitting at a following GF occasion upon LBT success, or it may keep performing the failing CAT4 LBT procedure while freezing the backoff counter until LBT success is attained. However, if that successful CAT4 LBT finishes before one of the configured GF occasions, the ED may apply self-deferral such that it may transmit at this GF occasion upon the success of another CCA without backoff for a fixed duration, e.g., DIFS.

In some embodiments wherein a GF ED group are configured to start their GF transmissions at one of multiple GF occasions within the GF cycle period, two or more GF ED groups, each configured to use the same GF transmission cycle on the time-frequency resources of a given sub-band, can coexist in the same sub-band if they are configured to start their GF transmissions based on different sets of occasions pre-configured within the GF cycle period. The gNB may assign the different sets of occasions to the different coexisting GF ED groups based on whether partial contention-based or contention-free access is desired between EDs from different coexisting GF ED groups.

Grant-based uplink and downlink transmissions can coexist with the grant-free uplink transmissions in the unlicensed spectrum sub-band by scheduling the GB transmissions such that they target the idle period every GF transmission cycle to avoid the resources already configured for GF transmissions. This can be achieved, for instance, by either scheduling the GB MCOT to end before the GF CCA procedure for the next GF transmission cycle or by pre-emptively blanking the GB MCOT to accommodate the GF CCA, the GF UL burst, and possibly a short time gap, within its duration. In the latter case, the grant can be accompanied, for instance, by a group common PDCCH using the GFG-RNTI to instruct the GF EDs to limit the current GF bursts, in compliance with the regulations, to an indicated length or to use a default length that has been pre-configured earlier, e.g., through RRC signaling. In some embodiments, the medium access priority may be, in order from highest to lowest priority: UL GF transmissions>DL transmissions>UL GB transmissions.

In some embodiments, a base station may transmit a switching grant message to a GF ED to indicate to the GF ED that a GB uplink transmission has been scheduled for the GF ED. In addition to the time-resources, the switching grant message may include information that indicates: the transport block (TB)/HARQ process ID for which a retransmission is required or whether a new TB can be transmitted; an LBT category (e.g. CAT2 or CAT4); and a GB frequency region or sub-band in which the GB uplink transmission for the ED has been scheduled/granted. In such embodiments, if a GF ED receives such a switching grant message, the GF ED transmits the TB using the LBT category and the GB frequency region or sub-band indicated in the grant message by the base station. If a GF ED is configured to use a GF transmission cycle to access a given unlicensed spectrum sub-band for grant-free uplink transmissions, the switching grant message may indicate a different sub-band for the scheduled GB uplink transmission for the GF ED. This is to avoid regulatory issues if an ED is not allowed to access a given sub-band/channel/frequency region using the two medium access mechanisms, LBE and FBE, simultaneously. For embodiments of the present disclosure in which a group of EDs are configured to align their GF transmission starting times for a given unlicensed spectrum sub-band to a DL grant-free group (GFG) common time alignment signal, a base station may transmit the GFG common time alignment signal on the unlicensed spectrum sub-band following a successful LBT procedure, e.g., a CAT4 LBT procedure. The GF EDs in the GFG align their GF transmission starting times by either transmitting directly without CCA after the end of the GFG common time alignment signal, if the time gap resulting from a boundary alignment requirement, e.g., symbol/slot/subframe alignment, is not longer than 16 is, or transmitting after the success of LBT CAT 2 (25 µs) immediately following the end of the GFG common time alignment signal. In either case, with or without CCA, the aligned GF transmissions may start with a reservation signal and/or a partial subframe to satisfy the boundary alignment requirement.

In some embodiments, a base station may be configured to transmit the GFG common time alignment signal on a periodic/semi-periodic basis, i.e. transmit a periodic DL GFG common time alignment signal with a target GF cycle period following a successful LBT procedure, e.g., a CAT 2 LBT procedure. In one embodiment, periodicity of the GFG common time alignment signal is preserved by the base station skipping the transmission of the signal if the CCA fails for a given cycle period and targeting the following GF cycle period. In such case, periodicity can also be preserved even if a CAT4 LBT procedure is used instead by the base station determining the CCA starting time based on the random backoff counter value every GF cycle period such that the DL GFG common time alignment signal starts at the target periodic instants. In another embodiment, semi-periodic or pseudo-periodic transmission of the GFG common time alignment signal can be realized if the base station persistently performs CCA, according to either CAT2 or CAT4 LBT, from the beginning of the target GF cycle during a given time window that is shorter than the GF cycle period until CCA is successful or the transmission is skipped for this period otherwise. Similarly, the GF EDs in the GFG align their GF transmission starting times by either transmitting directly without CCA after the end of the periodic/semi-periodic GFG common time alignment signal, if the time gap resulting from the boundary alignment requirement is not longer than 16 µs, or by aligning their CAT 2 LBT procedures to the end of the GFG common time alignment signal, if the time gap resulting from the boundary alignment requirement would be longer than 16 µs. In either case, with or without CCA, the aligned GF transmissions may start with a reservation signal and/or a partial subframe to satisfy the boundary alignment requirement, e.g., symbol/slot/subframe alignment. The periodic/semi-periodic nature of the GFG common time alignment signal allows for UL transmission of periodic sounding reference signals (SRS) or periodic channel state information (CSI) feedback in a best-effort manner.

For embodiments of the present disclosure in which all or a sub-group of the GFG EDs align their GF transmission starting times for a given unlicensed spectrum sub-band to a DL burst containing a CORESET that includes ED-specific DCI triggers, a base station may transmit the ED-specific DCI triggers on the unlicensed spectrum sub-band following a successful LBT procedure, e.g., a CAT4 LBT procedure. The triggered EDs align their GF transmission starting times by either transmitting directly without CCA after the end of the signal containing the ED-specific DCI triggers, if the time gap resulting from the boundary alignment requirement is not longer than 16 µs, or by aligning their CAT 2 LBT procedures to the end of the signal containing the ED-specific DCI triggers, if the time gap resulting from the boundary alignment requirement would be longer than 16 µs. In either cases, with or without CCA, the aligned GF transmissions may start with a reservation signal and/or a partial subframe to satisfy the boundary alignment requirement, e.g., symbol/slot/subframe alignment.

In some embodiments, a base station may transmit the ED-specific DCI triggers, to one or more of the GFG EDs, simultaneously with the DL GFG common time alignment signal to maintain the GF transmission alignment and in the meanwhile can override the pre-configured GFG parameters, such as transport format, repetitions, frequency resources/hopping pattern, etc . . . , for the one or more GFG EDs in accordance with the content of their individual triggers. In such cases, instructions/parameters received by an ED through an ED-specific trigger message may be expected to override the corresponding instructions/parameters received by the ED through the DL GFG common time alignment message.

In some embodiments, a base station may transmit the ED-specific DCI triggers, to one or more of the GFG EDs such that the potential GF transmissions of the one or more EDs are aligned with the GF transmission starting time in one period of the pre-configured GFG transmission cycle. In such cases, the GFG transmission alignment is maintained while the pre-configured GFG parameters, such as transport format, repetitions, frequency resources/hopping pattern, etc . . . , for the one or more GFG EDs can be overridden in accordance with the content of the individual ED-specific triggers.

In some other embodiments, a base station may transmit the ED-specific DCI triggers to one or more of the GFG EDs independently from the DL GFG common time alignment signal or the GFG transmission cycle. The independent transmission of the ED-specific DCI triggers may be used by the base station to accommodate increased UL traffic load of the one or more GFG EDs or provide more frequent medium access opportunities, with respect to the remaining GFG EDs, to meet higher QoS requirements of individual ED applications. The independent transmissions of the ED-specific DCI triggers may be also used by the base station to align the UL GF transmissions of a given GFG on a given unlicensed sub-band in absence of any GFG transmission cycle or any DL GFG common time alignment signals while possessing the capability of frequent overriding of the pre-configured GFG parameters for individual group EDs, e.g., as frequent as the ED's UL GF transmissions.

Equipment that accesses unlicensed spectrum on a regular periodic basis must comply with FBE regulations to be able to use short one-shot LBT, e.g., CAT 2 LBT. However, because a DL GFG common time alignment signal can potentially have a very short duration, the periodic/semi-periodic CCA/transmission associated with transmitting a periodic/semi-periodic DL GFG common time alignment signal with a target GF cycle period may not need to comply with FBE regulations.

In some embodiments, the transmission of the GFG common time alignment signal (periodic, semi-periodic or aperiodic) and subsequent GF uplink transmissions from GFG EDs may be realized as an UL-dominant subframe with the GFG common time alignment signal transmission within a DL portion of the UL-dominant subframe followed by the GF UL transmissions on respective pre-configured resources within an UL portion of the UL-dominant subframe. The use of a periodic, semi-periodic, or aperiodic GFG common time alignment signal to enable GF UL transmissions eliminates the contentions and delays for EDs to transmit a scheduling request and associated scheduling at a base station for grant-based uplink transmissions, but may involve up to two LBT procedures before a GF uplink burst can be transmitted.

Sub-band time-frequency resources are shared by the group EDs for their respective grant-free uplink transmissions within the sub-band, but because the CCAs of group EDs are aligned in time the group EDs do not block each other during the CCA procedure.

In some embodiments, EDs can apply either a random or a pre-configured occupational bandwidth-compliant (OCB-compliant) frequency-hopping pattern within the time-frequency resources of the sub-band for controlled collisions and frequency diversity. An example of OCB-compliant frequency-hopping pattern is a random or a pre-configured sequence of frequency interlaces to be used by the ED over consecutive slots of the GF transmission. In some embodiments, a subset of GF EDs in a given sub-band can be configured to persistently collide (occupy the same time-frequency resources) whenever transmitting concurrently, e.g., given spatial/code domain (pseudo-)orthogonality and/or power offset so that the base station can distinguish and separate their respective GF uplink transmissions. For example, such a subset of EDs may receive a common seed value from the base station to use along with a common random number generator to generate, every alignment time unit (ATU), e.g., slot or subframe, the same random frequency interlace/unlicensed channel index to determine the specific time-frequency resources to be used for transmission in a given ATU regardless of whether or not the ED actually has a transmission to make for the given ATU. As in GF uplink transmission in the licensed spectrum, in embodiments of the present disclosure intra-hyper-cell contention/collision is allowed according to the GF configuration.

In some embodiments, a multi-cast GFG feedback message may be transmitted by a base station in the unlicensed spectrum in order to provide feedback to GF EDs in a GFG. For example, the GFG feedback message may include Acknowledgement/Negative Acknowledgement (Ack/Nack) feedback. The GFG feedback message may be transmitted by the base station using group common DCI and the GFG-RNTI, for example.

As will be discussed in further detail later on, a GFG feedback message may be transmitted by a base station after a short time gap, e.g., less than 16 µs, following the longest in-group GF transmission and within a maximum channel occupancy time (MCOT) time span. In embodiments that utilize a common time alignment signal, a GFG feedback message may be included within the DL common time alignment signal, and may be in reference to the GF UL burst in a previous transmission. RRC signaling prior to the transmission of the GFG feedback message may be used to inform the GF EDs of their respective fields in the group common feedback message. A filed could be multiple bits corresponding to multiple TBs/code blocks groups (CBGs) in the ED group common Ack/Nack feedback message.

In some embodiments, the GFG feedback message may also or instead include GFG Dynamic Closed Loop Link Adaptation (DCLLA) commands and/or Closed Loop Power Control (CLPC) commands. For example, in some embodiments, GFG DCLLA commands and/or CLPC commands may be appended to or combined with the GFG common Ack/Nack feedback as an augmented feedback message format.

In some embodiments, ED-directed link adaptation may be supported, and in such embodiments the GFG feedback message may also or instead include UL channel state information (CSI) feedback.

In other embodiments, GFG Ack/Nack feedback may also or instead be transmitted over a PHICH-like channel. In such embodiments, RRC signaling prior to the feedback transmission may be used to inform the GF EDs of respective physical resources that will be used to transmit their respective GFG Ack/Nack feedback.

A numerology is defined as the set of physical layer parameters of the air interface that are used to communicate a particular signal. For OFDM-based communication, a numerology is described in terms of at least subcarrier spacing (SCS) and OFDM symbol duration, and may also be defined by other parameters such as fast Fourier transform (FFT)/inverse FFT (IFFT) length, transmission time slot length, and cyclic prefix (CP) length or duration. As will be discussed in further detail later on, the numerologies used for GF UL transmissions in the unlicensed spectrum in accordance with the present disclosure may be selected so as to support certain functionality. For example, in some embodiments the numerology selected for GF UL transmission in a given unlicensed spectrum sub-band may include/provide a large enough SCS and/or long MCOT to allow for a configurable number of K repetitions of a TB, with or without frequency-hopping, to occur within a GF UL burst in order to increase the likelihood of successful decoding. Such repetitions can potentially support applications with high reliability requirements.

Similarly, in some embodiments a GF ED can start transmitting a new TB upon packet arrival during a GF UL MCOT without waiting for a new CCA, which can potentially support applications with low latency requirements. For example, a GF ED may begin transmitting a second TB immediately after completing the repetitions of a first TB or during the repetitions of the first TBs using, e.g., first and second orthogonal frequency interlaces per slot/mini-slot for transmission of the repetitions of the first and second TBs within the same slot/mini-slot.

In some embodiments, a GF ED may start its GF UL burst with an UL control signal, e.g., wide band Physical Uplink Control Channel (PUCCH) carrying Uplink Control Information (UCI) such as ED ID, modulation and coding scheme (MCS) used for ED-directed link adaptation, and/or UL HARQ information (e.g., HARQ ID, New-Data Indicator (NDI), etc.). In some embodiments, the GF Physical Uplink Shared Channel (PUSCH) is multiplexed with an ED-specific or TB-specific reference signal, e.g., front-loaded DMRS. The base station may use the combination of RS and occupied time-frequency resources to identify the GF ED or the further identify its TB/HARQ process ID. To support the GF transmission of multiple TBs simultaneously, a gNB needs to identify and soft-combine transmissions and repetitions of each TB. In such cases, an ED may be configured to use multiple RSs, each with a given TB (i.e. TB-specific RSs), or configured to use one RS and multiple T/F resource sets, each for a given TB. A combination of the above is also possible.

As noted above, in some embodiments of the present disclosure a base station transmits group-specific configuration information to be used by EDs in the group for alignment of their GF transmissions to access time-frequency resources of an unlicensed spectrum sub-band. For example, the group-specific configuration information may be transmitted to GF EDs in the group via RRC signaling that includes a GFG-RNTI associated with the group, an unlicensed GFG sub-band indication that indicates the unlicensed spectrum sub-band to be used by the GFG of EDs for GF UL transmission, a frequency hopping pattern/seed value of OCB-compliant transmissions/repetitions over the sub-band, and information indicating an ED-dedicated field format in GFG common DCI message (e.g., for a GFG common feedback message and/or GFG common time alignment message).

In some embodiments, the RRC signaling may also explicitly indicate the SCS and/or CP type for the unlicensed spectrum sub-band, e.g., if the SCS and/or CP type is not deducible from the GFG sub-band indication.

The information indicating a frequency hopping pattern/seed value of OCB-compliant transmissions/repetitions over the sub-band may indicate a sequence of frequency interlaces to use, a sequence of unlicensed channels to occupy, or a combination of interlaces and channels. Alternatively, a subset of the GFG EDs may receive a common seed to randomly generate the frequency interlace/unlicensed channel index to use every ATU (e.g., slot or subframe) regardless of whether transmitting a GF UL burst or not. In such embodiments, GF UL bursts transmitted by the subset of GF EDs that receive the same common seed will occupy the same T/F resources whenever transmitted concurrently, but spatial/code domain (pseudo-) orthogonality and/or power offset may be used to allow the base station to be able to distinguish and separate the respective GF uplink transmissions.

The information indicating the ED dedicated field format in the GFG Common DCI message may include information indicating the number of unlicensed channels on which the GFG DCI message is distributed for OCB compliance. In some embodiments the information may also or instead indicate ED sub-fields, e.g., if GFG feedback is augmented, i.e., group Ack/Nack, CLPC and/or DCLLA commands, or UL CSI feedback, as described previously.

GFG Configuration Information for Common GF Transmission Cycle

As noted above, in some embodiments a group of EDs are configured to align their GF transmission starting times to a common GF transmission cycle characterized by a GF transmission cycle reference time and a GF transmission cycle period. In such embodiments, the group-specific configuration information further includes information indicating the GF transmission cycle reference time, GF transmission cycle period and a maximum GF burst length.

The GF transmission cycle period and maximum GF burst length may be indicated explicitly in the configuration information, e.g., the number of OFDM symbols (OSs), slots or mini-slots, or the configuration information may include a configuration index or a priority class index that can be used by the EDs to look up this pair of parameters given a particular frame structure type and SCS/CP type, as will be discussed in further detail later on with reference to the tables shown in FIGS. 10A-10D and 11A-11D.

The GF transmission cycle reference time can be indicated as a relative offset w, i.e., the number of OSs, slots, or mini-slots from the end of an RRC PDSCH transmission that may also include the GFG configuration information message. For example, FIG. 3A is a timing diagram showing an example of RRC signaling under a DL HARQ procedure, wherein the RRC signaling includes an indication of an offset w to configure a grant-free common transmission cycle in accordance with an embodiment of the present disclosure.

For example, if the DL HARQ procedure had a $1^{st}$ retransmission interval T1>w (not shown in FIG. 3A), a GF ED may adjust the offset w extracted from a successful 1st retransmission (as shown at 302) to point at the next cycle reference time as w←w+(GF Transmission Cycle Period−T1). Otherwise, as shown in the upper scenario shown in FIG. 3A, if T1<w, then w←w−T1 (as shown at 303). An ED may determine the retransmission interval T1 by measuring the time difference between the end of the initial RRC PDSCH transmission and the end of the $1^{st}$ RRC PDSCH re-transmission.

Figure 3A:
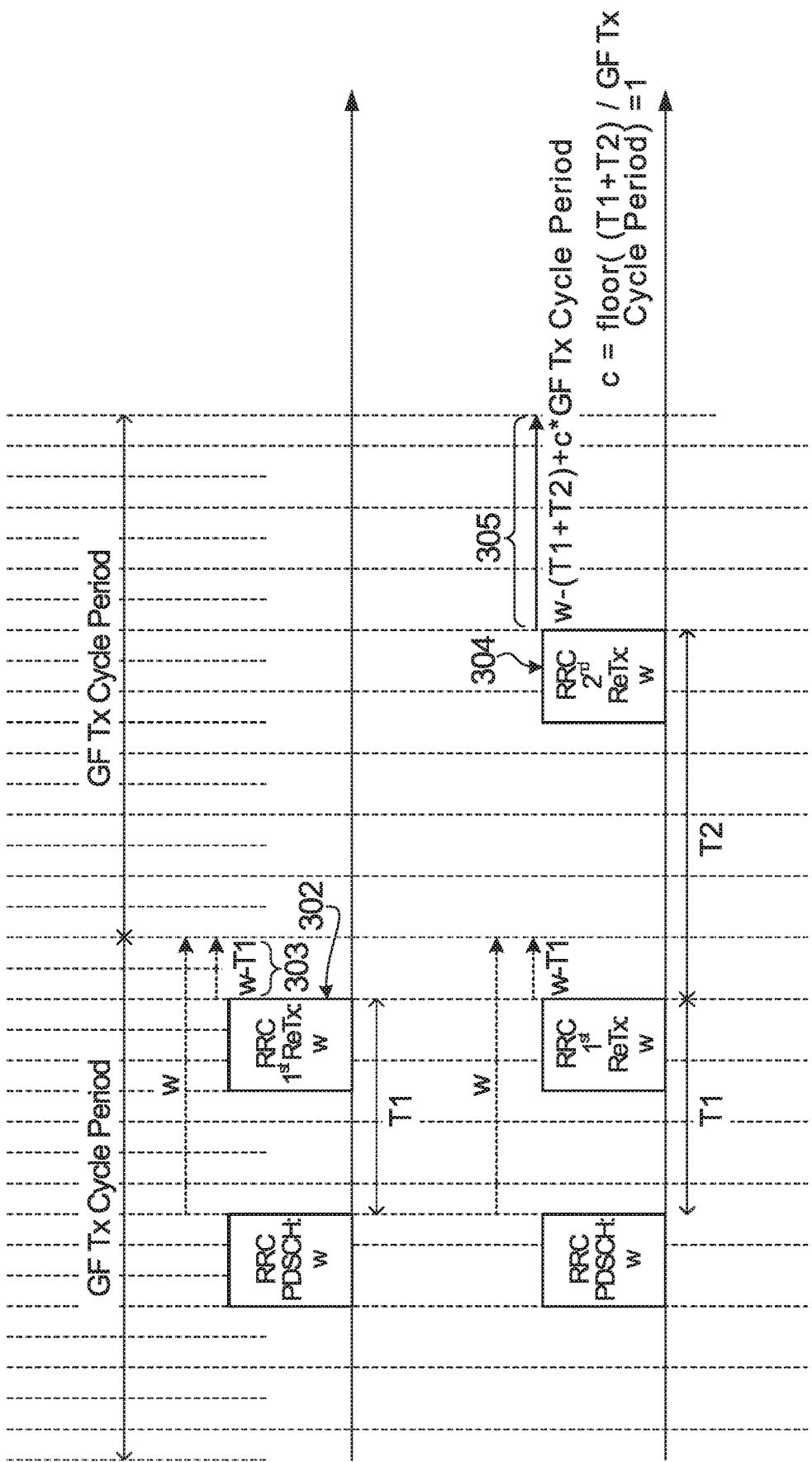
FIG. 3A is a timing diagram showing a first example of a radio resource control (RRC) signaling to configure a common grant-free (GF) transmission cycle in accordance with an embodiment of the present disclosure.

Furthermore, as shown in the lower scenario shown in FIG. 3A, if the DL HARQ procedure had a $2^{nd}$ retransmission interval such that T1+T2>w, a GF ED may adjust the offset w extracted from the successful 2nd retransmission (as shown at 304) to point at the next cycle reference time as w←w+(c*GF Transmission Cycle Period−(T1+T2)) (as shown at 305), where c=floor((T1+T2)/GF Transmission Cycle Period) and floor ( ) is the floor function. Otherwise, if T1+T2<w (not shown in FIG. 3A), then w←w−(T1+T2), and so on for subsequent retransmissions of the RRC PDSCH message that includes the group-specific configuration information.

If no DL HARQ is applied to the RRC PDSCH, or the DL HARQ process has exhausted a maximum number of permitted retransmissions, a base station may re-encode the RRC message after revising the offset w in reference to the next earliest GF transmission cycle reference time.

Figure 3B:
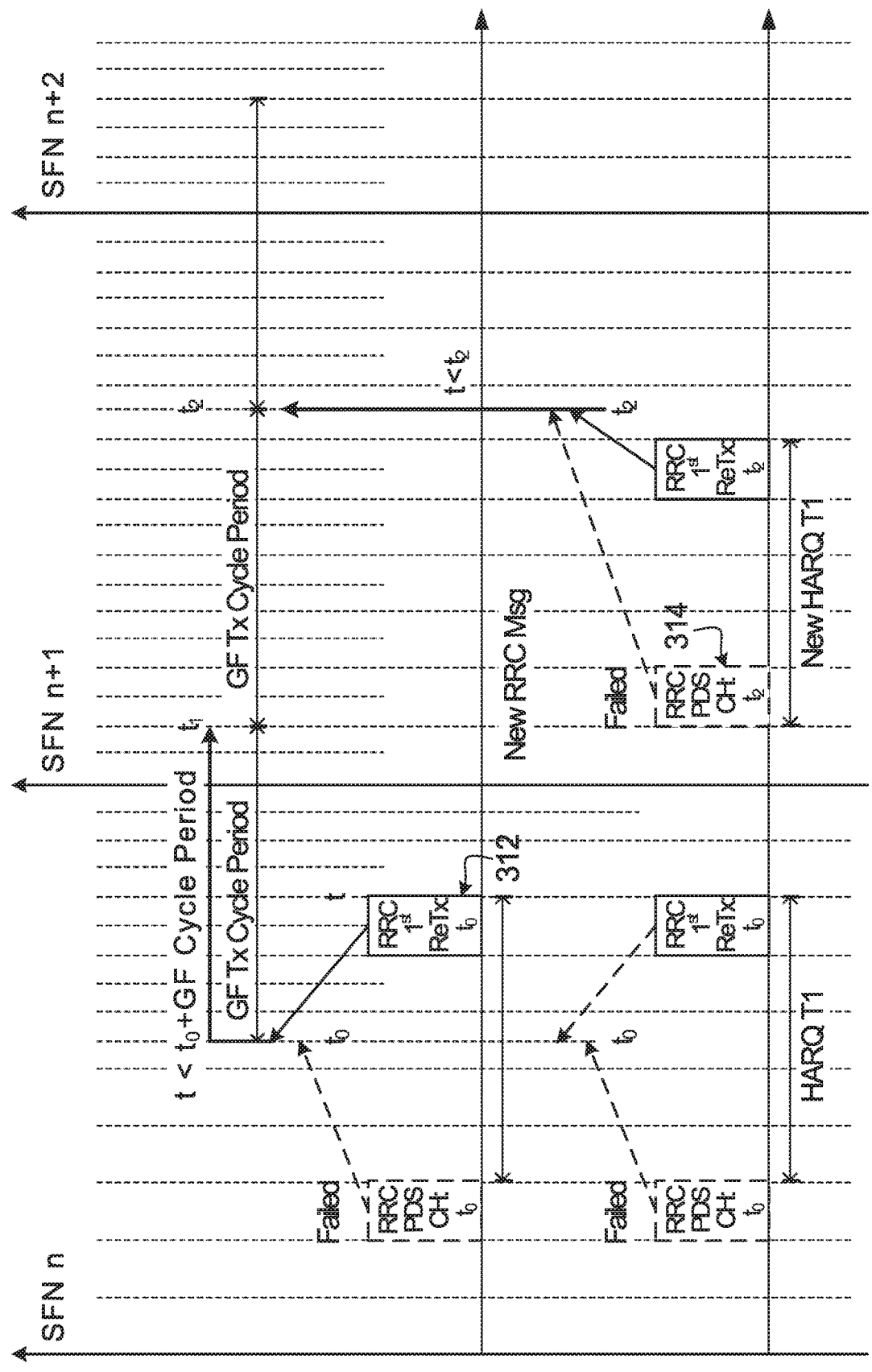
FIG. 3B is a timing diagram showing a second example of a RRC signaling to configure a common GF transmission cycle in accordance with an embodiment of the present disclosure.

In another embodiment, the GF transmission cycle reference time can be indicated as an absolute index within the current system frame number (SFN), i.e., index of the OS, slot, or mini-slot at which the GF transmission cycle can start in the current SFN. In such case, the RRC PDSCH carrying the absolute index, which may also include the GFG configuration information message, remains the same over DL HARQ retransmissions within the same SFN, and thus soft combining is possible at the ED. For example, FIG. 3B is a timing diagram showing an example of RRC signaling under a DL HARQ procedure, wherein the RRC signaling includes an indication of the absolute time index $t_0$ to configure a grant-free common transmission cycle in accordance with an embodiment of the present disclosure.

For example, if the DL HARQ procedure had a $1^{st}$ retransmission, a GF ED may set the GF cycle reference time to $t_0$ as extracted from a 1st retransmission successfully decoded at time index t (as shown at 312). However, if t>($t_0$+GF Transmission Cycle Period), the GF cycle reference time can be increased iteratively by the GF Transmission Cycle Period until it is equal to or greater than the time index t. Furthermore, as shown in the lower case of FIG. 3B, if the ED fails to acknowledge successful decoding of the RRC message sent in SFN n, for instance, the base station may re-encode the RRC message into a new PDSCH after adjusting the absolute time index to point to the next earliest GF cycle reference time $t_1$ in SFN n+1 (as shown at 314) and so on.

In another embodiment, the GF transmission cycle reference time may not be indicated in a relative or absolute manner but rather implicitly deduced from the GF transmission cycle period. The time synchronization information that is common to all the GFG EDs, such as the SFN or subframe/slot number, can be used by the GFG EDs to deduce the GF transmission cycle reference time. For example, the GF ED can set its GF transmission cycle reference time to the subframe that satisfies the formulae, mod(Subframe Number, GF Cycle Period)=q, whereas GF Cycle Period is an integer number of subframes and q=0, 1, . . . , GF Cycle Period-1 is a GFG-specific parameter configurable through RRC signaling, for instance. In such case, two or more GF ED groups configured to use different GF transmission cycles of the same cycle period, can coexist in the same sub-band if they are configured to use different values of the q parameter.

Figure 4A:
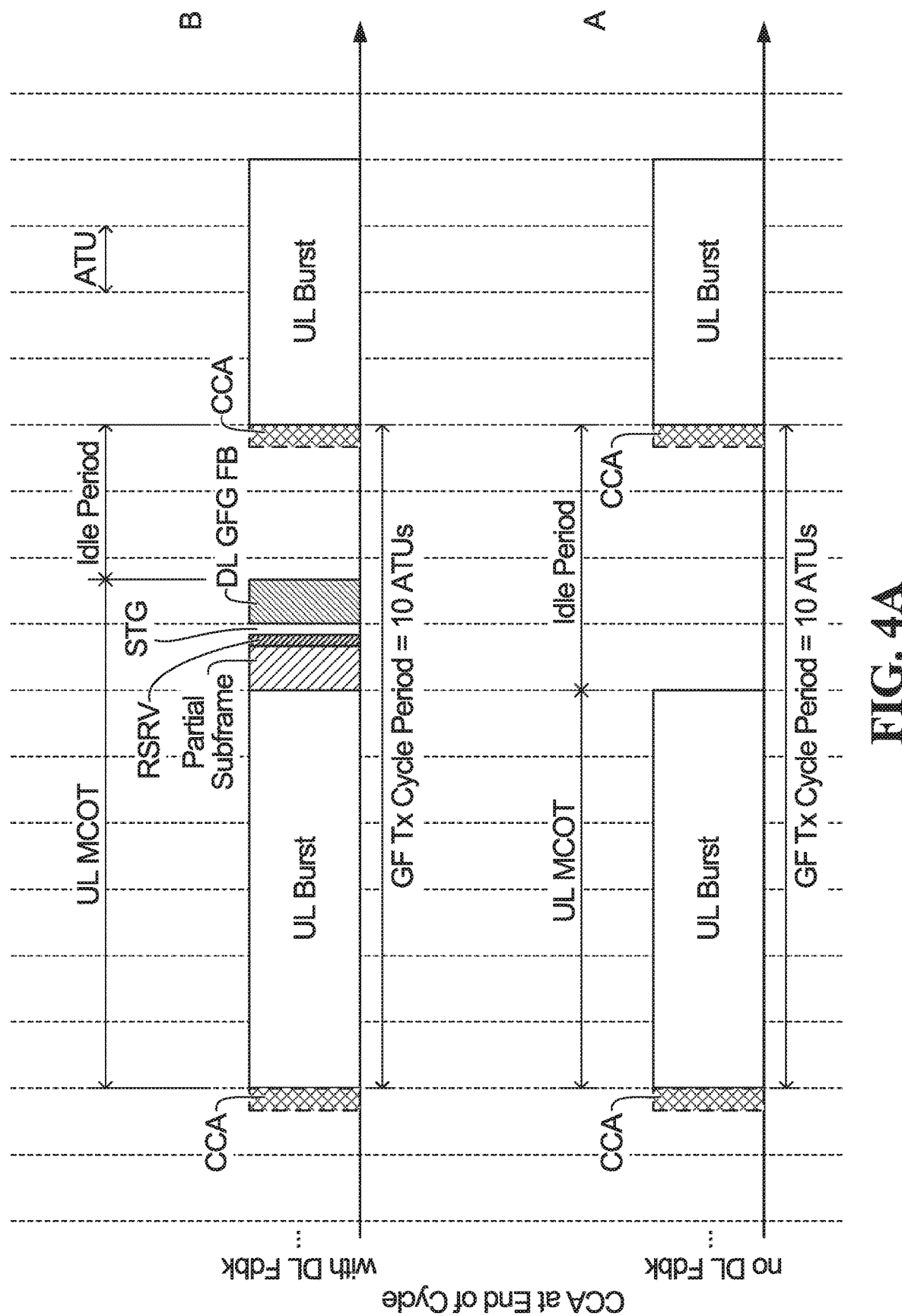
FIG. 4A is a timing diagram showing two examples of frame structures for grant-free uplink transmission in an unlicensed spectrum sub-band according to an embodiment of the present disclosure.
Figure 4B:
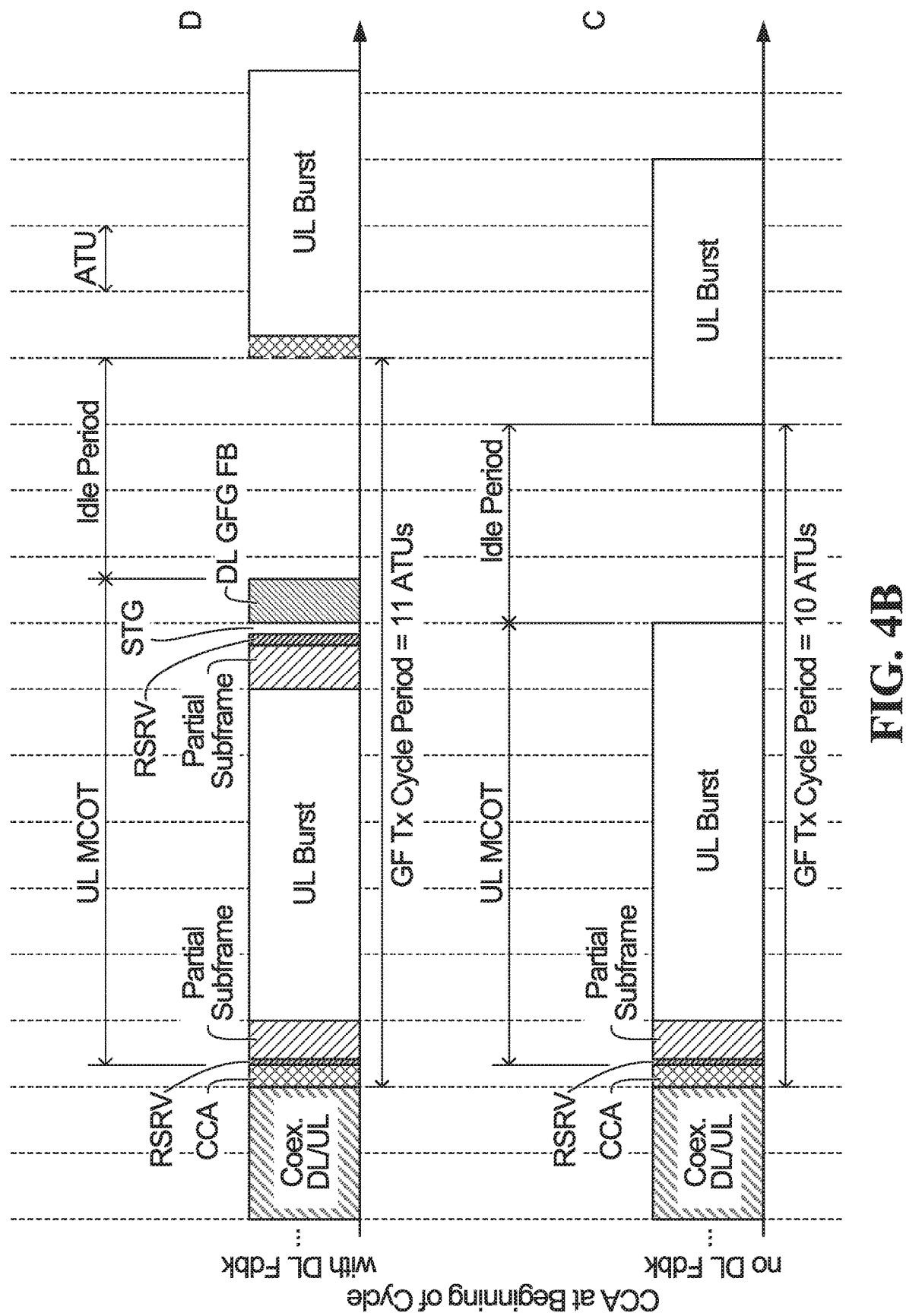
FIG. 4B is a timing diagram showing a further two examples of frame structures for grant-free uplink transmission in an unlicensed spectrum sub-band according to an embodiment of the present disclosure.

In some embodiments, the group-specific configuration information may also include a GF frame structure type/ index that indicates a predetermined GF frame structure that is to be used for GF UL transmission in the selected unlicensed spectrum sub-band. Examples of such frame structures are shown in FIGS. 4A and 4B. Each of the illustrated frame structures may be associated with a respective GF frame structure index value, and a base station may signal the GF frame structure type that is to be used by transmitting the corresponding GF frame structure index value as part of the group-specific configuration information.

GF Frame Structure Design for Common GF Transmission Cycle

The following factors may be considered in the design of the GF frame structure with an FBE-compliant GF transmission cycle in the unlicensed spectrum:

FBE regulatory requirements

Desired UL GF MCOT depending on

Desired UL burst length based on

Numerology of the unlicensed sub-band (e.g., SCS/OS duration, CP length)

Pre-configured TB transmission duration (e.g., in terms of number of OFDM symbols (OSs), which depends on a preconfigured TB size, the number of time-frequency resource elements per TB, and demodulation reference signal (DMRS) overhead)

Number of GF repetitions per TB

DL GFG feedback length, if any (e.g., in terms of number of OSs)

Desired ATU (e.g., slot, mini-slot, symbol)

Whether CCA occurs immediately before or immediately after the beginning of the new GF transmission cycle Period (for coexistence with other intra-base station DL/GB UL transmissions in the same sub-band).

Four examples of GF frame structures that were designed taking into consideration the aforementioned factors are shown in FIGS. 4A and 4B. In particular, FIGS. 4A and 4B are timing diagrams showing four examples of GF frame structures A, B, C and D for grant-free uplink transmission in an unlicensed spectrum sub-band based on a common GF transmission cycle in accordance with example embodiments of the present disclosure. In the GF frame structures A and B shown in FIG. 4A the CCA is performed at the end of the GF transmission cycle period meaning that the associated GF transmission can start at the beginning of the following GF transmission cycle period upon CCA success, whereas the CCA is performed at the beginning of the GF transmission cycle period in the GF frame structures C and D shown in FIG. 4B meaning that the associated GF transmission can start after the beginning of the same GF transmission cycle period upon CCA success in accordance with the boundary alignment requirement, e.g., symbol/slot/ mini-slot. Performing the CCA at the beginning of the GF transmission cycle period can potentially provide more CCA protection from coexisting transmissions managed by other base stations within the idle period at the end of the GF transmission cycle period. However, this potential increased protection comes at the expense of increased reservation overhead because the CCA occurs within the GF transmission cycle period and occupies a portion of the UL MCOT time span.

Referring to FIG. 4A, it is noted that frame structure B differs from frame structure A in that it includes a provision for DL GFG feedback to be transmitted by the base station at the end of the UL MCOT. In GF frame structure B, after a GF ED has finished transmitting its UL burst it may transmit a partial subframe at the ATU boundary followed by a reservation signal to act as "reservation" of the unlicensed spectrum sub-band (i.e. to act as interference to prevent other device's CCA's from seeing the unlicensed spectrum sub-band as being available during the UL MCOT). As such, the base station's downlink transmission of the DL GFG feedback can begin at the next ATU (e.g., slot, mini-slot, symbol) after a short time gap following the end of the reservation signal, RSRV. In some embodiments with relatively long OS duration, the RSRV duration is set to the OS duration less the short time gap such that the total duration of the partial subframe, the RSRV and the short time gap is equal to the ATU duration.

Referring to FIG. 4B, it is noted that, following a successful CCA, a reservation signal (RSRV) and a partial subframe are transmitted at the beginning of UL MCOT in both frame structures C and D so that the transmission of the UL burst begins at the next ATU following the successful CCA. In some embodiments with relatively long OS duration, the RSRV duration is set to the OS duration less the CCA duration such that the total duration of the CCA, the RSRV, and the partial subframe is equal to the ATU duration. Frame structure D differs from frame structure C in that it includes a provision for DL GFG feedback, DL GFG FB, to be transmitted by the base station at the end of the UL MCOT. In GF frame structure D, after a GF ED has finished transmitting its UL burst it transmits a partial subframe followed by a reservation signal for the same reasons as discussed above with respect to frame structure B. Similar to the frame structure B, in the frame structure D the base station's downlink transmission of the DL GFG feedback begins at the next ATU after a short time gap (STG) following the end of the reservation signal, RSRV.

The example GF frame structures A, B, C and D show ATU>CCA>short time gap. More generally, the ATU could be an OS, a slot, a mini-slot, or subframe.

For a base station to provision for DL critical/periodic signals, such as discovery reference signal (DRS) and paging, in the same unlicensed spectrum sub-band as GF UL transmissions, the target DL transmission period, e.g., the target DRS period, can be configured as an integer multiple of the GF Transmission Cycle Period and the GF Transmission Cycle Reference Time can be set such that the DL transmission falls within the idle period of the GF Transmission Cycle. Similarly, intra-base station coexisting DL or GB UL transmissions can be dynamically scheduled in the same unlicensed spectrum sub-band as GF UL transmissions so that the coexisting DL or GB UL transmissions start in the idle period and end before the CCA of a new GF Transmission Cycle. Another way of achieving such coexistence is by pre-emptively blanking the GB MCOT to accommodate the GF CCA, the GF UL burst, and possibly an RSRV followed by a short time gap, within its duration. In the latter case, the DL/GB UL grant can be accompanied, for instance, by a group common PDCCH using the GFG-RNTI to instruct the GF EDs to limit the current GF bursts, in compliance with the regulations, to an indicated length or to use a default length that has been pre-configured earlier, e.g., through RRC signaling.

FIG. 5 is a table showing examples of reservation overhead associated with the four frame structures A, B, C and D shown in FIGS. 4A and 4B, where reservation overhead is defined as the relative portion of the UL MCOT time span that is not used by the GF UL burst transmission. In particular, the table in FIG. 5 shows examples of reservation overhead associated with the four frame structures A, B, C and D for various relative lengths of OFDM symbol durations (OS), short time gap durations, and CCA durations (CCA). It is noted that in the table shown in FIG. 5, ceil( ) is the ceiling function and the notation "B+C" is used to indicate that the reservation overhead for frame structure D is the sum of the reservation overheads for frame structures B and C. It is further noted that the reservation overhead increases for each of the frame structures from frame structure A to frame structure D, with frame structure A having no reservation overhead and frame structure D having the most reservation overhead.

In some embodiments, in addition to the GF frame structure type/index the group-specific configuration information may also include an indication of ATU, short time gap, CCA, and DL GFG Feedback durations (if different from default values).

Figure 6A:
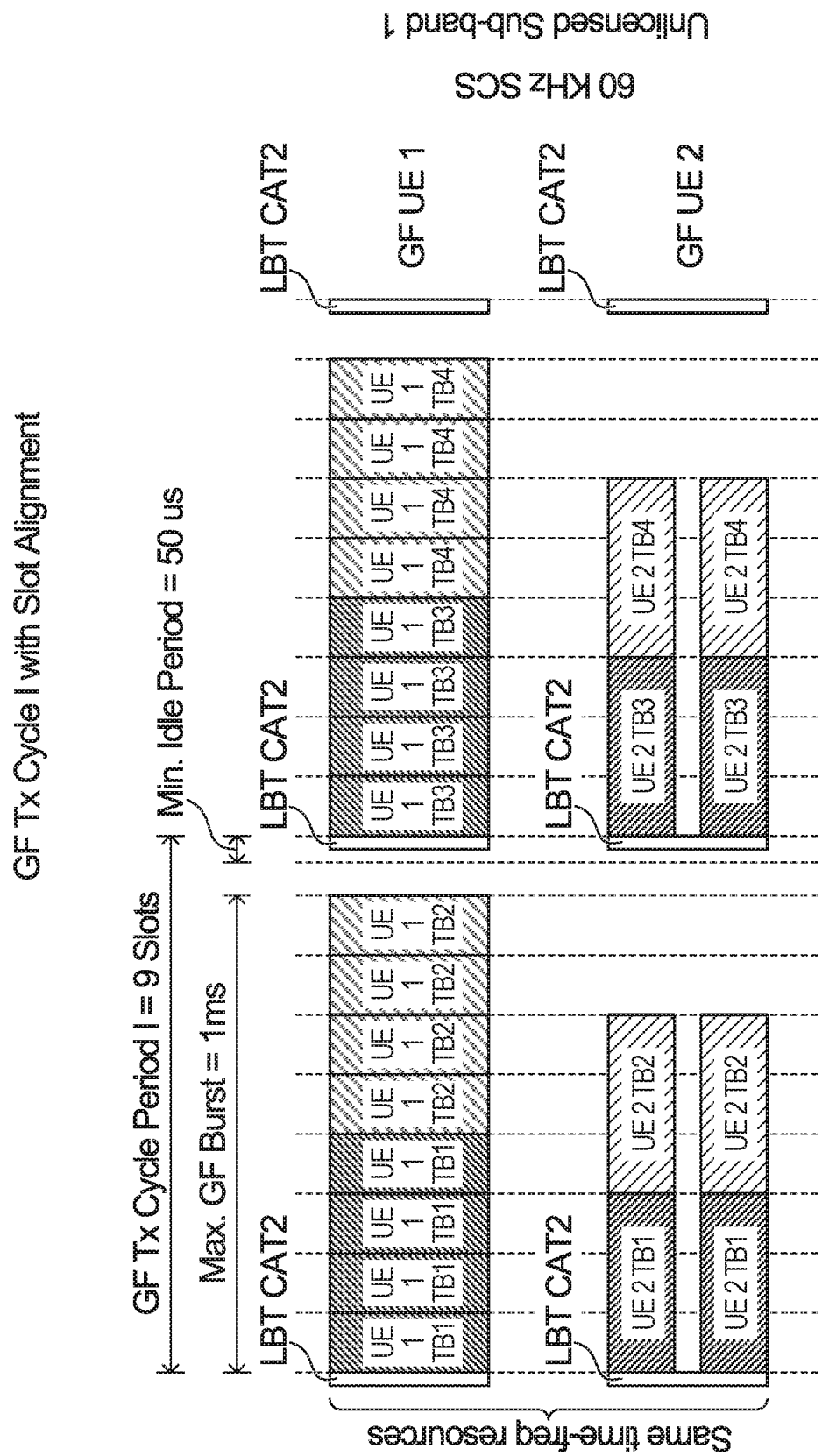
FIG. 6A is a timing diagram showing an example of unlicensed spectrum access procedures by first and second EDs configured to align their transmission starting times based on a common GF transmission cycle to access a first unlicensed spectrum sub-band for grant-free uplink transmission using a first frame structure in accordance with an embodiment of the present disclosure.
Figure 6B:
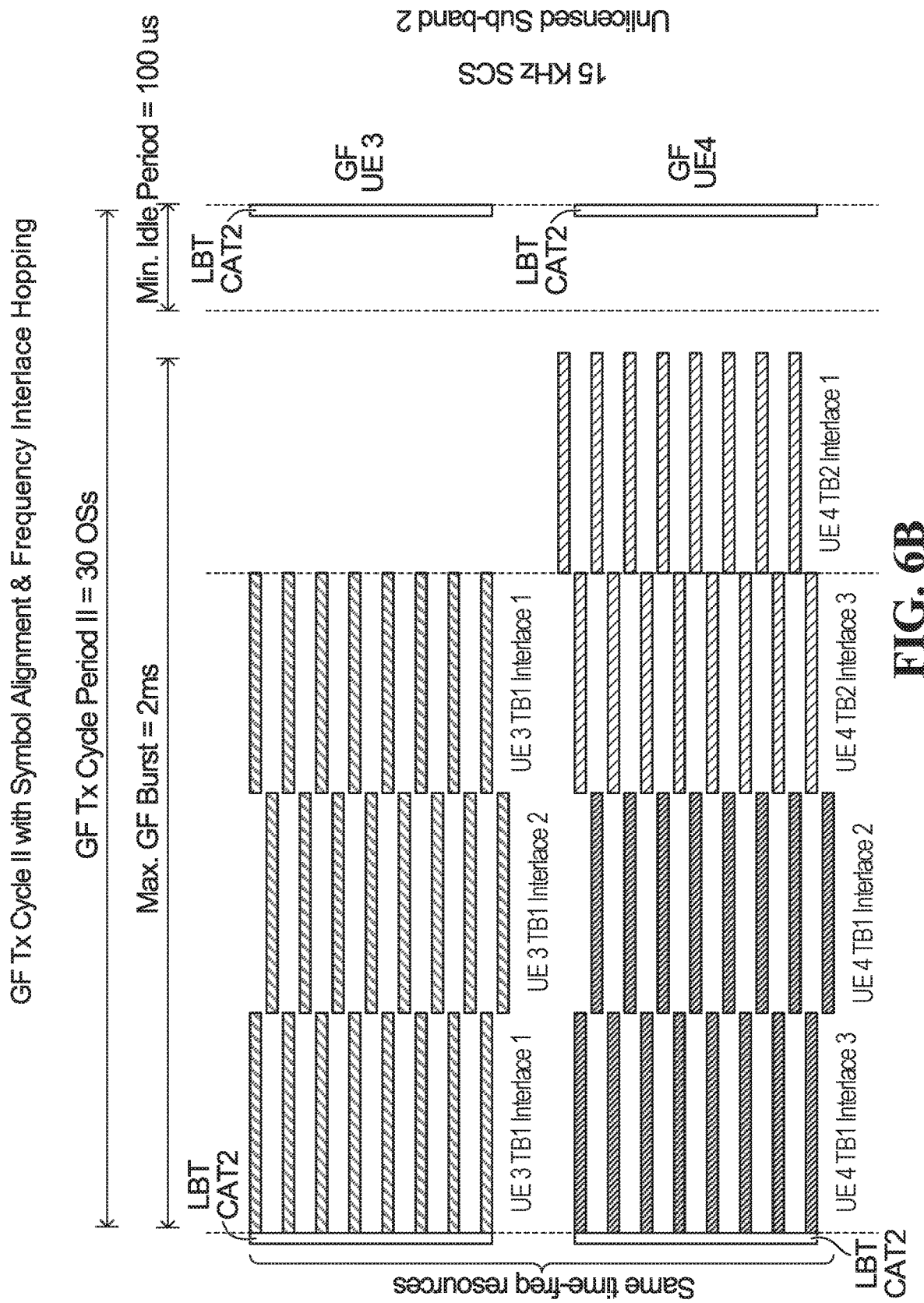
FIG. 6B is a timing diagram showing an example of unlicensed spectrum access procedures by third and fourth EDs configured to align their transmission starting times based on a common GF transmission cycle to access a second unlicensed spectrum sub-band for grant-free uplink transmission using the first frame structure in accordance with an embodiment of the present disclosure.

FIGS. 6A and 6B are timing diagrams showing an example of two GF transmission cycles of different periods and reference times being used on two different unlicensed spectrum sub-bands in accordance with an embodiment of the present disclosure. In particular, FIG. 6A is a timing diagram showing an example of unlicensed spectrum access procedures by first and second UEs, GF UE1 and GF UE2, configured to align their transmission starting times based on a first common GF transmission cycle to access a first unlicensed spectrum sub-band, Unlicensed Sub-band 1, for grant-free uplink transmission and FIG. 6B is a timing diagram showing an example of unlicensed spectrum access procedures by third and fourth UEs, GF UE3 and GF UE4, configured to align their transmission starting times based on a second common GF transmission cycle to access a second unlicensed spectrum sub-band, Unlicensed Sub-band 2, for grant-free uplink transmission.

It is noted that the GF UL transmissions shown in FIGS. 6A and 6B all use a frame structure type that is similar to the frame structure A shown in FIG. 4A, i.e., CCA at the end of the GF transmission cycle and no DL GFG feedback. However, the first common GF transmission cycle used by the first and second UEs in the first unlicensed spectrum sub-band in FIG. 6A is slot aligned (i.e. ATU=slot) with a GF transmission cycle period of 9 slots, and the second common GF transmission cycle used by the third and fourth UEs in the second unlicensed spectrum sub-band in FIG. 6B is symbol aligned (i.e. ATU=OS) with a GF transmission cycle period of 30 OSs.

It is also noted that the unlicensed spectrum procedures performed by GF UE1 and GF UE2 in Unlicensed Sub-band 1 are performed for/on the same time-frequency resources of Unlicensed Sub-band 1, but they have been shown separately in FIG. 6A so as to illustrate their features more clearly. The unlicensed spectrum procedures performed by GF UE3 and GF UE4 in Unlicensed Sub-band 2 are also performed for/on the same time-frequency resources of Unlicensed Sub-band 2, but are shown separately in FIG. 6B for the same reason.

As noted above, and shown by way of example in FIGS. 6A and 6B, in some embodiments of the present disclosure a GF UE may transmit multiple repetitions of a given TB within a GF UL burst, and may do so for more than one TB. For example, referring to FIG. 6A, it can be seen that after performing a successful LBT CAT 2 CCA, GF UE1 transmits four repetitions of two TBs, UE1 TB1 and UE1 TB2 within the GF UL burst that it transmits in the first GF transmission cycle period I. GF transmission cycle period I is nine slots long.

In both FIG. 6A and FIG. 6B the minimum idle period is configured to be 5% of the maximum GF burst length. For example, in FIG. 6A, the minimum idle period is 50 μs, which is 5% of the 1 ms maximum GF burst length. Similarly, in FIG. 6B, the maximum GF burst length is 2 ms and the minimum idle period is 100 μs.

As noted above, the GFGs of UEs share the time-frequency resources of their respective sub-bands, i.e., GF UE1 and GF UE2 share the time-frequency resources of Unlicensed Sub-band 1 and GF UE3 and GF UE4 share the time-frequency resources of Unlicensed Sub-band 2. However, that does not necessarily mean that the respective GF UL bursts within a given sub-band overlap on all of the same time-frequency resources within the sub-band. For example, the GF UL bursts transmitted by GF UE1 in the first and second GF transmission cycles shown in FIG. 6A occupy a contiguous band of time-frequency resources within Unlicensed Sub-band 1. In contrast, the GF UL bursts transmitted by GF UE 2 in the first and second GF transmission cycles shown in FIG. 6A occupy two frequency-separated bands of time-frequency resources within Unlicensed Sub-band 1. As another example, referring to FIG. 6B, it can be seen that GF UE3 and GF UE4 each use frequency interlace hopping when transmitting their respective GF UL bursts. That is, GF UE3 and GF UE4 each use a respective sequence of frequency interlaces to transmit their respective GF UL bursts within Unlicensed Sub-band 2 during one GF transmission cycle. In particular, GF UE3 uses a sequence of frequency interlaces that follows a pattern of Interlace 1, Interlace 2, and Interlace 1 over the course of three slots to transmit three repetitions of one TB, UE3 TB1, while GF UE4 uses a sequence of frequency interlaces that follows a pattern of Interlace 3, Interlace 2, Interlace 3, and Interlace 1 over the course of four slots to transmit two repetitions each of two TBs, UE4 TB1 and UE4 TB2 within Unlicensed Sub-band 2 during one GF transmission cycle.

Figure 7A:
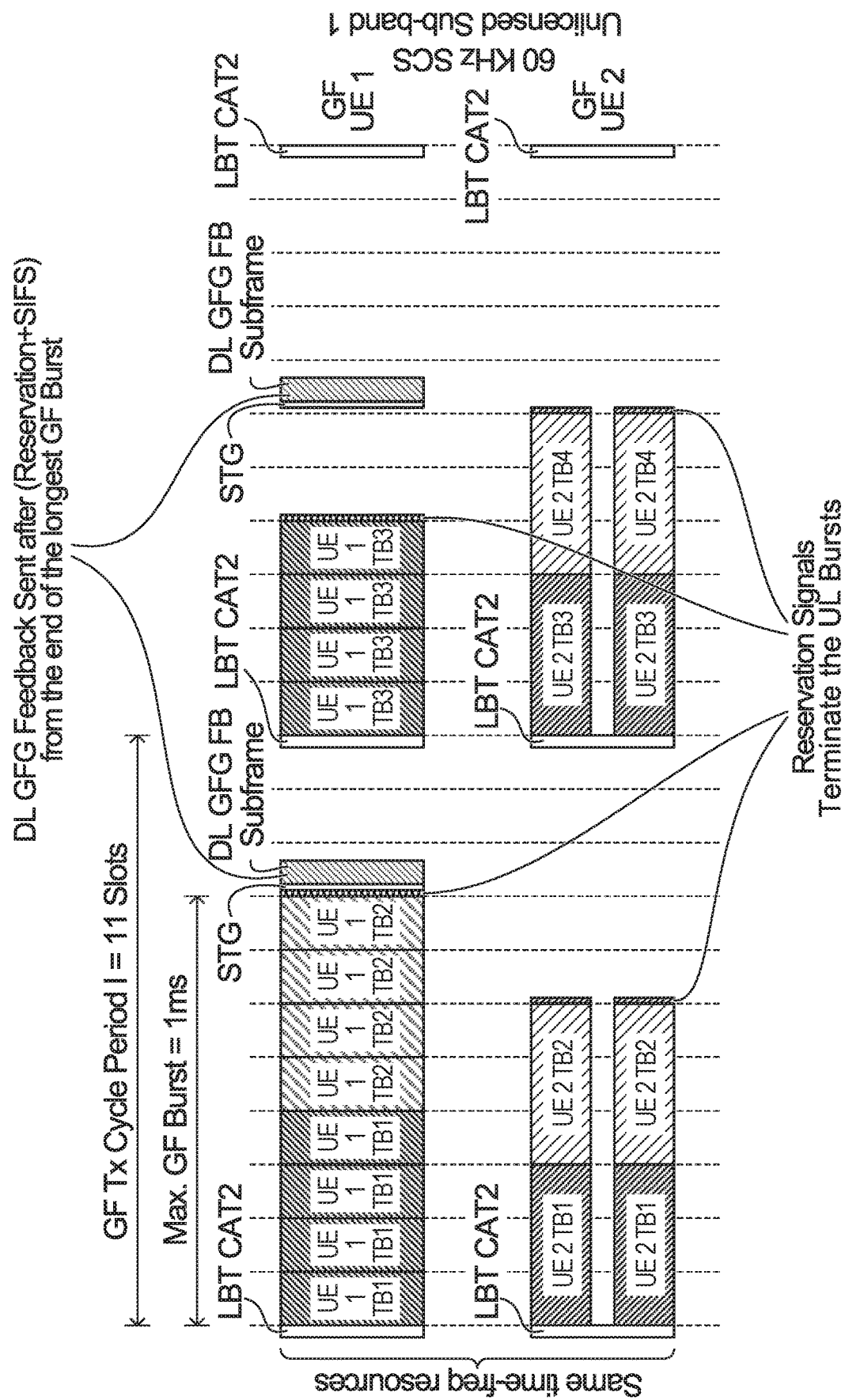
FIG. 7A is a timing diagram showing an example of unlicensed spectrum access procedures by first and second EDs configured to align their transmission starting times based on a common GF transmission cycle to access a first unlicensed spectrum sub-band for grant-free uplink transmission using a second frame structure in accordance with an embodiment of the present disclosure.
Figure 7B:
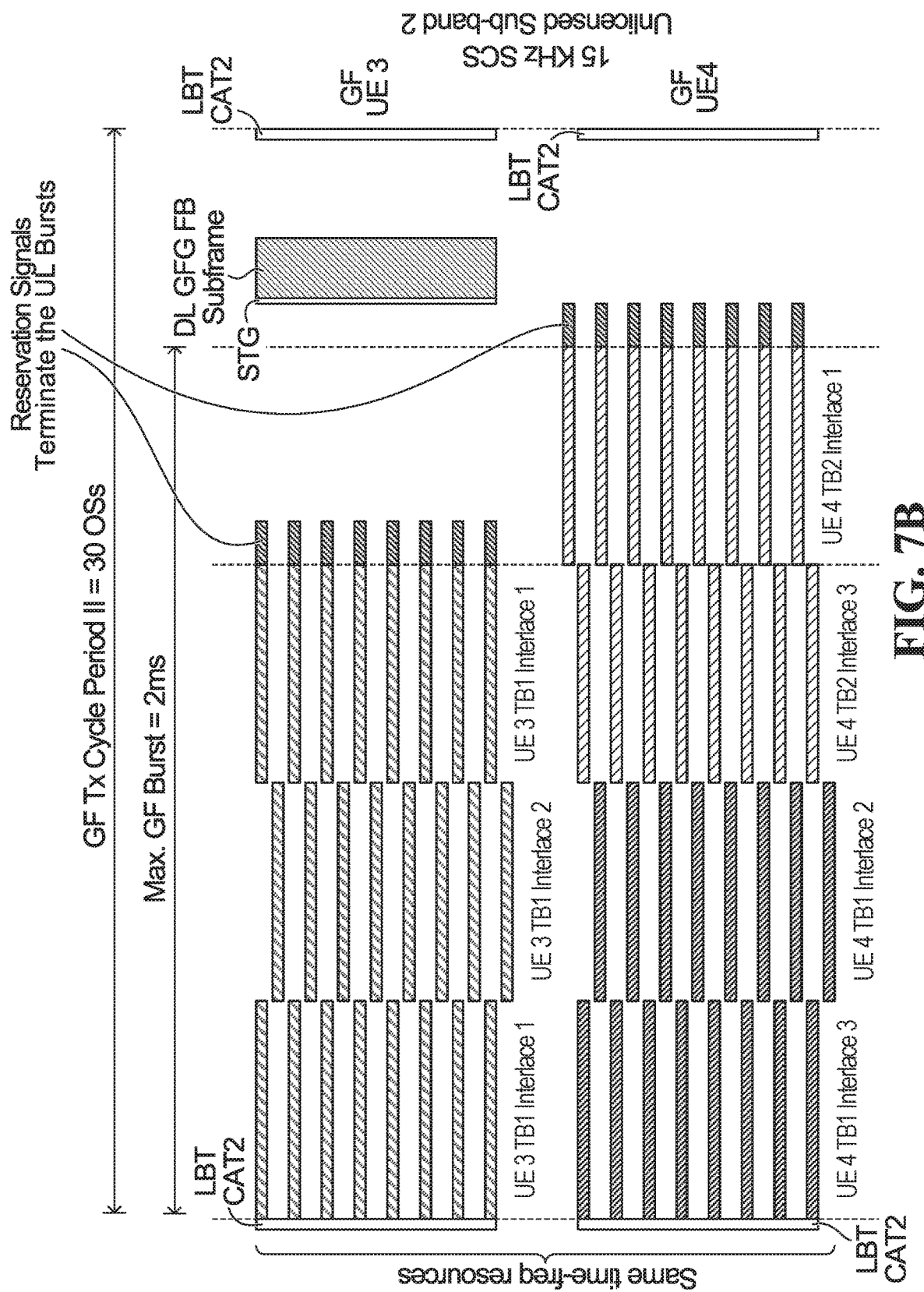
FIG. 7B is a timing diagrams showing an example of unlicensed spectrum access procedures by third and fourth EDs configured to align their transmission starting times based on common GF transmission cycles to access a second unlicensed spectrum sub-band for grant-free uplink transmission using the second frame structure in accordance with an embodiment of the present disclosure.

As noted above, the GF UL transmissions shown in FIGS. 6A and 6B all use a frame structure that is similar to the frame structure A shown in FIG. 4A. FIGS. 7A and 7B are timing diagrams showing another example of two GF transmission cycles of different periods and reference times being used on two different unlicensed spectrum sub-bands similar to the examples shown in FIGS. 6A and 6B, but in FIGS. 7A and 7B the GF UL transmissions use a frame structure that is similar to the frame structure B shown in FIG. 4A, i.e., CCA at the end of the GF transmission cycle with reservation signals terminating the end of the GF UL bursts and DL GFG feedback transmitted by the base station after a short time gap from the end of the longest GF UL transmission and before the end of the MCOT. One key difference though in the examples of FIGS. 7A and 7B from the more general frame structure B in FIG. 4A is that the DL GFG is required to align to the OS boundary and thus a partial subframe is not required. As a result of the additional reservation overhead associated with this frame structure, it is noted that the GF transmission cycle period I used in Unlicensed Sub-band 1 is increased to 11 slots in FIG. 7A compared to 9 slots in FIG. 6A.

Once a GF UL burst ends, a GF ED configured to use a type B/D frame structure, such as GF UE1, UE2, UE3 and UE 4 shown in FIGS. 7A and 7B transmits a reservation signal for a duration as discussed above with respect to FIGS. 4A and 4B.

In some embodiments, the GF ED follows by monitoring the common search space for DL GFG feedback only at the beginning of each OS or each ATU within the remaining time span of the MCOT and using the GFG-RNTI to identify the DL GFG feedback for the GFG to which it belongs.

In other embodiments, the GF ED may extend its GF transmission to occupy the maximum portion of configured UL MCOT so that the GFG Feedback time is known a priori, and hence, the computational complexity of the GF ED searching the common search space using the GFG-RNTI may be reduced. There are multiple ways in which a GF burst can be extended. For example, one option would be to extend the reservation signal at the end of the GF UL burst until it partially occupies the ATU in which the short time gap is applied according to the configured UL MCOT. A second option would be to exceed the number of pre-configured GF repetitions so that the GF UL burst occupies the ATUs until the one containing the short time gap according to the configured UL MCOT. A third option would be a combination of the first two options. A fourth option would be to override the pre-configured GF transport format and perform rate matching to occupy the ATUs until the one containing the short time gap according to the configured UL MCOT, i.e., employing a lower MCS. The new MCS could be indicated to the base station in a wideband PUCCH carrying UCI at the beginning of the GF UL Burst, for example. Another option to indicate, or at least narrow down the base station's blind detection required to identify, the new MCS would be to transmit a front-loaded pilot or DMRS that differs from a default pilot or DMRS. The transmission of the different pilot of DMRS could explicitly indicate or narrow down the possible new MCS, or it may instead indicate a scaling factor between the original GF burst length and the rate-matched length according to the configured MCOT. A third option to indicate the new MCS to the base station would be to transmit an UL RRC signal, using the pre-configured MCS according to the pre-configured GF transport format, before the useful portion of the GF UL burst, e.g., during or instead of the 1st reservation/partial subframe signal in frame structure type D, to indicate the new rate matching MCS. The UL RRC signal may instead indicate the scaling factor between original GF burst length and the rate-matched length according to the configured MCOT.

GFG Feedback Contents and Transmission for Common GF Transmission Cycle

For embodiments of the present disclosure in which a group of EDs are configured to align their GF transmission starting times to a common GF transmission cycle characterized by a GF transmission cycle reference time and a GF transmission cycle period, the GFG DCI message transmitted as part of the GFG feedback message may contain one or more of the following as feedback from the base station: GFG Ack/Nack feedback; a MCS increase/decrease command for base station-directed DCLLA or UL CSI feedback for ED-directed link adaptation; a Transmit Power Control (TPC) increase/decrease command, e.g., if DCI format 3/3A is not employed separately. The GFG feedback message may include M ED-specific fields that include information bits that provide the foregoing ED-specific feedback(s), where M is the number of GF EDs in the GFG.

Figure 8:
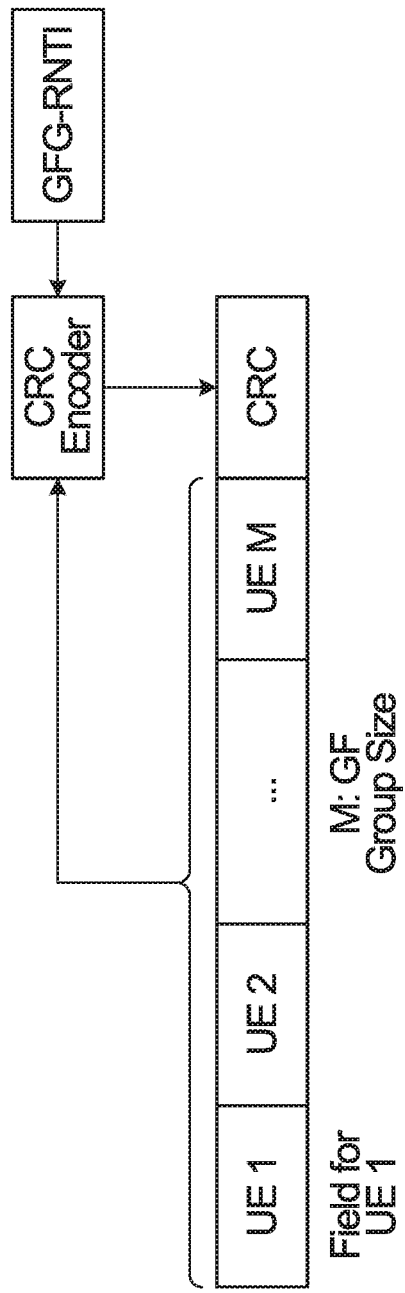
FIG. 8 is a block diagram of an example encoder for forming a grant-free group feedback message in accordance with an embodiment of the present disclosure.

FIG. 8 is a block diagram of an example encoder for forming a grant-free group feedback message in accordance with an embodiment of the present disclosure. The encoder is implemented with a cyclic redundancy check (CRC) encoder that takes the bits of M ED-specific fields and uses the GFG-RNTI to generate a CRC code that it appends to the M ED-specific fields to form the GFG feedback message. As such, only in—group EDs sharing the GFG-RNTI can decode the DL GFG feedback message.

The ED-specific Ack/Nack filed within the GFG feedback may include multiple bits (L), where L may be as large as the maximum number of TBs that can be transmitted during the maximum GF burst length, e.g., based on TB duration and the number of repetitions K. Alternatively, L may be as large as the maximum number of code block groups (CBGs) that can be transmitted during the maximum GF burst length. If decoding delay precludes feeding back Ack/Nack feedback for some GF transmission(s) at the end of the longest burst, especially if low-density parity-check (LDPC) is not used, the L bits of Ack/Nack feedback may include L-m bits from the current GF burst and m bits from the previous GF burst. The parameter m may be ED-specific, determined by the base station based on the ED's capability and sent to the ED within the RRC configuration message as part of the format information of its dedicated field in the DL GFG feedback. The base station can determine m for each ED as follows for instance; m=ceil (CBG decoding delay/CBG Tx duration), where ceil( ) is the ceiling function, CBG decoding delay is the decoding delay associated with the ED's decoding a CBG, and CBG Tx duration is the time duration associated with transmission of a CBG by the ED according to the pre-configured resources and transport format.

In general, there are two ways GFG feedback may be transmitted. A first option is to transmit GFG feedback separately, without multiplexing with other DL control and data. In such cases, no LBT is required. However, the GFG feedback data should be at least distributed to a minimum channel bandwidth in order to comply with OCB regulatory requirements, if applicable. A second option is to transmit GFG feedback together with other DL control and data, e.g., other PDCCH and PDSCH with no specific requirement in resource mapping for the GFG feedback data. In such cases, LBT is required together with the downlink transmission.

In some embodiments, the physical time-frequency resources used to transmit the GFG DCI message may be distributed over a single unlicensed channel of the GF sub-band, e.g., over a single 20 MHz unlicensed channel, according to a Interleaved Frequency Division Multiple Access (IFDMA) scheme with interleaved tones, a resource block (RB) interlace scheme, or as multi-clustered RBs. Alternatively, the number of unlicensed channels of the GF sub-band on which the GFG DCI message are distributed may depend on the message size (M, $L_{A/N}$, $L_{TPC}$, $L_{DCLLA}$) and the mapping to control channel elements (CCEs). This number may be indicated to GF EDs in an RRC signal, for example.

As noted previously, there may be various circumstances in which it is desirable to switch a GF ED from contention-based GF uplink transmission to GB uplink transmission, e.g., for the retransmission of a TB. For example, for a GF ED experiencing bad channel conditions and/or persistent harmful collisions, switching a TB to contention-free GB transmission is often desired to ensure successful decoding and/or to exploit link adaptation of uplink scheduling by the base station. Therefore, in some embodiments, a base station may transmit a switching grant message to a GF ED to indicate to the GF ED that a GB uplink transmission has been scheduled for the GF ED for retransmission of a TB.

Figure 9:
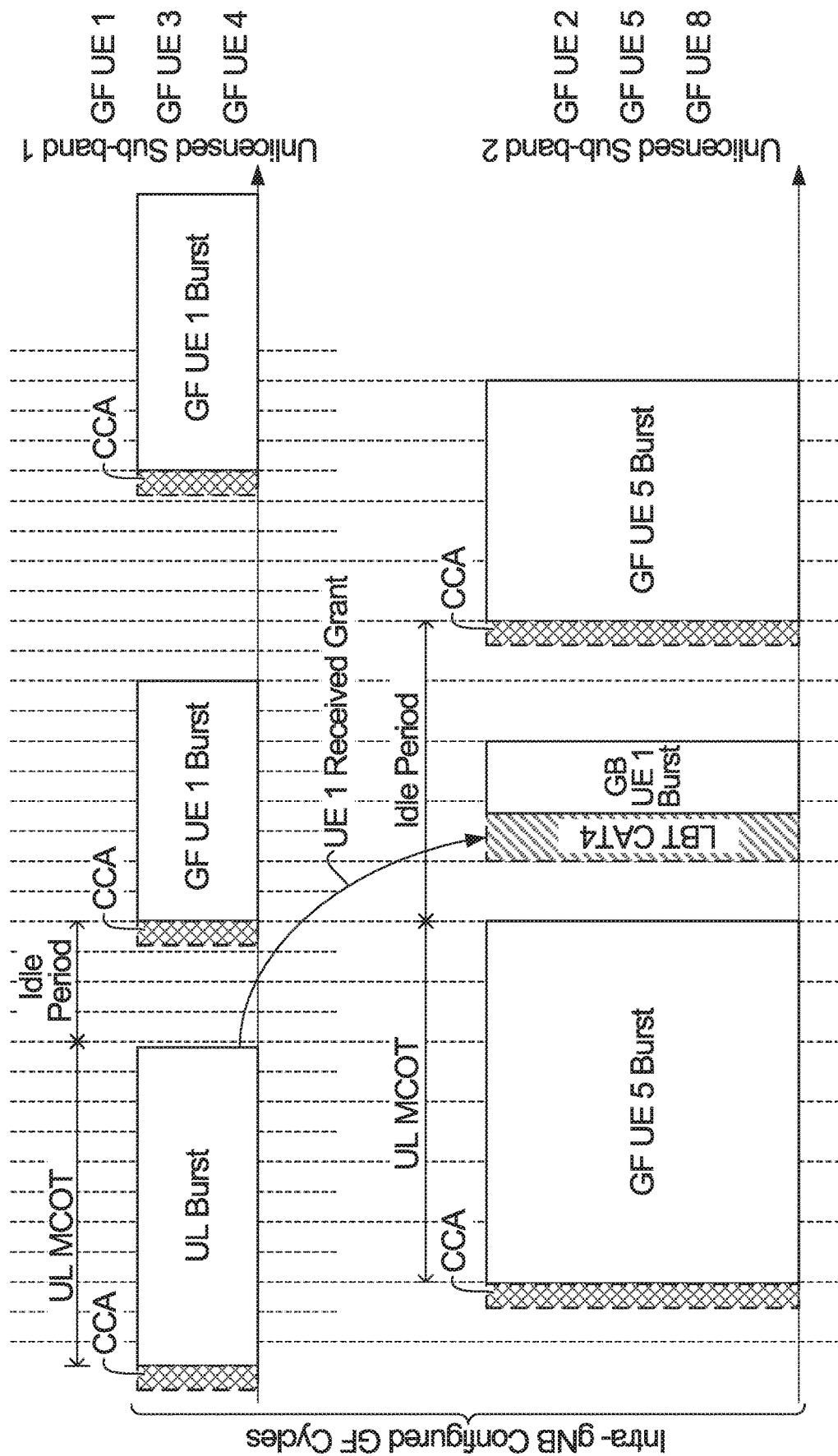
FIG. 9 is a timing diagram showing an example of a first ED that is configured to perform a synchronous CCA based on a first common GF transmission cycle to access a first unlicensed spectrum sub-band for grant-free uplink transmission being granted an uplink transmission grant for a second unlicensed spectrum sub-band and subsequently performing a CCA to access the second unlicensed spectrum sub-band for grant-based uplink transmission in accordance with an embodiment of the present disclosure.

FIG. 9 is a timing diagram showing an example of a first ED that is configured to align its GF transmission starting time to a first common GF transmission cycle to access a first unlicensed spectrum sub-band for grant-free uplink transmission being granted an uplink transmission grant for a second unlicensed spectrum sub-band, in accordance with an embodiment of the present disclosure. In the example scenario shown in FIG. 9, a first group of three UEs, namely GF UE1, GF UE3 and GF UE4, have been configured to align their GF transmission starting times to a first common GF transmission cycle to access a first unlicensed spectrum sub-band, namely Unlicensed Sub-band 1, for GF uplink transmission, and a second group of three UEs, namely GF UE2, GF UE5 and GF UE8, have been configured to align their GF transmission starting times to a second common GF transmission cycle to access a second unlicensed spectrum sub-band, namely Unlicensed Sub-band 2, for GF uplink transmission. It is noted that the first and second common GF transmission cycles configured for the two Unlicensed sub-bands are asynchronous, i.e., they feature different reference times and/or different cycle periods.

As shown in FIG. 9, GF UE1 receives a switching grant message from a base station/gNB within the Idle Period of the first common GF transmission cycle configured for Unlicensed Sub-band 1; the DL resources used for transmitting the grant are not shown though. The switching grant message indicates that GF UE1 has been granted a scheduling grant for a GB UL transmission in Unlicensed Sub-band 2. The GB UL transmission may be for the retransmission of a TB that was previously transmitted by GF UE 1 via GF UL transmission in Unlicensed Sub-band 1, for example. The previously transmitted TB may have been transmitted by GF UE 1 in the GF UL burst immediately preceding the Idle Period in which the switching grant message is received, or it may have been previously transmitted in an earlier GF UL burst. The GB UL transmission for GF UE 1 has been scheduled by the base station so that it targets the Idle Period of the second common GF transmission cycle configured for Unlicensed Sub-band 2. In accordance with the switching grant message, GF UE 1 subsequently performs a CCA procedure to access the time-frequency resources of Unlicensed Sub-band 2 in order to transmit the scheduled GB uplink transmission. In some embodiments, the CCA procedure for GB UL transmission may be different than the CCA procedure for GF UL transmission. For example, GF UE 1 may be configured to perform an FBE-compliant LBT CAT2 CCA procedure for its GF UL burst transmissions in Unlicensed Sub-band 1, and be configured to perform an LBE-compliant LBT CAT4 CCA for its GB UL burst transmission in Unlicensed Sub-band 1. In some embodiments, the switching grant message may include information that indicates an LBT category (e.g. CAT2 or CAT4) and a GB frequency region or sub-band in which the GB uplink transmission for the ED has been scheduled/granted. In some other embodiments, the grant message may indicate that the ED is allowed to transmit a new TB according to the granted resources and LBT type indicated.

GF Transmission Cycle Numerology

As noted above, and shown by way of example in FIGS. 6A, 6B, 7A, 7B and 9, the aligned GF transmission cycles used by a group of GF EDs for a given unlicensed spectrum sub-band can be asynchronous with respect to the aligned GF transmission cycles used for other unlicensed spectrum sub-band(s), and the respective numerologies and ATUs used in different unlicensed spectrum sub-bands may also be different. For example, referring to FIGS. 6A and 7A, the sub-band numerology used in Unlicensed Sub-band 1 is shown as having a 60 KHz SCS. In contrast, referring to FIGS. 6B and 7B, the sub-band numerology used in Unlicensed Sub-band 2 is shown as having a 15 kHz SCS.

Frame structures have been proposed that are flexible in terms of the use of differing numerologies. As previously noted, a numerology is defined as the set of physical layer parameters of the air interface that are used to communicate a particular signal. A numerology is described in terms of at least SCS and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

The 3GPP Release 14 specification discussed earlier includes channel access priority classes for devices accessing a physical uplink shared channel (PUSCH) using LTE-based eLAA. In some embodiments of the present disclosure, unlicensed channel access priority classes for accessing unlicensed spectrum for GF UL transmission may similarly be defined by adopting the same values specified for Release 14 eLAA PUSCH MCOT, $T_{utmcot,p}$, per channel access priority class index, p, among the design values to achieve the minimum GF Transmission Cycle, i.e., with the most frequent medium access attempts. FIGS. 10A, 10B, 10C, 10D, 11A, 11B, 11C and 11D depict tables that include examples of unlicensed channel access priority classes that are mapped to priority class indices in accordance with such embodiments. In particular, FIGS. 10A-10D depict four tables showing priority classes and associated channel access parameters\numerologies based on the four frame structures A, B, C and D of FIGS. 4A and 4B for different sub-band SCSs and cyclic prefix lengths in a 5 GHz unlicensed spectrum band, and FIGS. 11A-11D depict a further four tables showing similar priority classes and associated numerologies in a 60 GHz unlicensed spectrum band.

In order to comply with the European FBE regulatory requirements discussed earlier, the following design rules were used to determine the priority classes and associated numerologies:

UL GF MCOT=Max. UL GF Burst+Reservation Overhead+Partial Subframe(s)+Short Time Gap+DL GFG Feedback [ms], Min. GF Transmission Cycle Period=Ceil (1.05*UL GF MCOT/Alignment Time Unit [ms]) [ATUs], Alignment Time Unit (ATU) is a Slot (7 OSs NCP/6 OSs ECP), One-shot CCA duration=PIFS=25 µs, and Short Time Gap=SIFS=16 µs, where UL GF MCOT is the maximum channel occupancy time for a medium access opportunity, Max. UL GF Burst is the maximum GF UL burst length, Reservation Overhead is the reservation overhead discussed previously with reference to FIG. 5, Short Time Gap is a short inter-frame space or an UL to DL switching gap, DL GFG Feedback is the duration of a DL GFG feedback message transmitted by a base station, Alignment Time Unit is the durations of an alignment time unit, e.g. a slot in this example, and Ceil( ) is the ceiling function.

In some embodiments, a QoS priority class is assigned to a GF ED for GF UL traffic based on the delay tolerance of the traffic and/or the overall volume of traffic that is intended for GF UL transmission. For example, because an ED that is configured to align its GF transmission starting time to a common GF transmission cycle will be allowed to assess the unlicensed medium for UL transmission only every GF transmission cycle period, in some embodiments:

A higher priority class (lower priority class index) featuring a shorter Min. GF transmission cycle period and UL MCOT may be assigned to accommodate UL traffic that is less delay-tolerant so that medium access opportunities to transmit UL traffic occur more frequently; and A lower priority class (higher priority class index) featuring a longer Min. GF transmission cycle period and UL MCOT may be assigned to accommodate a larger volume of UL traffic.

In the numerology examples shown in FIGS. 10A-10D and 11A-11D, the following options are selected for illustrative purposes:

Minimum GF transmission cycle period is targeted for maximum medium access opportunities, Four different frame structure designs described earlier, i.e., frame structures A, B, C, and D shown in FIG. 5, DL GFG Feedback duration=2 OSS, Sub-band resource numerologies applicable to unlicensed carrier frequency, e.g.:

FIGS. 10A-10D show example numerologies for the following five SCS+cyclic prefix combinations and a 5 GHz unlicensed carrier frequency: 15 KHz SCS+NCP, 30 KHz SCS+NCP, 30 KHz SCS+ECP, 60 KHz SCS+NCP, 60 KHz SCS+ECP; and FIGS. 11A-11D show example numerologies for the following five SCS+CP combinations and a 60 GHz unlicensed carrier frequency: 240 KHz SCS+NCP, 480 KHz SCS+NCP, 480 KHz SCS+ECP, 960 KHz SCS+NCP, 960 KHz SCS+ECP.

In the example access parameter sets shown in FIGS. 10A-10D and 11A-11D the GF transmission cycles are aligned to a slot ATU. For example, the last column of the tables shown in FIGS. 10A-10D and 11A-11D express the minimum GF transmission cycle period in integer multiples of units of LTE slots in accordance with the equations for MM. GF Transmission Cycle Period provided above. However, a GF transmission cycle period may be aligned to a different alignment time unit, such as a mini-slot or a symbol in other embodiments.

The use of different numerologies can allow the coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. The signaling can be done in a dynamic or a semi-static manner, for example in a control channel such as the physical downlink control channel (PDCCH) or in downlink control information (DCI). Based on this signaling, the ED may determine the parameters of the selected numerology from other information, such as a look-up table of candidate numerologies stored in memory.

Further GFG Configuration Information

As noted above, in some embodiments a group of EDs are configured to align their GF transmission starting times for a given unlicensed spectrum sub-band to a DL GFG common time alignment signal. In such embodiments, the configuration information sent to the GFG EDs may further include information related to GF transmission timing, such as information indicating a one-shot CCA duration to be used (if different from default, i.e., 25 µsec) and/or information indicating a transmission starting time. For example, the information indicating a transmission starting time may indicate that GF UL burst transmission should start on the next OS after a short time gap from the end of the DL signal (transmission of a reservation signal by individual GFG EDs may be required) or after multiple OSs following the next OS (transmission during a partial sub-frame by individual GFG EDs is required) so that the start of GF UL burst transmission is aligned to the start of the next sub-frame.

In some embodiments, a base station may provide GFG feedback via a DL GFG feedback message either separately or within the DL GFG common time alignment signal. In such embodiments, the configuration information sent to a group of GF EDs configured to align their GF transmission starting times for a given unlicensed spectrum sub-band to a DL GFG common time alignment signal may further include information indicating a Group Ack/Nack Index Shift n (if different from a default, e.g., n=1) to indicate which previous GF UL burst transmission a GFG Ack/Nack feedback applies to, e.g., the immediately preceding GF UL burst transmission (i.e. n=1), or the GF UL burst transmission before that (i.e. n=2), etc. A GF ED may search its pre-configured Ack/Nack field corresponding to its UL transmission j within the GFG feedback message that may be transmitted separately but concurrently with, or as part of, the DL common time alignment signal j+n even if the GF ED does not intend to transmit a GF UL transmission in response to the DL common time alignment signal j+n. Note that, in embodiments where the Group Ack/Nack Index Shift n is employed, each GF ED may maintain a record of the last n GF bursts it transmitted. The record contains the HARQ process IDs/CBG IDs included in each GF burst. As an alternative way of associating the Ack/Nack feedback with corresponding GF transmissions, the associated HARQ process IDs/CBG IDs can be directly indicated in the DL GFG common feedback message either explicitly or implicitly.

Figure 12:
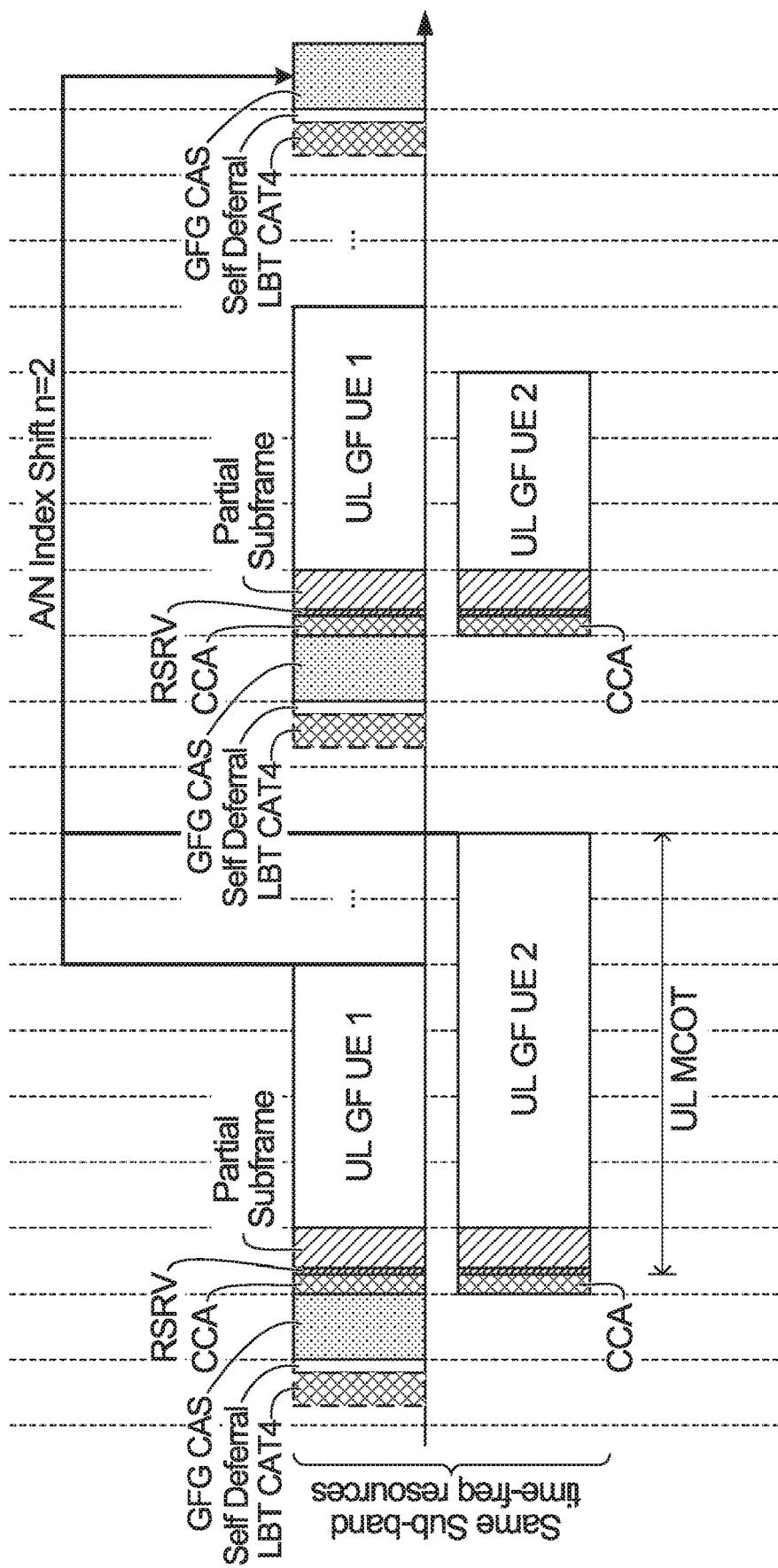
FIG. 12 is a timing diagram showing an example of unlicensed spectrum access procedures by first and second EDs configured to align their transmission starting times based on a common grant-free group alignment message to access an unlicensed spectrum sub-band for grant-free uplink transmission in accordance with an embodiment of the present disclosure.

As noted above, in some embodiments, a base station may be configured to transmit the GFG common time alignment signal on a periodic or semi-periodic basis, i.e. transmit a periodic DL GFG common time alignment signal with a target GF cycle period following a successful LBT procedure, which can facilitate UL transmission of periodic sounding reference signals (SRS) or periodic channel state information (CSI) feedback. In such embodiments, in addition to the information related to GF transmission timing, and possibly a Group Ack/Nack Index Shift n, the group-specific configuration information to configure the GFG EDs may further include information related to periodicity of UL SRS transmission and/or periodicity of UL CSI feedback transmission. For example, the group-specific configuration information may further include information indicating that GF EDs should periodically transmit UL SRS every $N_{srs}$ GFG common time alignment signals, where $N_{srs}$ is an integer ≥1, and/or information indicating that GF EDs should transmit UL CSI feedback every $N_{csi}$ GFG common time alignment signals, where $N_{csi}$ is an integer 1. It is noted that $N_{srs}$ and/or $N_{csi}$ can be configured differently for each of the GFG EDs such that, for instance, each configuration RRC signal carries to the GFG ED its respective values of $N_{srs}$ and/or $N_{csi}$ in addition to the respective reference times for individual GFG EDs to initiate each of the SRS and CSI transmission cycles based on the periodic/semi-periodic transmission of the DL GFG common alignment signal. FIG. 12 is a timing diagram showing an example of unlicensed spectrum access procedures by first and second GF UEs, GF UE 1 and GF UE 2, configured to align their transmission starting times based on a common GFG time alignment signal to access an unlicensed spectrum sub-band for grant-free uplink transmission in accordance with an embodiment of the present disclosure.

As shown in FIG. 12, following a successful CCA (e.g., an LBT CAT4 CCA), a base station transmits a GFG time alignment message, GFG Trigger, on time-frequency resources of the unlicensed spectrum sub-band. The base station may transmit the GFG time alignment message after a self-deferral period or after transmitting a reservation signal so that its transmission is aligned to a particular ATU, e.g., slot-aligned. GF UE 1 and GF UE 2 are part of the GFG to which the GFG time alignment message pertains and are configured to align their GF transmission times to the end of the GFG time alignment message, which will cause their CCAs to be synchronized. If the CCA (e.g. an LBT CAT 2 CCA) performed by a GF UE is successful, then the GF UE may transmit a GF UL bursts within an UL MCOT following the successful CCA. In some embodiments, prior to transmitting a GF UL burst, a GF UE may transmit a reservation signal (RSRV) and a partial subframe at the beginning of UL MCOT following a successful CCA so that the transmission of the GF UL burst is aligned to a particular ATU, e.g., slot-aligned. For example, in FIG. 12, both GF UE 1 and GF UE 2 transmit a reservation signal and a partial subframe so that their respective GF UL bursts start at the next ATU following their successful CCAs. This process is repeated at some point after the end of the UL MCOT to again trigger potential time-aligned GF UL transmissions from the GFG.

As noted previously, in some embodiments the GFG time alignment message may include, or may be concurrent in the same common search space with, a GFG feedback message that provides, for example, GFG Ack/Nack feedback related to previous GF UL burst(s). For example, as shown in the example embodiment illustrated in FIG. 12, the third GFG Common Alignment signal (GFG CAS) includes a Group Ack/Nack Index Shift n=2, indicating that the GFG Ack/Nack feedback that is included as part of the third GFG Common Alignment signal is related to TBs/CBGs that were transmitted in the GF UL bursts that were aligned to the first GFG Common Alignment signal.

To provision for DL critical/periodic signals in the same unlicensed spectrum sub-band as the GF UL transmissions, such as DRS and paging, the base station may avoid transmitting the GFG Common Alignment signal a guard period before the time that the base station intends to transmit the DL critical/periodic signal(s), or the base station may indicate to the GFG the maximum number of slots/subframes from the end of the Common Alignment signal before which all GF UL bursts must end so that the DL critical/periodic signal(s) can be transmitted between the end of the last GF UL burst and before the next GFG Common Alignment signal.

Figure 13:
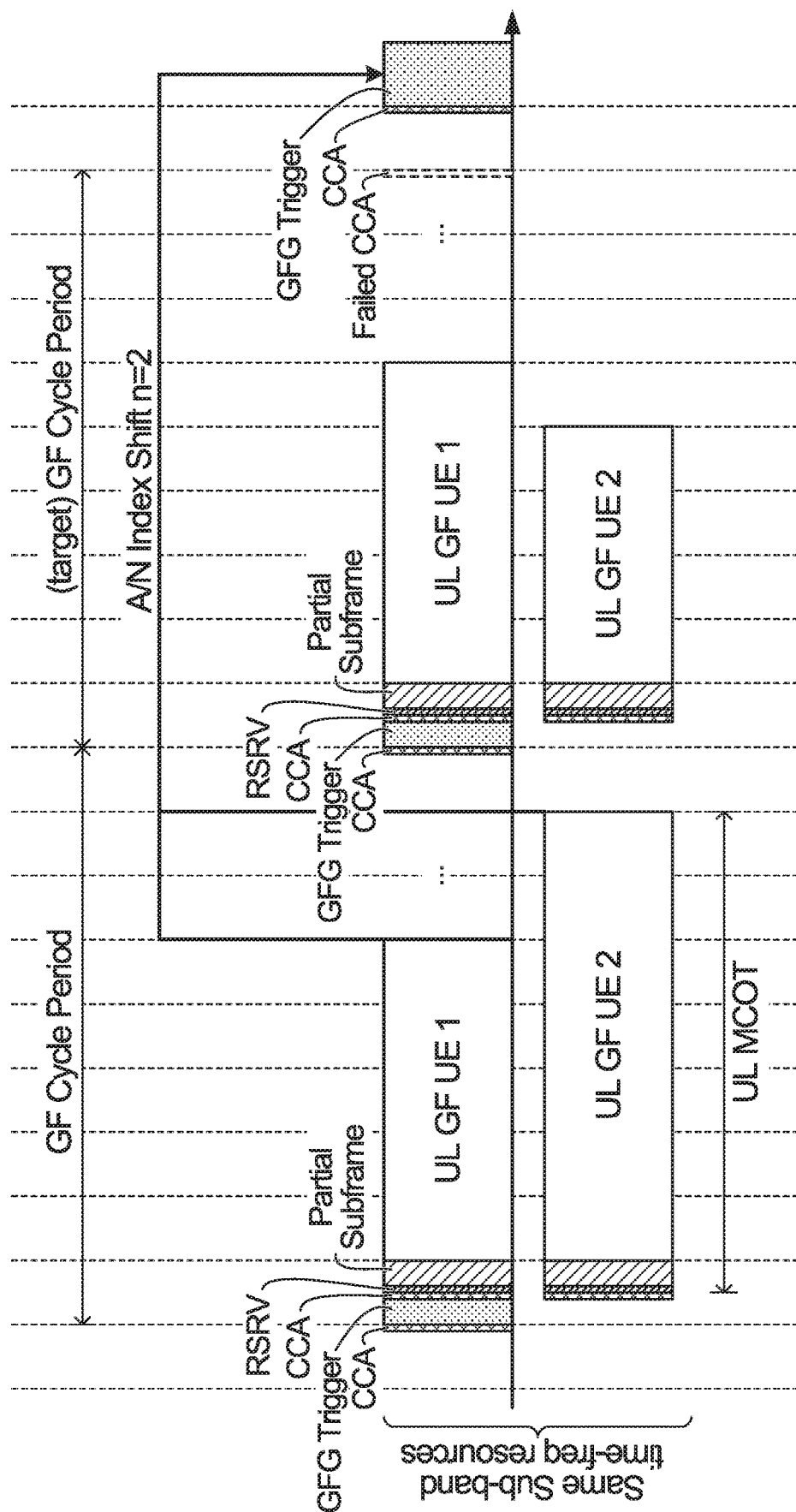
FIG. 13 is a timing diagram showing an example of unlicensed spectrum access procedures by first and second EDs configured to align their transmission starting times based on a periodic common grant-free group alignment message to access an unlicensed spectrum sub-band for grant-free uplink transmission in accordance with an embodiment of the present disclosure.

As noted above, in some embodiments, a base station may be configured to transmit the GFG common time alignment signal on a periodic basis. FIG. 13 is a timing diagram showing an example of unlicensed spectrum access procedures by first and second GF UEs, GF UE 1 and GF UE 2, configured to align their transmission starting times based on a periodic common grant-free group alignment message to access an unlicensed spectrum sub-band for grant-free uplink transmission in accordance with an embodiment of the present disclosure.

The unlicensed spectrum access procedures shown in FIG. 13 are similar to those shown in FIG. 12, except that in the embodiment depicted in FIG. 13, the base station transmits the GFG time alignment or trigger signal with a target GF period following a successful LBT procedure. Because of the target periodicity of this transmission, the LBT procedure that the base station uses to access the unlicensed spectrum band may differ from that used in the embodiment depicted in FIG. 12. For example, the LBT procedure performed by the base station for the embodiment shown in FIG. 13 may be a LBT CAT2 CCA. Although the base station may target a particular periodicity for the transmission of the GFG Common Alignment signal, the base station may find the unlicensed spectrum to be unavailable/busy when it performs a CCA at a targeted period interval. An example of this is shown in FIG. 13, where a CCA performed by the base station fails (shown as Failed CCA in FIG. 13) at a targeted GF period interval. In order to try to minimize the deviation from the target periodicity, while also maintaining the alignment with the intended ATU, the base station performs another CCA at the next ATU following the Failed CCA, thus resulting in a semi-periodic transmission of the GFG Common Alignment signal. In FIG. 13, the CCA at the next ATU succeeds and the base station then transmits a GFG Common Alignment signal. In some embodiments the base station may persistently perform subsequent CCAs at each of the subsequent ATUs until a subsequent CCA succeeds within a fixed time window after which the medium access attempt is deferred until the next targeted GF period interval.

In other embodiments, semi-periodicity may be realized if the CCA at a targeted GF period interval fails and the base station defers its medium access attempt until the next targeted GF period interval.

It is noted that in the example embodiments shown in FIGS. 12 and 13 the unlicensed spectrum procedures performed by GF UE1 and GF UE2 are performed for/on the same time-frequency resources of the unlicensed sub-band, but they have been shown separately in FIGS. 12 and 13 so as to illustrate their features more clearly.

Figure 14A:
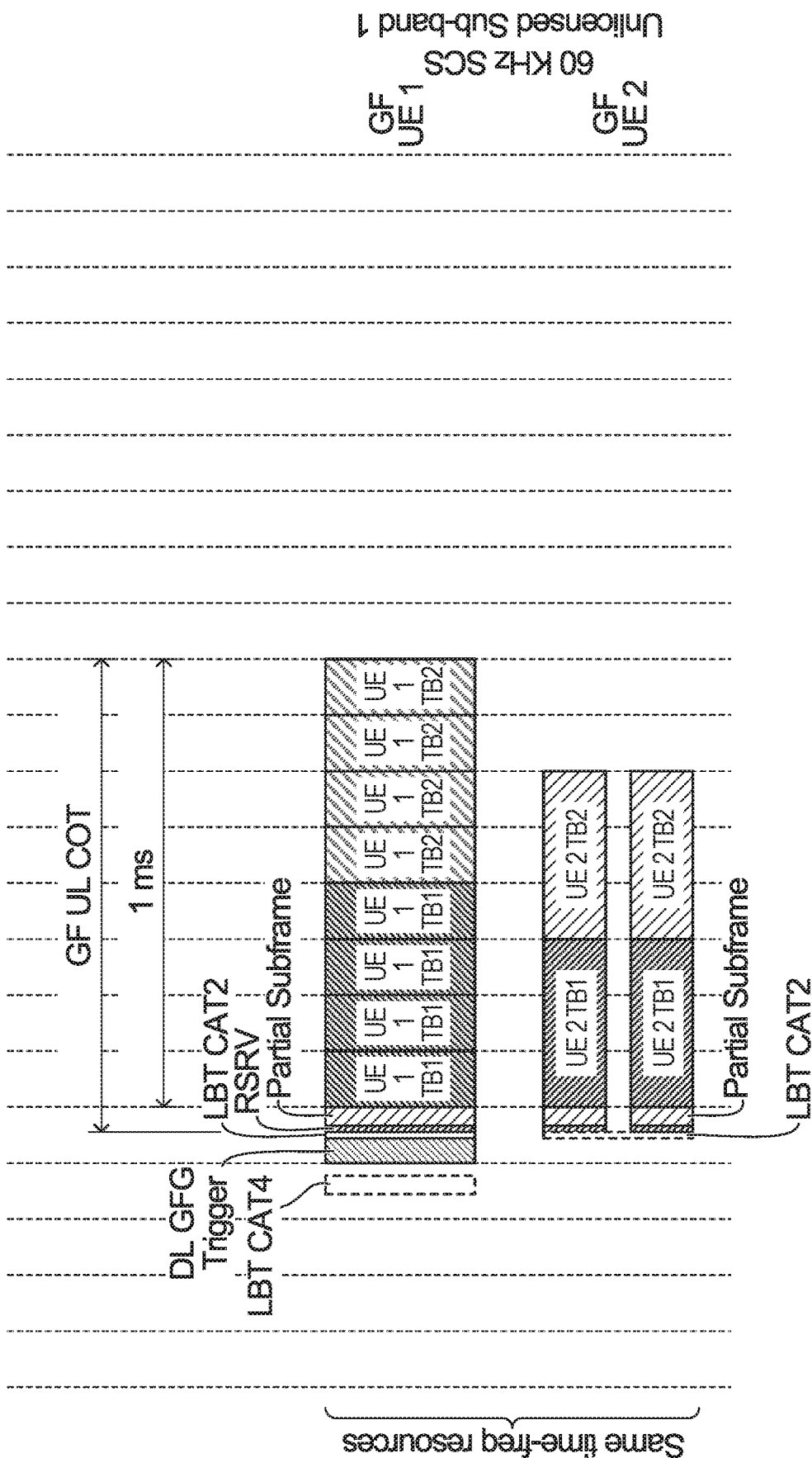
FIG. 14A is a timing diagram showing an example of unlicensed spectrum access procedures by first and second EDs configured to align their transmission starting times based on a common grant-free group alignment message to access a first unlicensed spectrum sub-band for grant-free uplink transmission in accordance with an embodiment of the present disclosure.
Figure 14B:
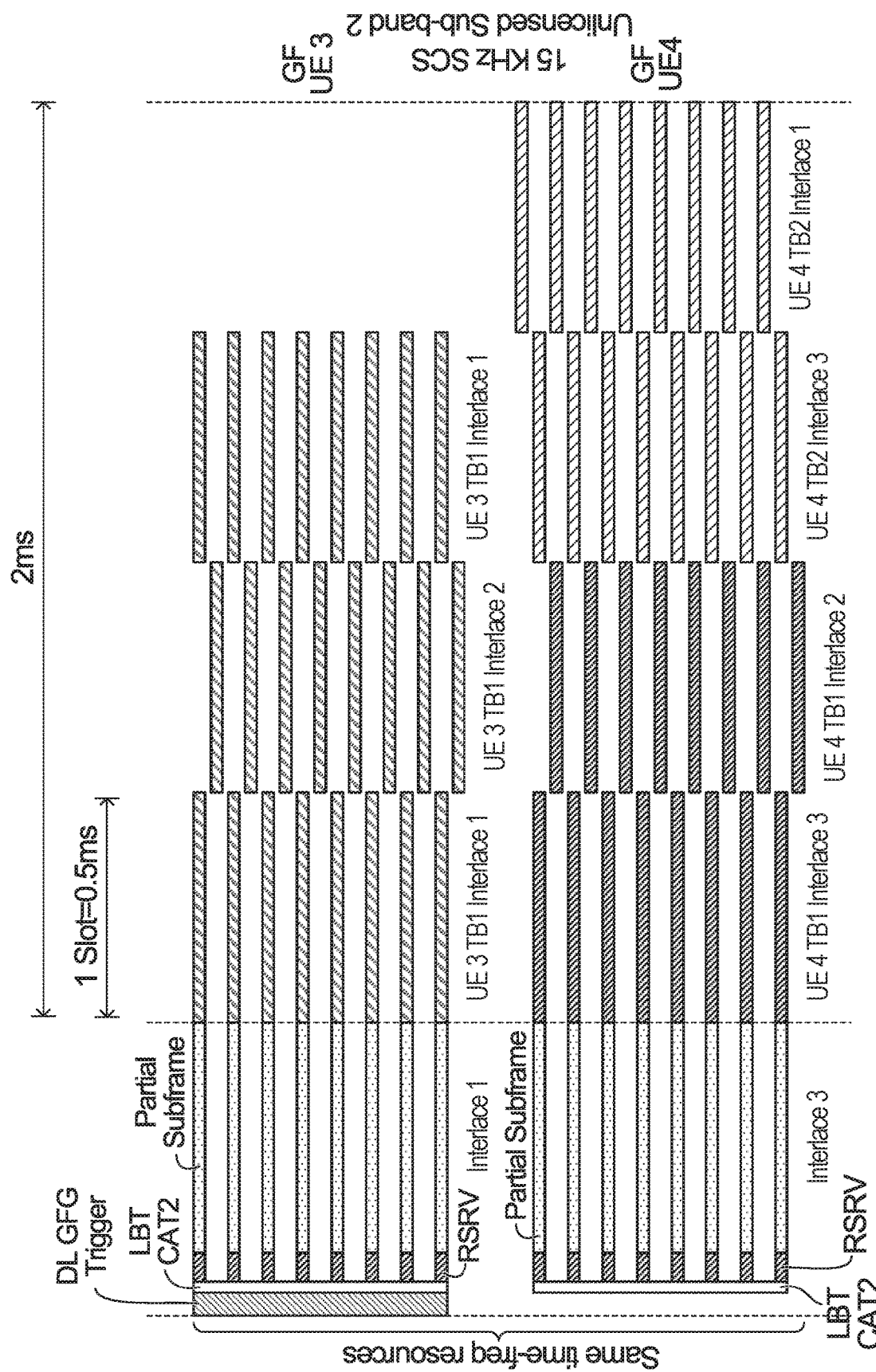
FIG. 14B is a timing diagram showing an example of unlicensed spectrum access procedures by third and fourth EDs configured to align their transmission starting times based on a common grant-free group alignment message to access a second unlicensed spectrum sub-band for grant-free uplink transmission in accordance with an embodiment of the present disclosure.

FIGS. 14A and 14B are timing diagrams showing an example of two asynchronous GF CCAs based on two asynchronous common grant-free group alignment signals being used on two different unlicensed spectrum sub-bands in accordance with an embodiment of the present disclosure. In particular, FIG. 14A is a timing diagram showing an example of unlicensed spectrum access procedures by first and second UEs, GF UE1 and GF UE2, configured to align their transmission starting times based on a first common grant-free group alignment signal to access a first unlicensed spectrum sub-band, Unlicensed Sub-band 1, for grant-free uplink transmission and FIG. 14B is a timing diagram showing an example of unlicensed spectrum access procedures by third and fourth UEs, GF UE3 and GF UE4, configured to align their transmission starting times based on a second common grant-free group alignment signal to access a second unlicensed spectrum sub-band, Unlicensed Sub-band 2, for grant-free uplink transmission.

It is noted that the unlicensed spectrum procedures performed by GF UE1 and GF UE2 in Unlicensed Sub-band 1 are performed for/on the same time-frequency resources of Unlicensed Sub-band 1, but they have been shown separately in FIG. 14A so as to illustrate their features more clearly. The unlicensed spectrum procedures performed by GF UE3 and GF UE4 in Unlicensed Sub-band 2 are also performed for/on the same time-frequency resources of Unlicensed Sub-band 2, but are shown separately in FIG. 14B for the same reason.

As noted above, and shown by way of example in FIGS. 14A and 14B, in some embodiments of the present disclosure a GF UE may transmit multiple repetitions of a given TB within GF UL burst, and may do so for more than one TB. For example, referring to FIG. 14A, it can be seen that after performing a successful LBT CAT 2 CCA, GF UE1 transmits four repetitions of two TBs, UE1 TB1 and UE1 TB2 within the subsequent GF UL burst.

As noted above, the GFGs of UEs share the time-frequency resources of their respective sub-bands, i.e., GF UE1 and GF UE2 share the time-frequency resources of Unlicensed Sub-band 1 and GF UE3 and GF UE4 share the time-frequency resources of Unlicensed Sub-band 2. However, that does not necessarily mean that the respective GF UL bursts within a given sub-band overlap on all of the same time-frequency resources within the sub-band. For example, the GF UL burst transmitted by GF UE1 in FIG. 14A occupies a contiguous band of time-frequency resources within Unlicensed Sub-band 1. In contrast, the GF UL burst transmitted by GF UE 2 in FIG. 14A occupies two frequency-separated bands of time-frequency resources within Unlicensed Sub-band 1. As another example, referring to FIG. 14B, it can be seen that GF UE3 and GF UE4 each use frequency interlace hopping when transmitting their respective GF UL bursts. That is, GF UE3 and GF UE4 each use a respective sequence of frequency interlaces to transmit their respective GF UL bursts within Unlicensed Sub-band 2. In particular, GF UE3 uses a sequence of frequency interlaces that follows a pattern of Interlace 1, Interlace 2, and Interlace 1 over the course of three slots to transmit three repetitions of one TB, UE3 TB1, while GF UE4 uses a sequence of frequency interlaces that follows a pattern of Interlace 3, Interlace 2, Interlace 3, and Interlace 1 over the course of four slots to transmit two repetitions each of two TBs, UE4 TB1 and UE4 TB2 within Unlicensed Sub-band 2.

As shown in FIGS. 14A and 14B, for each of the unlicensed spectrum sub-bands, Unlicensed Sub-band 1 and Unlicensed Sub-band 2, following a successful CCA (e.g., an LBT CAT4 CCA) on the respective sub-band the base station transmits a respective GFG time alignment message, on time-frequency resources of the sub-band. The main function of the common time alignment/trigger signal is to align the GFG transmission starting times. However, the common time alignment signal may include some DCI content to address the GFG EDs. An enclosed GFG DCI message in the GFG common time alignment signal may therefore contain one or more of the feedbacks from base station discussed below.

GFG Feedback Contents and Transmission for GFG Common Time Alignment Signal

For embodiments of the present disclosure in which a group of EDs are configured to align their GF transmission starting times to a common time alignment signal that carries GFG DCI messages, the GFG DCI message transmitted as part of the GFG common time alignment/trigger signal may contain one or more of the following as feedback from the base station: GFG Ack/Nack feedback; a MCS increase/decrease command for base station-directed DCLLA or UL CSI feedback for ED-directed link adaptation; a Transmit Power Control (TPC) increase/decrease command, e.g., if DCI format 3/3A is not employed separately; a SRS trigger; a CSI feedback trigger.

The GFG feedback message may include M ED-specific fields that include information bits that provide the foregoing ED-specific feedback(s), where M is the number of GF EDs in the GFG.

A CRC encoder similar to the one shown in FIG. 8 may be used to form the GFG feedback message for GFGs configured for synchronous CCAs based on a common CCA time alignment/trigger signal. For example, the GFG feedback message may be formed by a CRC encoder that takes the bits of M ED-specific fields and uses the GFG-RNTI to generate a CRC code that it appends to the M ED-specific fields to form the GFG feedback message.

The ED-specific GFG Ack/Nack feedback may include multiple bits (L), where L may be as large as the maximum number of TBs that can be transmitted during the maximum GF burst length, e.g., based on TB duration and the number of repetitions K. Alternatively, L may be as large as the maximum number of code block groups (CBGs) that can be transmitted during the maximum GF burst length.

The SRS trigger and the CSI feedback trigger may be included so as to trigger the GF EDs to transmit SRS and CSI feedback on the unlicensed spectrum band as part of their respective GF UL bursts following receipt of the common time alignment/trigger signal.

In some embodiments, the physical time-frequency resources used to transmit the GFG DCI message may be distributed in the frequency domain in order to comply with OCB regulatory requirements. For example, in some embodiments, the transmission resources may be distributed over a single unlicensed channel of the GF sub-band, e.g., over a single 20 MHz unlicensed channel, according to a Interleaved Frequency Division Multiple Access (IFDMA) scheme with interleaved tones, a resource block (RB) interlace scheme, or as multi-clustered RBs. Alternatively, the number of unlicensed channels of the GF sub-band on which the GFG DCI message are distributed may depend on the message size (M, $L_{A/N}$, $L_{TPC}$, $L_{DCLLA}$) and the mapping to control channel elements (CCEs). This number may be indicated to GF EDs in an RRC signal, for example.

Figure 15:
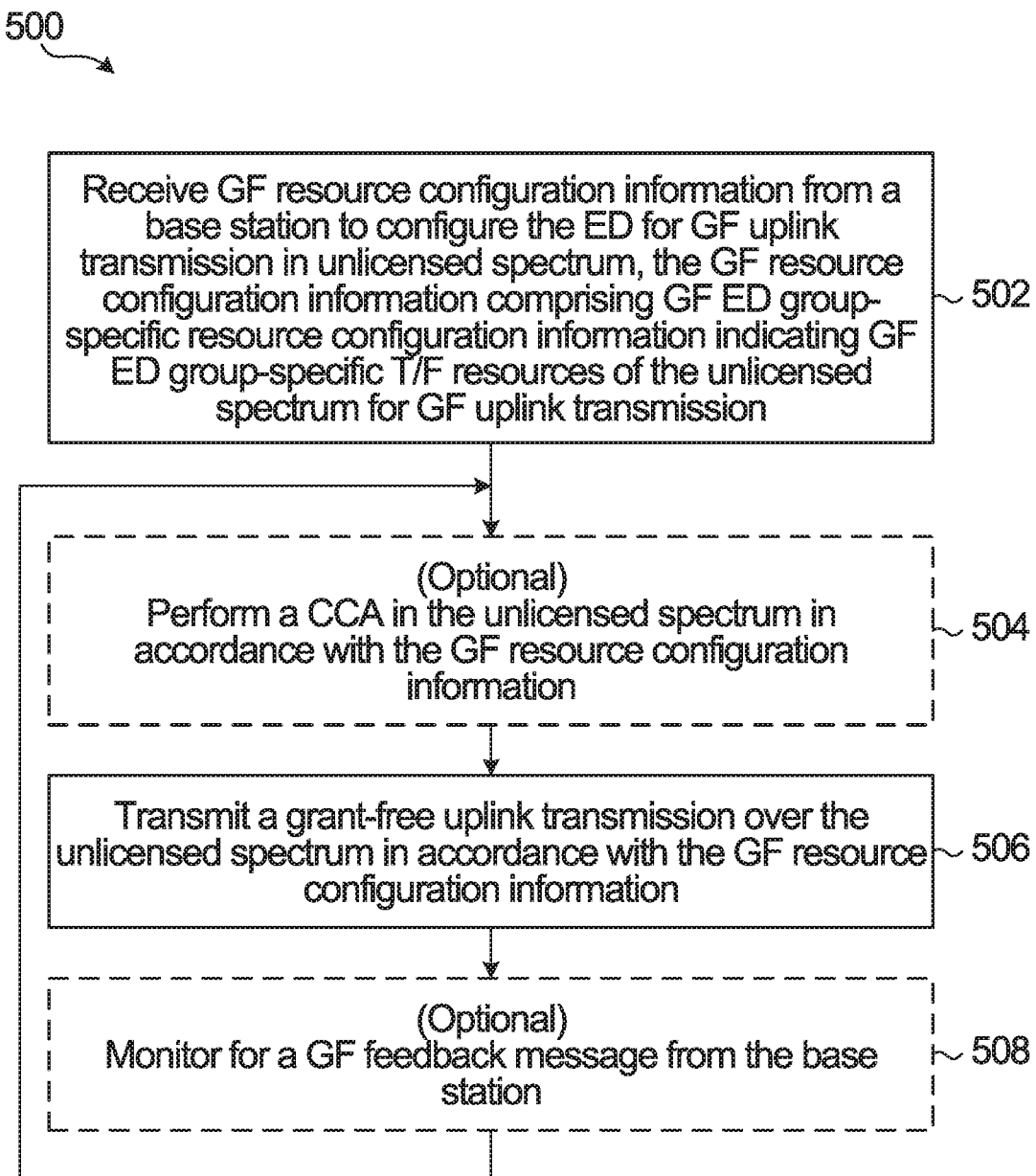
FIG. 15 is a flow diagram of example operations in an ED in accordance with an embodiment of the present disclosure.

FIG. 15 is a flow diagram of example operations 500 in an ED in accordance with an embodiment of the present disclosure.

In block 502, the ED receives GF resource configuration information from a base station to configure the ED for GF uplink transmission in unlicensed spectrum, the GF resource configuration information comprising GF ED group-specific resource configuration information indicating GF ED group-specific T/F resources of the unlicensed spectrum for GF uplink transmission.

Optionally, in block 504, the ED performs a CCA in the unlicensed spectrum in accordance with the GF resource configuration information. In some embodiments, an ED does not perform a CCA if its GF uplink transmission starts within a time gap permitted by regulation, e.g., within 16 μs of the end of a DCI trigger transmitted by the base station, as discussed previously.

In block 506, the ED transmits a GF uplink transmission over the unlicensed spectrum in accordance with the GF resource configuration information. For example, the ED's GF uplink transmission may be aligned to the GF uplink transmissions of one or more other GF EDs within the same GF ED group, as discussed previously.

Optionally, in block 508, the ED monitors for a GF feedback message from the base station. For example, the ED may monitor for a multi-cast group-specific GFG feedback message, as discussed previously.

The ED may then return to block 506 to transmit another GF uplink transmission in accordance with the GF resource configuration information that it received from the base station.

The example operations 500 are illustrative of an example embodiment. Various ways to perform the illustrated operations, as well as examples of other operations that may be performed, are described herein. Further variations may be or become apparent.

Figure 16:
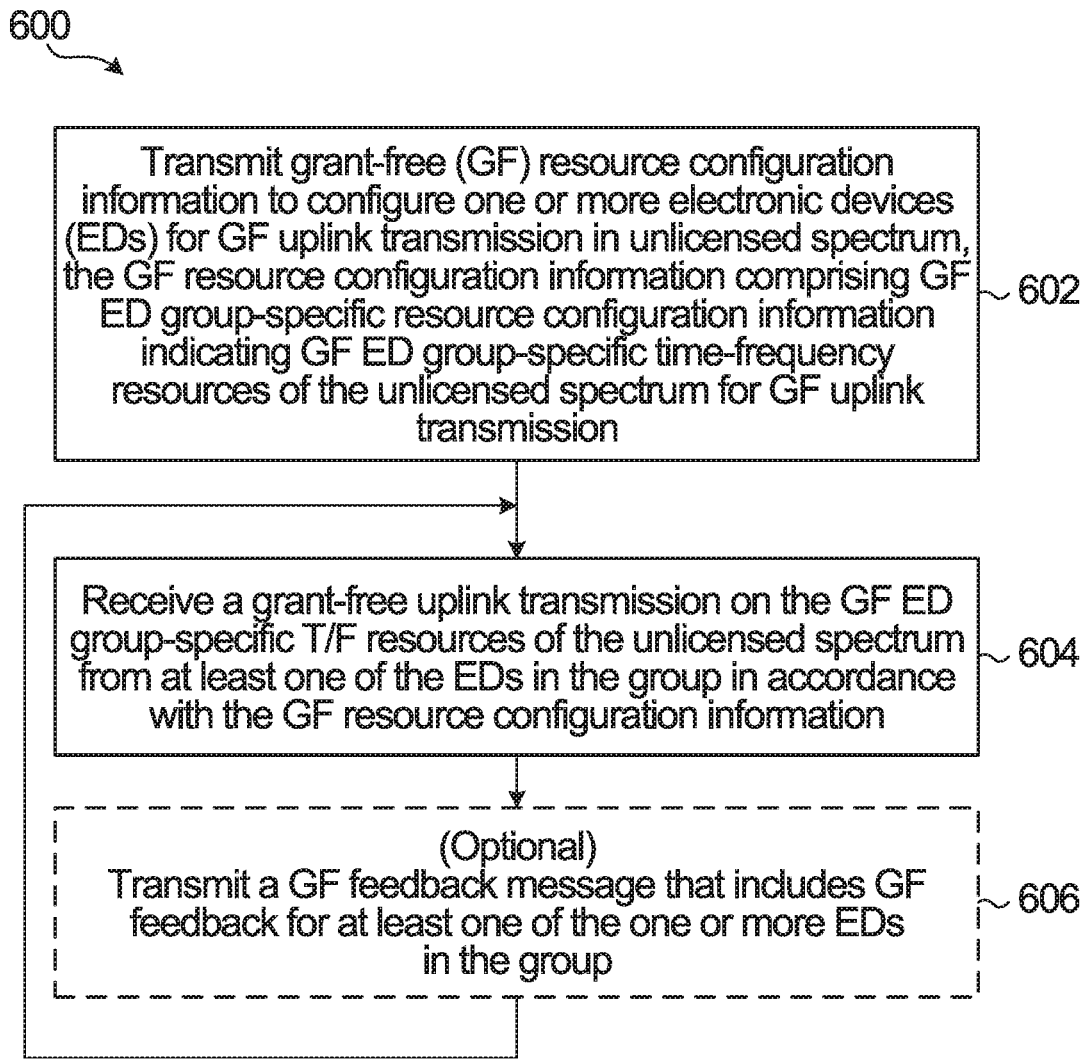
FIG. 16 is a flow diagram of examples operations in a base station in accordance with an embodiment of the present disclosure.

FIG. 16 is a flow diagram of examples operations 600 in a base station in accordance with an embodiment of the present disclosure.

In block 602, the base station transmits grant-free (GF) resource configuration information to configure one or more electronic devices (EDs) for GF uplink transmission in unlicensed spectrum, the GF resource configuration information comprising GF ED group-specific resource configuration information indicating GF ED group-specific time-frequency resources of the unlicensed spectrum for GF uplink transmission.

In block 606, the base station receives a grant-free uplink transmission on the GF ED group-specific T/F resources of the unlicensed spectrum from at least one of the EDs in the group in accordance with the GF resource configuration information. For example, the GF uplink transmissions may be aligned to a common GF transmission cycle defined by a common GF transmission cycle reference start time and a common GF transmission cycle period that are provided as part of the GF ED group-specific resource configuration information, as discussed previously.

Optionally, in block 606, the base station transmits a GF feedback message that includes GF feedback for at least one of the one or more EDs in the group. For example, the base station may multi-cast a group-specific GFG feedback message, as discussed previously.

The base station may then return to block 504 to receive further GF uplink transmissions from GF EDs in the group in accordance with the GF resource configuration information that it provided.

The example operations 600 are illustrative of an example embodiment. Various ways to perform the illustrated operations, as well as examples of other operations that may be performed, are described herein. Further variations may be or become apparent.

Figure 17A:
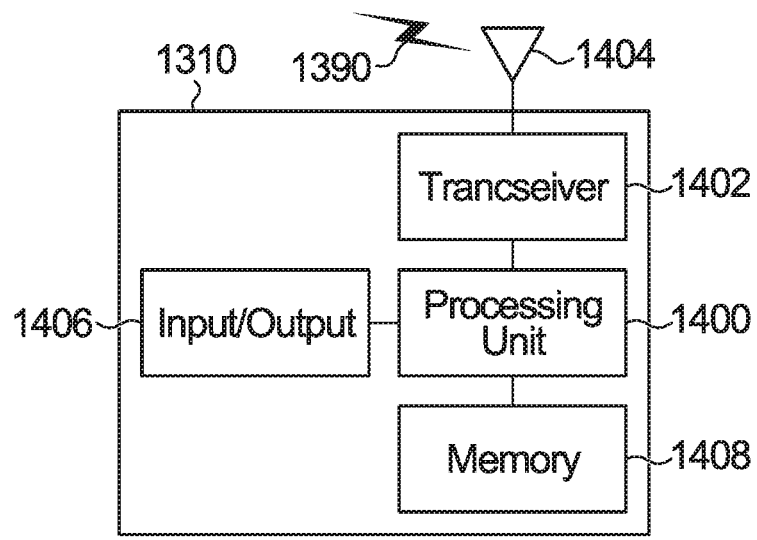
FIGS. 17A and 17B are block diagrams of an example ED and base station, respectively.
Figure 17B:
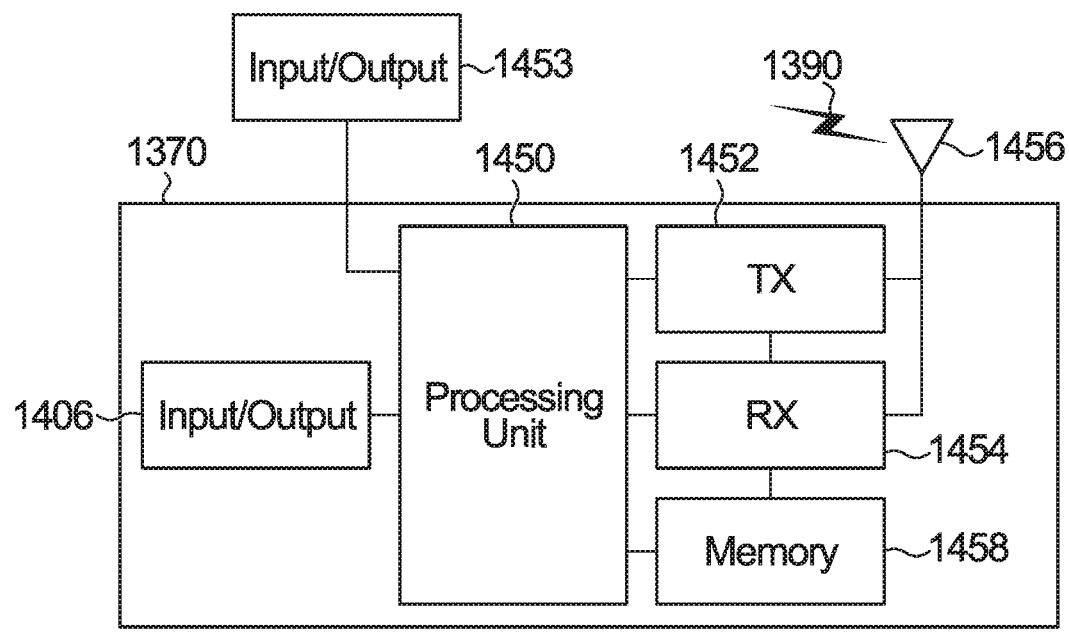

FIGS. 17A and 17B illustrate example devices that may implement the methods and teachings according to this disclosure. In particular, FIG. 17A illustrates an example ED 110, and FIG. 17B illustrates an example base station 1370. These components could be used in the communication system 100 or in any other suitable system.

As shown in FIG. 17A, the ED no includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 100. The processing unit 1400 may also be configured to implement some or all of the functionality and/or embodiments described in more detail above. Each processing unit 200 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet iso). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

Figures 18A, 18B:
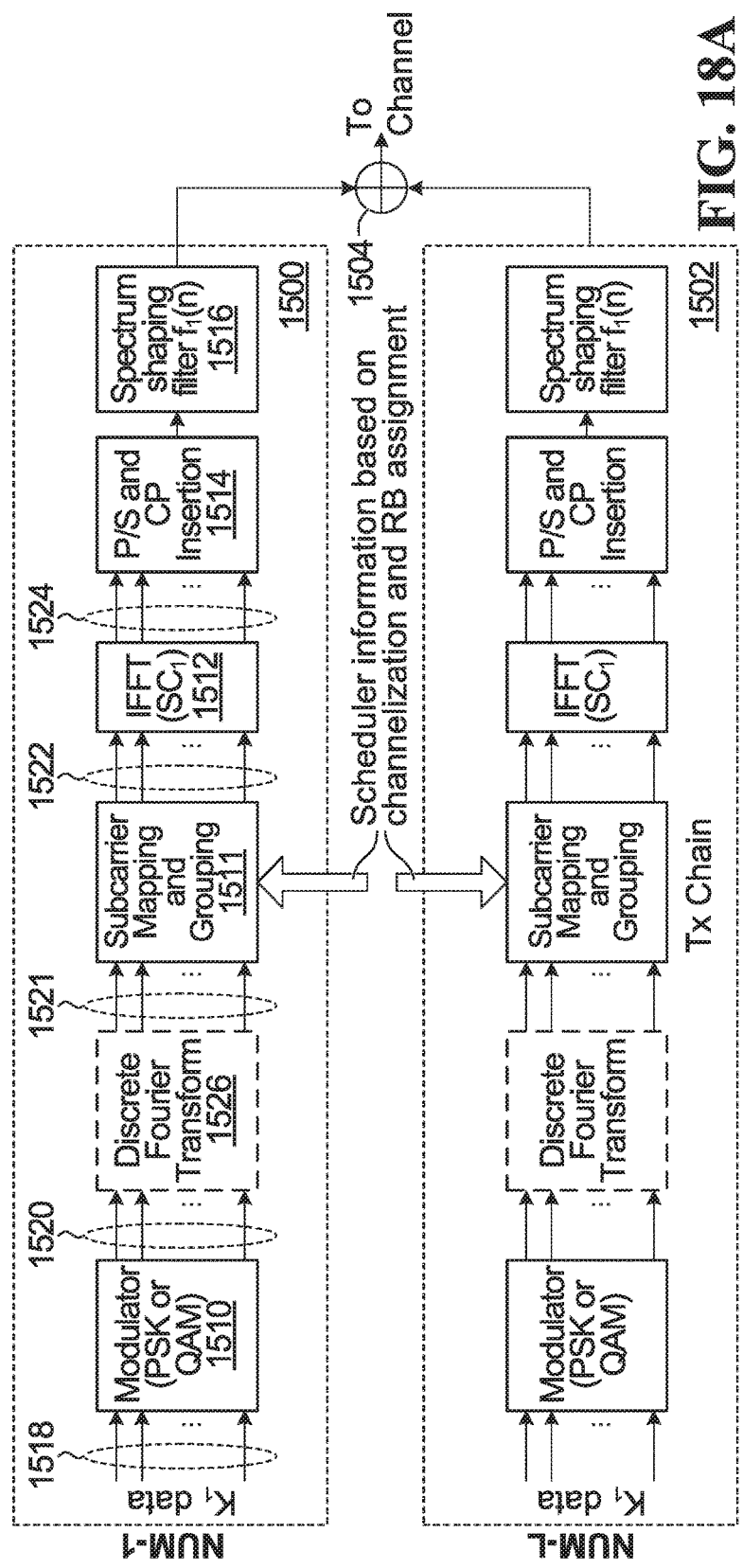
FIGS. 18A and 18B are block diagrams of an example transmit chain and receive chain, respectively.

Referring now to FIG. 18A, shown is an example simplified block diagram of part of a transmitter that can be used to perform channelization as described above. In this example, there are L supported numerologies, where L≥2.

For each numerology, there is a respective transmit chain 1500, 1502. FIG. 18A shows simplified functionality for the first and $L^{th}$ numerology; the functionality for other numerologies would be similar. Also shown in FIG. 18B is simplified functionality for a receive chain 1503 for a receiver operating using the first numerology.

The transmit chain 1500 for the first numerology includes a modulator 1510, subcarrier mapping and grouping block 1511, IFFT 1512 with subcarrier spacing SCI, parallel to serial and cyclic prefix insertion 1514, and spectrum shaping filter 1516. In operation, modulator 1510 receives ED data (more generally, ED content containing data and/or signalling) for $K_1$ EDs, where $K_1 \geq 1$. The data may be received from the output of an encoder. The modulator 1510 maps the ED data for each of the $K_1$ EDs to a respective stream of constellation symbols (e.g., PSK, QAM, OQAM) and outputs this at 1520. The number of ED bits per symbol depends on the particular constellation employed by the modulator 1510. In the example of 2N-quadrature amplitude modulation (QAM), N bits from for each ED are mapped to a respective QAM symbol.

Optionally, for example in SC-FDMA embodiments used for uplink communication, the output 1520 is received by a discrete Fourier transform (DFT) 1526. The output of the DFT is shown at 1521. Other embodiments, such as OFDM embodiments, do not include the DFT 1526, in which case the output 1520 is passed directly to 1521.

For each OFDM symbol period, the subcarrier mapping and grouping block 1511 groups and maps the input 1521 to the inputs of the IFFT 1512 at 1522. The grouping and mapping is performed based on scheduler information, which in turn is based on channelization and resource block assignment, in accordance with a defined resource block definition and allocation for the content of the $K_1$ EDs being processed in transmit chain 1500. P is the size of the IFFT 1512. Not all of the inputs are necessarily used for each OFDM symbol period. The IFFT 1512 receives a number of symbols less than P, and outputs P time domain samples at 1524. Following this, in some implementations, parallel to serial conversion is performed and a cyclic prefix is added in block 1514. The spectrum shaping filter 1516 applies a filter $f_1(n)$ which limits the spectrum at the output of the transmit chain 1500 to prevent interference with the outputs of other transmit chains such as transmit chain 1502. In some embodiments, the spectrum shaping filter 1516 also performs shifting of each sub-band to its assigned frequency location. In other embodiments, a separate module (not shown) performs the shifting of each sub-band to its assigned frequency location.

The functionality of the other transmit chains, such as transmit chain 1502 is similar. The outputs of all of the transmit chains are combined in a combiner 1504 before transmission on the channel. In an alternative embodiment, the outputs of only a subset of the transmit chains are combined together for transmission on a single channel, and the outputs of the remaining transmit chains are transmitted on one or more other channels. This may be the case, for example, if RAN slicing is being used.

Although the apparatus of FIG. 18A is shown and described in reference to a base station, a similar structure could be implemented in an ED. An ED could have multiple transmit chains corresponding to multiple numerologies, or a single transmit chain. The transmissions of multiple EDs are combined over the air, and received together at the base station.

FIG. 18B shows a simplified block diagram of a receive chain for a user equipment or other electronic device operating with the first numerology depicted at 1503. In some embodiments, a given ED is permanently configured to operate with a particular numerology. In some embodiments, a given ED operates with a software-configurable numerology. In either case, flexible resource block definitions are supported by the ED. The receive chain 1503 includes spectrum shaping filter 1530, cyclic prefix deletion and serial to parallel processing 1532, fast Fourier transform (FFT) 1534, subcarrier de-mapping 1536, optional inverse DFT (IDFT) 1537 for use with embodiment transmit chains including a DFT 1526, and equalizer 1538. It is contemplated that the spectrum shaping filter 1530 may be replaced by a windowing module, a spectrally contained waveform selection module, or any other suitable module for producing a spectrally contained waveform. Each element in the receive chain performs corresponding reverse operations to those performed in the transmit chain. The receive chain for an ED operating with another numerology would be similar.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

EXAMPLE EMBODIMENTS

The following provides a non-limiting list of example embodiments of the present disclosure:

Example embodiment 1. A method for an electronic device (ED) in a wireless communication network, the method comprising:
  receiving, at an ED from a base station, grant-free (GF) resource configuration information to configure the ED for GF uplink transmission in unlicensed spectrum, the GF resource configuration information comprising GF ED group-specific resource configuration information indicating GF ED group-specific time-frequency (T/F) resources of the unlicensed spectrum for GF uplink transmission; and
  transmitting a grant-free uplink transmission over the unlicensed spectrum in accordance with the GF resource configuration information.

Example embodiment 2. The method of Example embodiment 1, further comprising monitoring for a GF feedback message from the base station.

Example embodiment 3. The method of Example embodiment 1 or 2, wherein the GF resource configuration information further comprises a GF ED group-specific radio network temporary identifier (GFG-RNTI) for the ED to receive GFG common DCI messages from the base station.

Example embodiment 4. The method of Example embodiment 2 or 3, wherein the GF feedback message from the base station is a GFG common feedback message.

Example embodiment 5. The method of any of Example embodiments 1 to 4, further comprising performing a CCA in the unlicensed spectrum in accordance with the GF resource configuration information, wherein transmitting a GF uplink transmission over the unlicensed spectrum comprises starting the GF uplink transmission in accordance with the GF resource configuration information if the CCA is successful.

Example embodiment 6. The method of any of Example embodiments 1 to 5, wherein transmitting a GF uplink transmission over the unlicensed spectrum comprises starting the GF uplink transmission in alignment with the GF uplink transmission of one or more EDs in the GF group.

Example embodiment 7. The method of any of Example embodiments 1 to 6, wherein the ED is part of more than one GF ED group, each GF ED group including at least one ED.

Example embodiment 8. The method of Example embodiment 6 or 7, wherein the GF uplink transmission of one ED or multiple ED of the group over the unlicensed spectrum is aligned to:
  a common GF transmission cycle;
  a downlink (DL) group common time alignment signal;
  a DL burst containing a Control Resource Set (CORESET) that includes ED-specific and/or group common DCI triggers; or
  a combination of two or more of the above.

Example embodiment 9. The method of any of Example embodiments 1 to 8, wherein the GF resource configuration information is received at least partially via a group-specific configuration message comprising the GF ED group-specific resource configuration information to configure the EDs in the group for GF uplink transmission in the unlicensed spectrum.

Example embodiment 10. The method of any of Example embodiments 1 to 8, wherein the GF resource configuration information is received at least partially via an ED-specific configuration message.

Example embodiment 11. The method of any of Example embodiments 1 to 10, wherein the GF resource configuration information further comprises information indicating a type of CCA to be used for accessing the unlicensed spectrum.

Example embodiment 12. The method of any of Example embodiments 1 to 11, further comprising transmitting, from the ED to the base station, information indicating at least one priority class associated with GF uplink traffic for the ED.

Example embodiment 13. The method of Example embodiment 12, wherein the information indicating at least one priority class is transmitted via uplink control information (UCI) or uplink radio resource control (UL RRC) signaling.

Example embodiment 14. The method of Example embodiment 12, wherein the information indicating at least one priority class is transmitted by the ED as part of capability information that indicates the ED is a GF-capable device.

Example embodiment 15. The method of any of Example embodiments 1 to 14, wherein the GF resource configuration information is received entirely via radio resource control (RRC) signaling.

Example embodiment 16. The method of any of Example embodiments 1 to 15, wherein the GF resource configuration information is received in part via RRC signaling and in part via downlink control information (DCI) that is part of an ED-specific or a group common trigger.

Example embodiment 17. The method of Example embodiment 5, wherein:
the GF resource configuration information further comprises information indicating a reference start time and a GF transmission cycle period; and
transmitting a GF uplink transmission over the unlicensed spectrum in accordance with the GF resource configuration information comprises aligning the ED's GF uplink transmission in the T/F resources to the common GF transmission cycle defined by the common GF transmission cycle reference start time and the common GF transmission cycle period.

Example embodiment 18. The method of Example embodiment 5 or 17, wherein the information indicating time-frequency resources of the unlicensed spectrum for grant-free uplink transmission comprises information indicating one or more resource blocks (RBs) or a sequence of frequency interlaces within the time-frequency resources of the unlicensed spectrum for grant-free uplink transmission.

Example embodiment 19. The method of Example embodiment 17 or 18, wherein the GF resource configuration information further comprises information indicating a plurality of potential GF occasions within a GF transmission cycle at which the ED could potentially start a GF uplink transmission.

Example embodiment 20. The method of Example embodiment 19, wherein the plurality of potential GF occasions includes a first occasion within the GF transmission cycle period, at least one subsequent occasion within the GF transmission cycle period being associated with a different set of GF parameters than the first occasion.

Example embodiment 21. The method of Example embodiment 20, wherein the different sets of GF parameters associated with different occasions within the GF transmission cycle period differ in terms of one or more of: transport format, number of repetitions, frequency interlace pattern, and frequency hopping pattern.

Example embodiment 22. The method of Example embodiment 20, further comprising:
in response to a CCA failing for the indicated GF occasion, performing a CCA for another potential GF occasion within the GF transmission cycle period; and
in response to the CCA for the other potential GF occasion succeeding, transmitting a grant-free uplink transmission over the unlicensed spectrum in accordance with the GF resource configuration information and the respective set of GF parameters, within the GF transmission cycle period.

Example embodiment 23. The method of Example embodiment 22, further comprising:
in response to a CCA for any GF occasion other than the last occasion succeeding, transmitting a GF uplink transmission over the unlicensed spectrum and blanking a number of symbols at the end of that GF uplink transmission to avoid potential CCA failures for neighboring EDs attempting to start a transmission at the immediately following GF occasion; wherein the number of blanked symbols is the minimum number that accommodates the maximum duration of the CCA type configured for the GF ED group.

Example embodiment 24. The method of any of Example embodiments 17 to 23, wherein the reference start time is an absolute start time expressed as the index of an alignment time unit (ATU).

Example embodiment 25. The method of Example embodiment 24, wherein the ATU index is the index of an Orthogonal Frequency Division Multiplexing (OFDM) symbol, the slot number, the subframe number or the system frame number (SFN).

Example embodiment 26. The method of any of Example embodiments 17 to 25, wherein the reference start time is a time offset relative to radio resource control (RRC) signaling carrying at least part of the GF resource configuration information.

Example embodiment 27. The method of any of Example embodiments 17 to 25, wherein the reference start time is a time offset relative to downlink control information (DCI) carrying at least part of the GF resource configuration information.

Example embodiment 28. The method of any of Example embodiments 17 to 25, wherein the ED determines the reference start time based on the GF transmission cycle period and time synchronization information.

Example embodiment 29. The method of Example embodiment 28, wherein the time synchronization information is a current timer value of any one of: system frame number; subframe number; and slot number.

Example embodiment 30. The method of Example embodiment 29, wherein the GF ED sets the reference start time to Current Timer if Current Timer satisfies the formulae, Current Timer mod GF Cycle Period=q, where Current Timer is the current timer value, GF Cycle Period and q are expressed as integer numbers of the same time unit as Current Timer, and q=0, 1, . . . , GF Cycle Period-1 is a configurable constant offset that is provided as part of the GF resource configuration information.

Example embodiment 31. The method of Example embodiment 30, wherein the configurable constant offset, q, is a parameter specific to the GF ED group to which the GF ED belongs for the alignment of a group common GF transmission cycle across the GF group EDs.

Example embodiment 32. The method of any of Example embodiments 1 to 31, wherein receiving the GF ED group-specific resource configuration information comprises receiving the GF ED group-specific resource configuration information via at least one of: ED-specific Radio Resource Control (RRC) signaling; and a group common Physical Downlink Control Channel (PDCCH) using a grant-free ED group identifier associated with the group of EDs to identify group common Downlink Control Information (DCI) intended for the group of EDs.

Example embodiment 33. The method of any of Example embodiments 1 to 32, wherein the GF ED group-specific resource configuration information further comprises an indication of one or more occupational bandwidth-compliant (OCB-compliant) frequency hopping patterns to be used by one or more EDs in the group for grant-free uplink transmission within the T/F resources.

Example embodiment 34. The method of Example embodiment 33, wherein one or more of the OCB-compliant frequency hopping patterns comprises at least one of:
a sequence of frequency interlaces within the T/F resources;
a sequence of unlicensed channels to occupy within the T/F resources; and
a combination of i) and ii).

Example embodiment 35. The method of Example embodiment 33 or 34, wherein the one or more OCB-compliant frequency hopping patterns have a sequence length that depends on the number of GF repetitions per transport block.

Example embodiment 36. The method of any of Example embodiments 33 to 35, wherein the indication of the T/F resources for the group of EDs to use for grant-free uplink transmission comprises a common seed value for the ED to use with a common random number generator to generate a group common random index of an OCB-compliant frequency interlace or unlicensed channel.

Example embodiment 37. The method of any of Example embodiments 1 to 36, wherein the GF ED group-specific resource configuration information further comprises an indication of an ED-specific field format for a grant-free group (GFG) common downlink control information (DCI) message.

Example embodiment 38. The method of Example embodiment 37, wherein the GFG common DCI message includes a field to solicit a GF uplink transmission.

Example embodiment 39. The method of any of Example embodiments 1 to 39, wherein the ED receives, from the base station, a GFG configuration message that includes the GF ED group-specific resource configuration information after at least one group ED regains time synchronization with the base station.

Example embodiment 40. The method of any of Example embodiments 17 to 31, wherein transmitting a GF uplink transmission over the unlicensed spectrum in accordance with the GF resource configuration information comprises aligning the ED's GF uplink transmission in the T/F resources to the common GF transmission cycle defined by the common GF transmission cycle reference start time and the common GF transmission cycle period.

Example embodiment 41. The method of Example embodiment 40, wherein the information indicating a common GF transmission cycle reference start time comprises information indicating a timing offset from an end of the transmission of a message containing the GF ED group-specific resource configuration information.

Example embodiment 42. The method of Example embodiment 40 or 41, wherein:
the GF ED group-specific resource configuration information further comprises information indicating a grant-free frame structure to be used by the group of EDs for grant-free uplink transmission in the unlicensed spectrum; and
transmitting a grant-free uplink transmission over the unlicensed spectrum comprises transmitting the grant-free uplink transmission in accordance with the grant-free frame structure indicated in the GF ED group-specific resource configuration information.

Example embodiment 43. The method of Example embodiment 42, wherein:
the grant-free frame structure is one of a plurality of pre-determined grant-free frame structures that are each associated with a respective grant-free frame structure index value; and
the information indicating the grant-free frame structure includes information indicating the respective grant-free frame structure index value associated with the grant-free frame structure.

Example embodiment 44. The method of any of Example embodiments 40 to 43, wherein the GF ED group-specific resource configuration information comprise information indicating a priority class index value associated with grant-free uplink traffic for the GF ED group, the priority class index value being one priority class index value of a hierarchy of priority class index values, each priority class index value in the hierarchy being associated with a respective GF transmission cycle period and a respective maximum grant-free uplink burst length.

Example embodiment 45. The method of Example embodiment 44, wherein, for each of at least a subset of the priority class index values in the hierarchy, the respective GF transmission cycle period associated with the priority class index value exceeds a respective maximum channel occupancy time (MCOT) associated with the priority class index value such that a respective minimum idle period between the end of the respective MCOT and the end of the respective GF transmission cycle period is at least 5% of the length of the respective MCOT, the respective MCOT encompassing at least the respective maximum grant-free uplink burst length associated with the priority class index value.

Example embodiment 46. The method of Example embodiment 45, wherein for each of the priority class index values in the hierarchy, the respective MCOT associated with the priority class index value encompasses at least the respective maximum grant-free uplink burst length, a reserved/partial subframe duration and a short time gap.

Example embodiment 47. The method of Example embodiment 46, wherein for each of the priority class index values in the hierarchy, the respective MCOT associated with the priority class index value further encompasses a length of a grant-free group (GFG) feedback message.

Example embodiment 48. The method of any of Example embodiments 40 to 47, further comprising:
in at least one common GF transmission cycle, receiving, over the T/F resources, a downlink transmission within a dynamic idle period between an end of a last grant-free uplink transmission in the common GF transmission cycle and before a start time of the CCA for the next common GF transmission cycle.

Example embodiment 49. The method of any of Example embodiments 40 to 47, further comprising:
in at least one common GF transmission cycle, receiving a scheduling grant for a grant-based uplink transmission in another set of T/F resources, wherein the scheduling grant is received within a dynamic idle period between an end of a last grant-free uplink transmission in the common GF transmission cycle and before a start time of the CCA for the next common GF transmission cycle; and
accessing the other set of T/F resources to transmit a grant-based uplink in accordance with the received scheduling grant.

Example embodiment 50. The method of Example embodiment 49, wherein the scheduling grant includes information indicating the other set of T/F resources in which the grant-based uplink transmission is to be made and information indicating a CCA type to be used to access the other set of T/F resources for grant-based uplink transmission.

Example embodiment 51. The method of any of Example embodiments 1 to 16, further comprising:
receiving, over the unlicensed spectrum resources, a multi-cast grant-free group (GFG) common time-alignment signal for the group of EDs; and
timing the ED's group-aligned GF transmission in the unlicensed spectrum resources based on the GFG common time-alignment signal.

Example embodiment 52. The method of Example embodiment 51, wherein receiving the multi-cast GFG common time-alignment signal comprises searching for the multi-cast GFG common time-alignment signal in a common time-frequency search space according to a target GF cycle periodicity.

Example embodiment 53. The method of Example embodiment 51 or 52, wherein the GFG common time-alignment signal comprises a GFG feedback message that includes, for the ED, an ED-specific information field that includes Ack/Nack feedback related to one or more transport blocks transmitted by the ED within an earlier grant-free uplink transmission.

Example embodiment 54. The method of any of Example embodiments 1 to 53, wherein transmitting a grant-free uplink transmission over the unlicensed spectrum T/F resources comprises transmitting uplink control signaling at the start of the grant-free uplink transmission.

Example embodiment 55. The method of any of Example embodiments 1 to 54, further comprising:
   receiving a multi-cast group-specific grant-free group (GFG) feedback message on T/F resources of the unlicensed spectrum.

Example embodiment 56. The method of Example embodiment 55, wherein receiving a multi-cast group-specific grant-free group (GFG) feedback message comprises receiving the multi-cast GFG feedback message after a last grant-free uplink burst from one of the EDs in the group ends and within a maximum channel occupancy time (MCOT).

Example embodiment 57. The method of Example embodiment 56, wherein the GFG feedback message comprises, for each of one or more EDs in the group, an information field that includes Acknowledgement/Negative Acknowledgement (Ack/Nack) feedback related to one or more transport blocks transmitted by the ED within a grant-free uplink burst during the MCOT in which the GFG Ack/Nack feedback message is multi-cast and/or related to one or more transport blocks transmitted by the ED within previous grant-free uplink bursts.

Example embodiment 58. The method of Example embodiment 55, wherein receiving the multi-cast GFG feedback message comprises receiving the multi-cast GFG feedback message as part of a GFG common time-alignment message, the GFG feedback message comprising, for each of one or more EDs in the group, an information field that includes Ack/Nack feedback related to one or more transport blocks transmitted by the ED within one or more most recent grant-free uplink bursts preceding the GFG Ack/Nack feedback message.

Example embodiment 59. The method of Example embodiment 55, wherein receiving the multi-cast GFG feedback message comprises receiving the multi-cast GFG feedback message as part of a GFG common time-alignment message, the GFG feedback message comprising:
   an information field that includes Ack/Nack feedback related to one or more transport blocks transmitted by the ED within a grant-free uplink burst preceding the GFG Ack/Nack feedback message; and
   a Group Ack/Nack Index Shift to indicate which previous grant-free uplink burst the Ack/Nack feedback applies to.

Example embodiment 60. The method of any of Example embodiments 1 to 59, further comprising:
   transmitting, on time-frequency resources of the unlicensed spectrum band, an indication to a base station that the ED will be using a modulation and coding scheme (MCS) for a grant-free uplink transmission that differs from a pre-configured MCS, wherein transmitting a grant-free uplink transmission over the unlicensed spectrum comprises transmitting the grant-free uplink transmission using the indicated MCS.

Example embodiment 61. The method of Example embodiment 60, wherein transmitting the indication that the ED will be using a MCS that differs from a pre-configured MCS comprises transmitting the indication via any one of:
   a physical uplink control channel (PUCCH) carrying uplink control information (UCI) at the beginning of the grant-free uplink transmission;
   a front-loaded pilot or demodulation reference signal (DMRS); and
   uplink radio resource configuration (RRC) signaling transmitted by the ED using the pre-configured MCS before starting transmission of the grant-free uplink transmission using the MCS that differs from the pre-configured MCS.

Example embodiment 62. The method of any of Example embodiments 1 to 16, further comprising:
   receiving, over the unlicensed spectrum resources, a downlink burst from the base station containing a control resource set (CORESET) that includes an ED-specific downlink control information (DCI) trigger for the ED; and
   timing the ED's group-aligned GF transmission in the unlicensed spectrum resources based on the downlink burst.

Example embodiment 63. The method of any of Example embodiments 17 to 31, further comprising:
   receiving, over the unlicensed spectrum resources, a downlink burst from the base station containing a control resource set (CORESET) that includes an ED-specific downlink control information (DCI) trigger for the ED,
   wherein at least part of the GF resource configuration information is received via the ED-specific downlink DCI trigger for the ED.

Example embodiment 64. The method of any one of Example embodiments 51 to 53, further comprising:
   receiving, over the unlicensed spectrum resources, a downlink burst from the base station containing a control resource set (CORESET) that includes an ED-specific downlink control information (DCI) trigger for the ED,
   wherein at least part of the GF resource configuration information is received via the ED-specific downlink DCI trigger for the ED.

Example embodiment 65. An electronic device (ED) comprising:
   a memory storage comprising instructions; and
   one or more processors in communication with the memory storage, wherein the one or more processors execute the instructions to:
   configure the ED for grant-free (GF) uplink transmission in unlicensed spectrum in accordance with GF resource configuration information received from a base station, the GF resource configuration information comprising GF ED group-specific resource configuration information indicating GF ED group-specific time-frequency (T/F) resources of the unlicensed spectrum for GF uplink transmission; and
   transmit a grant-free uplink transmission over the unlicensed spectrum in accordance with the GF resource configuration information.

Example embodiment 66. The ED of Example embodiment 65, wherein the one or more processors execute the instructions to monitor for a GF feedback message from the base station.

Example embodiment 67. The ED of Example embodiment 65, wherein the GF resource configuration information further comprises a GF ED group-specific radio network temporary identifier (GFG-RNTI) for the ED to receive GFG common DCI messages from the base station.

Example embodiment 68. The ED of Example embodiment 66, wherein the GF feedback message from the base station is a GFG common feedback message.

Example embodiment 69. The ED of Example embodiment 65, wherein the one or more processors execute the instructions to:
perform a CCA in the unlicensed spectrum in accordance with the GF resource configuration information; and
start the GF uplink transmission in accordance with the GF resource configuration information if the CCA is successful.

Example embodiment 70. The ED of Example embodiment 65, wherein the one or more processors execute the instructions to start the GF uplink transmission in alignment with the GF uplink transmission of one or more EDs in the GF group.

Example embodiment 71. The ED of Example embodiment 65, wherein the ED is part of more than one GF ED group, each GF ED group including at least one ED.

Example embodiment 72. The ED of Example embodiment 70, wherein the GF uplink transmission of one ED or multiple ED of the group over the unlicensed spectrum is aligned to:
a common GF transmission cycle;
a downlink (DL) group common time alignment signal;
a DL burst containing a Control Resource Set (CORESET) that includes ED-specific and/or group common DCI triggers; or
a combination of two or more of the above.

Example embodiment 73. The ED of Example embodiment 65, wherein the GF resource configuration information is received at least partially via a group-specific configuration message comprising the GF ED group-specific resource configuration information to configure the EDs in the group for GF uplink transmission in the unlicensed spectrum.

Example embodiment 74. The ED of Example embodiment 65, wherein the GF resource configuration information is received at least partially via an ED-specific configuration message.

Example embodiment 75. The ED of Example embodiment 69, wherein the GF resource configuration information further comprises information indicating a type of CCA to be used for accessing the unlicensed spectrum.

Example embodiment 76. The ED of Example embodiment 65, wherein the one or more processors execute the instructions to transmit information to the base station indicating at least one priority class associated with GF uplink traffic for the ED.

Example embodiment 77. The ED of Example embodiment 76, wherein the information indicating at least one priority class is transmitted via uplink control information (UCI) or uplink radio resource control (UL RRC) signaling.

Example embodiment 78. The ED of Example embodiment 76, wherein the information indicating at least one priority class is transmitted by the ED as part of capability information that indicates the ED is a GF-capable device.

Example embodiment 79. The ED of Example embodiment 65, wherein the GF resource configuration information is received entirely via radio resource control (RRC) signaling.

Example embodiment 80. The ED of Example embodiment 65, wherein the GF resource configuration information is received in part via RRC signaling and in part via downlink control information (DCI) that is part of an ED-specific or a group common trigger.

Example embodiment 81. The ED of Example embodiment 69, wherein:

the GF resource configuration information further comprises information indicating a reference start time and a GF transmission cycle period; and
the one or more processors execute the instructions to align the ED's GF uplink transmission in the T/F resources to the common GF transmission cycle defined by the common GF transmission cycle reference start time and the common GF transmission cycle period.

Example embodiment 82. The ED of Example embodiment 69, wherein the information indicating time-frequency resources of the unlicensed spectrum for grant-free uplink transmission comprises information indicating one or more resource blocks (RBs) or a sequence of frequency interlaces within the time-frequency resources of the unlicensed spectrum for grant-free uplink transmission.

Example embodiment 83. The ED of Example embodiment 81, wherein the GF resource configuration information further comprises information indicating a plurality of potential GF occasions within a GF transmission cycle at which the ED could potentially start a GF uplink transmission.

Example embodiment 84. The ED of Example embodiment 83, wherein the plurality of potential GF occasions includes a first occasion within the GF transmission cycle period, at least one subsequent occasion within the GF transmission cycle period being associated with a different set of GF parameters than the first occasion.

Example embodiment 85. The ED of Example embodiment 84, wherein the different sets of GF parameters associated with different occasions within the GF transmission cycle period differ in terms of one or more of: transport format, number of repetitions, frequency interlace pattern, and frequency hopping pattern.

Example embodiment 86. The ED of Example embodiment 83, wherein the one or more processors execute the instructions to:
in response to a CCA failing for the indicated GF occasion, perform a CCA for another potential GF occasion within the GF transmission cycle period; and
in response to the CCA for the other potential GF occasion succeeding, transmit a grant-free uplink transmission over the unlicensed spectrum in accordance with the GF resource configuration information within the GF transmission cycle period.

Example embodiment 87. The ED of Example embodiment 81, wherein the reference start time is an absolute start time expressed as the index of an alignment time unit (ATU).

Example embodiment 88. The ED of Example embodiment 87, wherein the ATU index is the index of an Orthogonal Frequency Division Multiplexing (OFDM) symbol, the slot number, the subframe number or the system frame number (SFN).

Example embodiment 89. The ED of Example embodiment 81, wherein the reference start time is a time offset relative to radio resource control (RRC) signaling carrying at least part of the GF resource configuration information.

Example embodiment 90. The ED of Example embodiment 81, wherein the reference start time is a time offset relative to downlink control information (DCI) carrying at least part of the GF resource configuration information.

Example embodiment 91. The ED of Example embodiment 81, wherein the one or more processors execute the instructions to determine the reference start time based on the GF transmission cycle period and time synchronization information.

Example embodiment 92. The ED of Example embodiment 91, wherein the time synchronization information is a current timer value of any one of: system frame number; subframe number; or slot number.

Example embodiment 93. The ED of Example embodiment 92, wherein the one or more processors execute the instructions to set the reference start time to Current Timer if Current Timer satisfies the formulae, Current Timer mod GF Cycle Period=q, where Current Timer is the current timer value, GF Cycle Period and q are expressed as integer numbers of the same time unit as Current Timer, and q=0, 1, . . . , GF Cycle Period-1 is a configurable constant offset that is provided as part of the GF resource configuration information.

Example embodiment 94. The ED of Example embodiment 93, wherein the configurable constant offset, q, is a parameter specific to the GF ED group to which the GF ED belongs for the alignment of a group common GF transmission cycle across the GF group EDs.

Example embodiment 95. The ED of Example embodiment 65, wherein the one or more processors execute the instructions to receive the GF ED group-specific resource configuration information via at least one of: ED-specific Radio Resource Control (RRC) signaling; and a group common Physical Downlink Control Channel (PDCCH) using a grant-free ED group identifier associated with the group of EDs to identify group common Downlink Control Information (DCI) intended for the group of EDs.

Example embodiment 96. The ED of Example embodiment 65, wherein
the GF ED group-specific resource configuration information further comprises an indication of one or more occupational bandwidth-compliant (OCB-compliant) frequency hopping patterns to be used by one or more EDs in the group for grant-free uplink transmission within the T/F resources.

Example embodiment 97. The ED of Example embodiment 96, wherein one or more of the OCB-compliant frequency hopping patterns comprises at least one of:
a sequence of frequency interlaces within the T/F resources;
a sequence of unlicensed channels to occupy within the T/F resources; and
a combination of i) and ii).

Example embodiment 98. The ED of Example embodiment 96, wherein the one or more OCB-compliant frequency hopping patterns have a sequence length that depends on the number of GF repetitions per transport block.

Example embodiment 99. The ED of Example embodiment 96, wherein:
the indication of the T/F resources for the group of EDs to use for grant-free uplink transmission comprises a common seed value; and
the one or more processors execute the instructions to use the common seed value with a common random number generator to generate a group common random index of an OCB-compliant frequency interlace or unlicensed channel.

Example embodiment 100. The ED of Example embodiment 65, wherein the GF ED group-specific resource configuration information further comprises an indication of an ED-specific field format for a grant-free group (GFG) common downlink control information (DCI) message.

Example embodiment 101. The ED of Example embodiment 100, wherein the GFG common DCI message includes a field to solicit a GF uplink transmission.

Example embodiment 102. The ED of Example embodiment 65, wherein the one or more processors execute the instructions to receive, from the base station, a GFG configuration message that includes the GF ED group-specific resource configuration information after the ED regains time synchronization with the base station.

Example embodiment 103. The ED of Example embodiment 91, wherein the one or more processors execute the instructions to align the ED's GF uplink transmission in the T/F resources to the common GF transmission cycle defined by the common GF transmission cycle reference start time and the common GF transmission cycle period.

Example embodiment 104. The ED of Example embodiment 103, wherein the information indicating a common GF transmission cycle reference start time comprises information indicating a timing offset from an end of the transmission of a message containing the GF ED group-specific resource configuration information.

Example embodiment 105. The ED of Example embodiment 103, wherein:
the GF ED group-specific resource configuration information further comprises information indicating a grant-free frame structure to be used by the group of EDs for grant-free uplink transmission in the unlicensed spectrum; and
the one or more processors execute the instructions to transmit the grant-free uplink transmission in accordance with the grant-free frame structure indicated in the GF ED group-specific resource configuration information.

Example embodiment 106. The ED of Example embodiment 105, wherein:
the grant-free frame structure is one of a plurality of pre-determined grant-free frame structures that are each associated with a respective grant-free frame structure index value; and
the information indicating the grant-free frame structure includes information indicating the respective grant-free frame structure index value associated with the grant-free frame structure.

Example embodiment 107. The ED of Example embodiment 103, wherein the GF ED group-specific resource configuration information comprise information indicating a priority class index value associated with grant-free uplink traffic for the GF ED group, the priority class index value being one priority class index value of a hierarchy of priority class index values, each priority class index value in the hierarchy being associated with a respective GF transmission cycle period and a respective maximum grant-free uplink burst length.

Example embodiment 108. The ED of Example embodiment 107, wherein, for each of at least a subset of the priority class index values in the hierarchy, the respective GF transmission cycle period associated with the priority class index value exceeds a respective maximum channel occupancy time (MCOT) associated with the priority class index value such that a respective minimum idle period between the end of the respective MCOT and the end of the respective GF transmission cycle period is at least 5% of the length of the respective MCOT, the respective MCOT encompassing at least the respective maximum grant-free uplink burst length associated with the priority class index value.

Example embodiment 109. The ED of Example embodiment 108, wherein for each of the priority class index values in the hierarchy, the respective MCOT associated with the priority class index value encompasses at least the respective maximum grant-free uplink burst length, a reserved/partial subframe duration and a short time gap.

Example embodiment 110. The ED of Example embodiment 109, wherein for each of the priority class index values in the hierarchy, the respective MCOT associated with the priority class index value further encompasses a length of a grant-free group (GFG) feedback message.

Example embodiment 111. The ED of Example embodiment 103, wherein the one or more processors execute the instructions to:
in at least one common GF transmission cycle, receive, over the T/F resources, a downlink transmission within a dynamic idle period between an end of a last grant-free uplink transmission in the common GF transmission cycle and before a start time of the CCA for the next common GF transmission cycle.

Example embodiment 112. The ED of Example embodiment 103, wherein the one or more processors execute the instructions to:
in at least one common GF transmission cycle, receive a scheduling grant for a grant-based uplink transmission in another set of T/F resources, wherein the scheduling grant is received within a dynamic idle period between an end of a last grant-free uplink transmission in the common GF transmission cycle and before a start time of the CCA for the next common GF transmission cycle; and
access the other set of T/F resources to transmit a grant-based uplink in accordance with the received scheduling grant.

Example embodiment 113. The ED of Example embodiment 112, wherein the scheduling grant includes information indicating the other set of T/F resources in which the grant-based uplink transmission is to be made and information indicating a CCA type to be used to access the other set of T/F resources for grant-based uplink transmission.

Example embodiment 114. The ED of Example embodiment 65, wherein the one or more processors execute the instructions to:
receive, over the unlicensed spectrum resources, a multi-cast grant-free group (GFG) common time-alignment signal for the group of EDs; and
time the ED's group-aligned GF transmission in the unlicensed spectrum resources based on the GFG common time-alignment signal.

Example embodiment 115. The ED of Example embodiment 114, wherein the one or more processors execute the instructions to search for the multi-cast GFG common time-alignment signal in a common time-frequency search space according to a target GF cycle periodicity.

Example embodiment 116. The ED of Example embodiment 114, wherein the GFG common time-alignment signal comprises a GFG feedback message that includes, for the ED, an ED-specific information field that includes Ack/Nack feedback related to one or more transport blocks transmitted by the ED within an earlier grant-free uplink transmission.

Example embodiment 117. The ED of Example embodiment 65, wherein the one or more processors execute the instructions to transmit uplink control signaling at the start of the grant-free uplink transmission.

Example embodiment 118. The ED of Example embodiment 65, wherein the one or more processors execute the instructions to:
receive a multi-cast group-specific grant-free group (GFG) feedback message on T/F resources of the unlicensed spectrum.

Example embodiment 119. The ED of Example embodiment 118, wherein the one or more processors execute the instructions to receive the multi-cast GFG feedback message after a last grant-free uplink burst from one of the EDs in the group ends and within a maximum channel occupancy time (MCOT).

Example embodiment 120. The ED of Example embodiment 119, wherein the GFG feedback message comprises, for each of one or more EDs in the group, an information field that includes Acknowledgement/Negative Acknowledgement (Ack/Nack) feedback related to one or more transport blocks transmitted by the ED within a grant-free uplink burst during the MCOT in which the GFG Ack/Nack feedback message is multi-cast and/or related to one or more transport blocks transmitted by the ED within previous grant-free uplink bursts.

Example embodiment 121. The ED of Example embodiment 118, wherein the one or more processors execute the instructions to receive the multi-cast GFG feedback message as part of a GFG common time-alignment message, the GFG feedback message comprising, for each of one or more EDs in the group, an information field that includes Ack/Nack feedback related to one or more transport blocks transmitted by the ED within one or more most recent grant-free uplink bursts preceding the GFG Ack/Nack feedback message.

Example embodiment 122. The ED of Example embodiment 65, wherein the one or more processors execute the instructions to:
receive, over the unlicensed spectrum resources, a downlink burst from the base station containing a control resource set (CORESET) that includes an ED-specific downlink control information (DCI) trigger for the ED; and
time the ED's group-aligned GF transmission in the unlicensed spectrum resources based on the downlink burst.

Example embodiment 123. The ED of Example embodiment 118, wherein the one or more processors execute the instructions to receive the multi-cast GFG feedback message as part of a GFG common time-alignment message, the GFG feedback message comprising:
an information field that includes Ack/Nack feedback related to one or more transport blocks transmitted by the ED within a grant-free uplink burst preceding the GFG Ack/Nack feedback message; and
a Group Ack/Nack Index Shift to indicate which previous grant-free uplink burst the Ack/Nack feedback applies to.

Example embodiment 124. The ED of Example embodiment 65, wherein the one or more processors execute the instructions to:
transmit, on time-frequency resources of the unlicensed spectrum band, an indication to a base station that the ED will be using a modulation and coding scheme (MCS) for a grant-free uplink transmission that differs from a pre-configured MCS; and
transmit the grant-free uplink transmission using the indicated MCS.

Example embodiment 125. The ED of Example embodiment 123, wherein the one or more processors execute the instructions to transmit the indication via any one of:
a physical uplink control channel (PUCCH) carrying uplink control information (UCI) at the beginning of the grant-free uplink transmission;
a front-loaded pilot or demodulation reference signal (DMRS); and
uplink radio resource configuration (RRC) signaling transmitted by the ED using the pre-configured MCS before starting transmission of the grant-free uplink transmission using the MCS that differs from the pre-configured MCS.

Example embodiment 126. A method for a base station in a wireless communication network, the method comprising:
transmitting grant-free (GF) resource configuration information to configure one or more electronic devices (EDs) for GF uplink transmission in unlicensed spectrum, the GF resource configuration information comprising GF ED group-specific resource configuration information indicating GF ED group-specific time-frequency resources of the unlicensed spectrum for GF uplink transmission.

Example embodiment 127. The method of Example embodiment 126, further comprising transmitting a GF feedback message that includes GF feedback for at least one of the one or more EDs.

Example embodiment 128. The method of Example embodiment 126 or 127, wherein the GF resource configuration information further comprises a GF ED group-specific radio network temporary identifier (GFG-RNTI) for the one or more EDs to use to receive GFG common DCI messages from the base station.

Example embodiment 129. The method of Example embodiment 127 or 128, wherein the GF feedback message from the base station is a GFG common feedback message.

Example embodiment 130. The method of any of Example embodiments 126 to 129, wherein transmitting the GF resource configuration information comprises transmitting the GF resource configuration information at least partially via a group-specific configuration message comprising the GF ED group-specific configuration information to configure the EDs in the group for GF uplink transmission in the unlicensed spectrum.

Example embodiment 131. The method any of Example embodiments 126 to 130, wherein transmitting the GF resource configuration information comprises transmitting the GF resource configuration information at least partially via an ED-specific configuration message.

Example embodiment 132. The method any of Example embodiments 126 to 131, wherein the GF resource configuration information further comprises information indicating a type of CCA to be used for accessing the unlicensed spectrum.

Example embodiment 133. The method any of Example embodiments 126 to 132, further comprising receiving, from at least one of the one or more EDs information indicating at least one priority class associated with GF uplink traffic for the ED.

Example embodiment 134. The method of Example embodiment 133, wherein the information indicating at least one priority class is received via uplink control information (UCI) or uplink radio resource control (UL RRC) signaling.

Example embodiment 135. The method of Example embodiment 133, wherein the information indicating at least one priority class is received from the ED as part of capability information that indicates the ED is a GF-capable device.

Example embodiment 136. The method of any of Example embodiments 126 to 135, wherein transmitting the GF resource configuration information comprises transmitting the GF resource configuration information entirely via radio resource control (RRC) signaling.

Example embodiment 137. The method of any of Example embodiments 126 to 135, wherein transmitting the GF resource configuration information comprises:
transmitting the GF resource configuration information in part via RRC signaling;
and
transmitting the GF resource configuration information in part via downlink control information (DCI) that is part of an ED-specific or a group common trigger.

Example embodiment 138. The method of any of Example embodiments 126 to 137, wherein the GF resource configuration information further comprises information indicating a reference start time and a GF transmission cycle period.

Example embodiment 139. The method of any of Example embodiments 126 to 138, wherein the information indicating time-frequency resources of the unlicensed spectrum for uplink transmission comprises information indicating one or more resource blocks (RBs) or a sequence of frequency interlaces within the time-frequency resources of the unlicensed spectrum for grant-free uplink transmission.

Example embodiment 140. The method of Example embodiment 138, wherein the GF resource configuration information further comprises information indicating a plurality of potential GF occasions within a GF transmission cycle at which the one or more EDs could potentially start a GF uplink transmission.

Example embodiment 141. The method of Example embodiment 140, wherein the plurality of potential GF occasions includes a first occasion within the GF transmission cycle period, at least one subsequent occasion within the GF transmission cycle period being associated with a different set of GF parameters than the first occasion.

Example embodiment 142. The method of Example embodiment 141, wherein the different sets of GF parameters associated with different occasions within the GF transmission cycle period differ in terms of one or more of: transport format, number of repetitions, frequency interlace pattern, and frequency hopping pattern.

Example embodiment 143. The method of Example embodiment 140 or 141, further comprising:
for a given ED, in response to failing to detect a GF uplink transmission from the ED for the indicated GF occasion, monitoring for a GF uplink transmission from the ED for another potential GF occasion within the GF transmission cycle period.

Example embodiment 144. The method of any of Example embodiments 138 to 143, wherein the reference start time is an absolute start time expressed as the index of an alignment time unit (ATU).

Example embodiment 145. The method of Example embodiment 144, wherein the ATU is the index of an Orthogonal Frequency Division Multiplexing (OFDM) symbol, the slot number, the subframe number or the system frame number (SFN).

Example embodiment 146. The method of any of Example embodiments 138 to 145, wherein the reference start time is a time offset relative to radio resource control (RRC) signaling carrying at least part of the GF resource configuration information.

Example embodiment 147. The method of any of Example embodiments 138 to 145, wherein the reference start time is a time offset relative to downlink control information (DCI) carrying at least part of the GF resource configuration information.

Example embodiment 148. The method of any of Example embodiments 138 to 145, wherein the reference start time is determined based on the GF transmission cycle period and time synchronization information.

Example embodiment 149. The method of Example embodiment 148, wherein the time synchronization information is a current timer value of any one of: system frame number; subframe number; or slot number.

Example embodiment iso. The method of Example embodiment 149, wherein the reference start time is set to Current Timer if Current Timer satisfies the formulae, Current Timer mod GF Cycle Period=q, where Current Timer is the current timer value, GF Cycle Period and q are expressed as integer numbers of the same time unit as Current Timer, and q=0, 1, . . . , GF Cycle Period-1 is a configurable constant offset that is provided as part of the GF resource configuration information.

Example embodiment 151. The method of Example embodiment iso, wherein the configurable constant offset, q, is a parameter specific to the GF ED group to which the one or more GF EDs belong for the alignment of a group common GF transmission cycle.

Example embodiment 152. The method of any of Example embodiments 126 to 151, wherein transmitting the GF ED group-specific configuration information comprises transmitting the GF ED group-specific configuration information via at least one of: ED-specific Radio Resource Control (RRC) signaling; and a group common Physical Downlink Control Channel (PDCCH) using a grant-free ED group identifier associated with the group of EDs to identify group common Downlink Control Information (DCI) intended for the group of EDs.

Example embodiment 153. The method of any of Example embodiments 126 to 152, wherein the GF ED group-specific resource configuration information further comprises an indication of one or more occupational bandwidth-compliant (OCB-compliant) frequency hopping patterns to be used by one or more EDs in the group for grant-free uplink transmission within the T/F resources.

Example embodiment 154. The method of Example embodiment 153, wherein one or more of the OCB-compliant frequency hopping patterns comprises at least one of:
a sequence of frequency interlaces within the T/F resources;
a sequence of unlicensed channels to occupy within the T/F resources; and
a combination of i) and ii).

Example embodiment 155. The method of Example embodiment 153 or 154, wherein the one or more OCB-compliant frequency hopping patterns have a sequence length that depends on the number of GF repetitions per transport block.

Example embodiment 156. The method of any of Example embodiments 153 to 155, wherein the indication of the T/F resources for the group of EDs to use for grant-free uplink transmission comprises a common seed value for the ED to use with a common random number generator to generate a group common random index of an OCB-compliant frequency interlace or unlicensed channel.

Example embodiment 157. The method of any of Example embodiments 126 to 156, wherein the GF ED group-specific resource configuration information further comprises an indication of an ED-specific field format for a grant-free group (GFG) common downlink control information (DCI) message.

Example embodiment 158. The method of Example embodiment 157, wherein the GFG common DCI message includes a field to solicit a GF uplink transmission.

Example embodiment 159. The method of any of Example embodiments 126 to 158, wherein the base station transmits a GFG configuration message that includes the GF ED group-specific resource configuration information after regaining time synchronization with at least one ED in the GF ED group.

Example embodiment 160. The method of any of Example embodiments 138 to 151, further comprising receiving GF uplink transmissions over the unlicensed spectrum from the one or more EDs configured in accordance with the GF resource configuration information, wherein the GF uplink transmissions are aligned to a common GF transmission cycle defined by the common GF transmission cycle reference start time and the common GF transmission cycle period.

Example embodiment 161. The method of Example embodiment 160, wherein the information indicating a common GF transmission cycle reference start time comprises information indicating a timing offset from an end of the transmission of a message containing the GF ED group-specific resource configuration information.

Example embodiment 162. The method of Example embodiment 160 or 161, wherein the GF ED group-specific resource configuration information further comprises:
information indicating a grant-free frame structure to be used by the group of EDs for grant-free uplink transmission in the unlicensed spectrum.

Example embodiment 163. The method of Example embodiment 162, wherein:
the grant-free frame structure is one of a plurality of pre-determined grant-free frame structures that are each associated with a respective grant-free frame structure index value; and
the information indicating the grant-free frame structure includes information indicating the respective grant-free frame structure index value associated with the grant-free frame structure.

Example embodiment 164. The method of any of Example embodiments 160 to 163, wherein the GF ED group-specific resource configuration information comprise information indicating a priority class index value associated with grant-free uplink traffic for the GF ED group, the priority class index value being one priority class index value of a hierarchy of priority class index values, each priority class index value in the hierarchy being associated with a respective GF transmission cycle period and a respective maximum grant-free uplink burst length.

Example embodiment 165. The method of Example embodiment 164, wherein, for each of at least a subset of the priority class index values in the hierarchy, the respective GF transmission cycle period associated with the priority class index value exceeds a respective maximum channel occupancy time (MCOT) associated with the priority class index value such that a respective minimum idle period between the end of the respective MCOT and the end of the respective GF transmission cycle period is at least 5% of the length of the respective MCOT, the respective MCOT encompassing at least the respective maximum grant-free uplink burst length associated with the priority class index value.

Example embodiment 166. The method of Example embodiment 165, wherein for each of the priority class index values in the hierarchy, the respective MCOT associated with the priority class index value encompasses at least the respective maximum grant-free uplink burst length, a reserved/partial subframe duration and a short time gap.

Example embodiment 167. The method of Example embodiment 166, wherein for each of the priority class index values in the hierarchy, the respective MCOT associated with the priority class index value further encompasses a length of a grant-free group (GFG) feedback message.

Example embodiment 168. The method of any of Example embodiments 160 to 167, further comprising:
for at least one common GF transmission cycle, scheduling at least one ED in the GF ED group for a grant-based uplink or downlink transmission in the unlicensed spectrum, such that the grant-based uplink or downlink transmission is scheduled within a dynamic idle period at the end of the common GF transmission cycle and has an ending time before a start time of the CCA for the next common GF transmission cycle.

Example embodiment 169. The method of any of Example embodiments 160 to 168, further comprising:

transmitting a scheduling grant to an ED within the GF ED group to grant the ED T/F resources for grant-based uplink transmission within another set of T/F resources that does not overlap with the GF ED group-specific T/F resources for grant-free uplink transmission.

Example embodiment 170. The method of Example embodiment 169, wherein the scheduling grant includes information indicating the other set of T/F resources in which the grant-based uplink transmission is to be made and a type of CCA to be used to access the other set of T/F resources for grant-based uplink transmission.

Example embodiment 171. The method of Example embodiment 169 or 170, wherein the base station pre-emptively blanks a grant-based maximum channel occupancy time (MCOT) to temporarily accommodate upcoming GF transmissions from the GF ED group by instructing the GFG EDs to limit their upcoming GF transmissions to an indicated length or to use a pre-configured default length.

Example embodiment 172. The method of any of Example embodiments 126 to 137, further comprising:

multi-casting a grant-free group (GFG) common time-alignment signal for the group of EDs to use to time-align their potential GF uplink transmissions, the GFG common time-alignment signal being multi-cast by the base station to the group of EDs on T/F resources of the unlicensed spectrum sub-band following a successful listen-before talk (LBT) CCA indicating the T/F resources are available.

Example embodiment 173. The method of Example embodiment 172, wherein multi-casting a GFG common time-alignment signal comprises periodically multi-casting the GFG common time-alignment signal according to a target GF cycle periodicity.

Example embodiment 174. The method of Example embodiment 173, wherein periodically multi-casting the GFG common time-alignment signal according to a target GF cycle periodicity comprises:

after a first LBT CCA for the T/F resources of the unlicensed spectrum fails in advance of a target GF cycle period, performing a second LBT CCA within the target GF cycle period at a start time in advance of a second GFG common time-alignment point within the target GF cycle period; and in response to the second LBT CCA succeeding, multi-casting the GFG common time-alignment signal to the group of EDs to use to time-align their potential GF uplink transmissions in accordance with the second GFG common time-alignment point within the target GF cycle period.

Example embodiment 175. The method of any of Example embodiments 172 to 174, wherein the GFG common time-alignment signal comprises a GFG feedback message that includes, for each of one or more EDs in the group, an information field that includes Ack/Nack feedback related to one or more transport blocks transmitted by the ED within an earlier grant-free uplink transmission.

Example embodiment 176. The method of any of Example embodiments 126 to 175, further comprising:

receiving grant-free uplink transmissions on the GF ED group-specific T/F resources of the unlicensed spectrum from at least a subset of the EDs in the group, the grant-free uplink transmissions from different EDs in the group being at least partially separated on the GF ED group-specific T/F resources in terms of at least one of: a time domain, a frequency domain, a code domain, a power domain, and a space domain.

Example embodiment 177. The method of Example embodiment 176, wherein two or more of the grant-free uplink transmissions from the GF ED group at least partially collide on the GF ED group-specific T/F resources of the unlicensed spectrum.

Example embodiment 178. The method of Example embodiment 176 or 177, further comprising:

transmitting GF resource configuration information to configure one or more EDs of a second GF ED group for GF uplink transmission in the unlicensed spectrum, the GF resource configuration information for the second GF ED group comprising GF ED group-specific resource configuration information for the second GF ED group indicating a second set of GF ED group-specific T/F resources for GF uplink transmission, wherein the second set of GF ED group-specific T/F resources for the second GF ED group is non-overlapping with the first set of GF ED group-specific T/F resources for the first GF ED group to support contention-free GF uplink transmission across the two GF ED groups.

Example embodiment 179. The method of any of Example embodiments 176 to 178, wherein receiving the grant-free uplink transmissions comprises, for at least one of the grant-free uplink transmissions, receiving uplink control signaling at the start of the grant-free uplink transmission.

Example embodiment 180. The method of any of Example embodiments 126 to 179, further comprising:

multi-casting a group-specific grant-free group (GFG) feedback message to the group of EDs on T/F resources of the unlicensed spectrum.

Example embodiment 181. The method of Example embodiment 180, wherein the group-specific GFG feedback message is multi-cast to the group of EDs after a last grant-free uplink burst from one of the EDs in the group ends and within a maximum channel occupancy time (MCOT).

Example embodiment 182. The method of Example embodiment 181, wherein the group-specific GFG feedback message comprises, for each of one or more EDs in the group, an information field that includes Acknowledgement/Negative Acknowledgement (Ack/Nack) feedback related to one or more transport blocks transmitted by the ED within a grant-free uplink burst during the MCOT in which the GFG Ack/Nack feedback message is multi-cast and/or related to one or more transport blocks transmitted by the ED within previous grant-free uplink bursts.

Example embodiment 183. The method of any of Example embodiments 180 to 182, wherein the group-specific GFG feedback message is multi-cast to the group of EDs as part of a GFG common time-alignment message, the GFG feedback message comprising, for each of one or more EDs in the group, an information field that includes Ack/Nack feedback related to one or more transport blocks transmitted by the ED within one or more most recent grant-free uplink bursts preceding the GFG Ack/Nack feedback message.

Example embodiment 184. The method of any of Example embodiments 180 to 183, wherein the group-specific GFG feedback message comprises, for the group of EDs, at least one of: dynamic closed loop link adaptation commands; and closed loop power control commands.

Example embodiment 185. The method of any of Example embodiments 126 to 184, further comprising:

receiving, from an ED in the group of EDs on time-frequency resources of the unlicensed spectrum, an indication that the ED will be using a modulation and coding scheme (MCS) for a grant-free uplink transmission that differs from a pre-configured MCS; and decoding one or more transport blocks received in the grant-free uplink transmission from the ED based on the MCS that differs from the pre-configured MCS.

Example embodiment 186. The method of Example embodiment 185, wherein receiving the indication that the ED will be using a MCS that differs from a pre-configured MCS comprises receiving the indication via any one of:

a physical uplink control channel (PUCCH) carrying uplink control information (UCI) at the beginning of the grant-free uplink transmission;

a front-loaded pilot or demodulation reference signal (DMRS); and uplink radio resource configuration (RRC) signaling transmitted by the ED using the pre-configured MCS before starting transmission of the grant-free uplink burst using the MCS that differs from the pre-configured MCS.

Example embodiment 187. A base station comprising:
a memory storage comprising instructions; and
one or more processors in communication with the memory storage, wherein the one or more processors execute the instructions to:
transmit grant-free (GF) resource configuration information to configure one or more electronic devices (EDs) for GF uplink transmission in unlicensed spectrum, the GF resource configuration information comprising GF ED group-specific resource configuration information indicating GF ED group-specific time-frequency resources of the unlicensed spectrum for GF uplink transmission.

Example embodiment 188. The base station of Example embodiment 187, wherein the one or more processors execute the instructions to: transmit a GF feedback message that includes GF feedback for at least one of the one or more EDs.

Example embodiment 189. The base station of Example embodiment 187, wherein the GF resource configuration information further comprises a GF ED group-specific radio network temporary identifier (GFG-RNTI) for the one or more EDs to use to receive GFG common DCI messages from the base station.

Example embodiment 190. The base station of Example embodiment 188, wherein the GF feedback message from the base station is a GFG common feedback message.

Example embodiment 191. The base station of Example embodiment 187, wherein the one or more processors execute the instructions to transmit the GF resource configuration information at least partially via a group-specific configuration message comprising the GF ED group-specific configuration information to configure the EDs in the group for GF uplink transmission in the unlicensed spectrum.

Example embodiment 192. The base station of Example embodiment 187, wherein the one or more processors execute the instructions to transmit the GF resource configuration information at least partially via an ED-specific configuration message.

Example embodiment 193. The base station of Example embodiment 187, wherein the GF resource configuration information further comprises information indicating a type of CCA to be used for accessing the unlicensed spectrum.

Example embodiment 194. The base station of Example embodiment 187, wherein the one or more processors execute the instructions to receive, from at least one of the one or more EDs information indicating at least one priority class associated with GF uplink traffic for the ED.

Example embodiment 195. The base station of Example embodiment 194, wherein the information indicating at least one priority class is received via uplink control information (UCI) or uplink radio resource control (UL RRC) signaling.

Example embodiment 196. The base station of Example embodiment 194, wherein the information indicating at least one priority class is received from the ED as part of capability information that indicates the ED is a GF-capable device.

Example embodiment 197. The base station of Example embodiment 187, wherein the one or more processors execute the instructions to transmit the GF resource configuration information entirely via radio resource control (RRC) signaling.

Example embodiment 198. The base station of Example embodiment 187, wherein the one or more processors execute the instructions to:
transmit the GF resource configuration information in part via RRC signaling; and
transmit the GF resource configuration information in part via downlink control information (DCI) that is part of an ED-specific or a group common trigger.

Example embodiment 199. The base station of Example embodiment 187, wherein the GF resource configuration information further comprises information indicating a reference start time and a GF transmission cycle period.

Example embodiment 200. The base station of Example embodiment 187, wherein the information indicating time-frequency resources of the unlicensed spectrum for grant-free uplink transmission comprises information indicating one or more resource blocks (RBs) or a sequence of frequency interlaces within the time-frequency resources of the unlicensed spectrum for grant-free uplink transmission.

Example embodiment 201. The base station of Example embodiment 199, wherein the GF resource configuration information further comprises information indicating a plurality of potential GF occasions within a GF transmission cycle at which the one or more EDs could potentially start a GF uplink transmission.

Example embodiment 202. The base station of Example embodiment 201, wherein the plurality of potential GF occasions includes a first occasion within the GF transmission cycle period, at least one subsequent occasion within the GF transmission cycle period being associated with a different set of GF parameters than the first occasion.

Example embodiment 203. The base station of Example embodiment 202, wherein the different sets of GF parameters associated with different occasions within the GF transmission cycle period differ in terms of one or more of: transport format, number of repetitions, frequency interlace pattern, and frequency hopping pattern.

Example embodiment 204. The base station of Example embodiment 201, wherein the one or more processors execute the instructions to:
for a given ED, in response to failing to detect a GF uplink transmission from the ED for the indicated GF occasion, monitor for a GF uplink transmission from the ED for another potential GF occasion within the GF transmission cycle period.

Example embodiment 205. The base station of Example embodiment 199, wherein the reference start time is an absolute start time expressed as the index of an alignment time unit (ATU).

Example embodiment 206. The base station of Example embodiment 205, wherein the ATU is the index of an Orthogonal Frequency Division Multiplexing (OFDM) symbol, the slot number, the subframe number or the system frame number (SFN).

Example embodiment 207. The base station of Example embodiment 199, wherein the reference start time is a time offset relative to radio resource control (RRC) signaling carrying at least part of the GF resource configuration information.

Example embodiment 208. The base station of Example embodiment 199, wherein the reference start time is a time offset relative to downlink control information (DCI) carrying at least part of the GF resource configuration information.

Example embodiment 209. The base station of Example embodiment 199, wherein the reference start time is determined based on the GF transmission cycle period and time synchronization information.

Example embodiment 210. The base station of Example embodiment 209, wherein the time synchronization information is a current timer value of any one of: system frame number; subframe number; or slot number.

Example embodiment 211. The base station of Example embodiment 210, wherein the reference start time is set to Current Timer if Current Timer satisfies the formulae, Current Timer mod GF Cycle Period=q, where Current Timer is the current timer value, GF Cycle Period and q are expressed as integer numbers of the same time unit as Current Timer, and q=0, 1, . . . , GF Cycle Period-1 is a configurable constant offset that is provided as part of the GF resource configuration information.

Example embodiment 212. The base station of Example embodiment 211, wherein the configurable constant offset, q, is a parameter specific to the GF ED group to which the one or more GF EDs belong for the alignment of a group common GF transmission cycle.

Example embodiment 213. The base station of Example embodiment 187, wherein the one or more processors execute the instructions to transmit the GF ED group-specific configuration information via at least one of: ED-specific Radio Resource Control (RRC) signaling; and a group common Physical Downlink Control Channel (PDCCH) using a grant-free ED group identifier associated with the group of EDs to identify group common Downlink Control Information (DCI) intended for the group of EDs.

Example embodiment 214. The base station of Example embodiment 187, wherein the GF ED group-specific resource configuration information further comprises an indication of one or more occupational bandwidth-compliant (OCB-compliant) frequency hopping patterns to be used by one or more EDs in the group for grant-free uplink transmission within the T/F resources.

Example embodiment 215. The base station of Example embodiment 214, wherein one or more of the OCB-compliant frequency hopping patterns comprises at least one of:
a sequence of frequency interlaces within the T/F resources;
a sequence of unlicensed channels to occupy within the T/F resources; and
a combination of i) and ii).

Example embodiment 216. The base station of Example embodiment 214, wherein the one or more OCB-compliant frequency hopping patterns have a sequence length that depends on the number of GF repetitions per transport block.

Example embodiment 217. The base station of Example embodiment 214, wherein the indication of the T/F resources for the group of EDs to use for grant-free uplink transmission comprises a common seed value for the ED to use with a common random number generator to generate a group common random index of an OCB-compliant frequency interlace or unlicensed channel.

Example embodiment 218. The base station of Example embodiment 187, wherein the GF ED group-specific resource configuration information further comprises an indication of an ED-specific field format for a grant-free group (GFG) common downlink control information (DCI) message.

Example embodiment 219. The base station of Example embodiment 208, wherein the GFG common DCI message includes a field to solicit a GF uplink transmission.

Example embodiment 220. The base station of Example embodiment 187, wherein the base station transmits a GFG configuration message that includes the GF ED group-specific resource configuration information after regaining time synchronization with at least one ED in the GF ED group.

Example embodiment 221. The base station of Example embodiment 199, wherein the one or more processors execute the instructions to receive GF uplink transmissions over the unlicensed spectrum from the one or more EDs configured in accordance with the GF resource configuration information, wherein the GF uplink transmissions are aligned to a common GF transmission cycle defined by the common GF transmission cycle reference start time and the common GF transmission cycle period.

Example embodiment 222. The base station of Example embodiment 221, wherein the information indicating a common GF transmission cycle reference start time comprises information indicating a timing offset from an end of the transmission of a message containing the GF ED group-specific resource configuration information.

Example embodiment 223. The base station of Example embodiment 221, wherein the GF ED group-specific resource configuration information further comprises:
information indicating a grant-free frame structure to be used by the group of EDs for grant-free uplink transmission in the unlicensed spectrum.

Example embodiment 224. The base station of Example embodiment 223, wherein:
the grant-free frame structure is one of a plurality of pre-determined grant-free frame structures that are each associated with a respective grant-free frame structure index value; and
the information indicating the grant-free frame structure includes information indicating the respective grant-free frame structure index value associated with the grant-free frame structure.

Example embodiment 225. The base station of Example embodiment 221, wherein the GF ED group-specific resource configuration information comprise information indicating a priority class index value associated with grant-free uplink traffic for the GF ED group, the priority class index value being one priority class index value of a hierarchy of priority class index values, each priority class index value in the hierarchy being associated with a respective GF transmission cycle period and a respective maximum grant-free uplink burst length.

Example embodiment 226. The base station of Example embodiment 225, wherein, for each of at least a subset of the priority class index values in the hierarchy, the respective GF transmission cycle period associated with the priority class index value exceeds a respective maximum channel occupancy time (MCOT) associated with the priority class index value such that a respective minimum idle period between the end of the respective MCOT and the end of the respective GF transmission cycle period is at least 5% of the length of the respective MCOT, the respective MCOT encompassing at least the respective maximum grant-free uplink burst length associated with the priority class index value.

Example embodiment 227. The base station of Example embodiment 226, wherein for each of the priority class index values in the hierarchy, the respective MCOT associated with the priority class index value encompasses at least the respective maximum grant-free uplink burst length, a reserved/partial subframe duration and a short time gap.

Example embodiment 228. The base station of Example embodiment 227, wherein for each of the priority class index values in the hierarchy, the respective MCOT associated with the priority class index value further encompasses a length of a grant-free group (GFG) feedback message.

Example embodiment 229. The base station of Example embodiment 221, wherein the one or more processors execute the instructions to:

for at least one common GF transmission cycle, schedule at least one ED in the GF ED group for a grant-based uplink or downlink transmission in the unlicensed spectrum, such that the grant-based uplink or downlink transmission is scheduled within a dynamic idle period at the end of the common GF transmission cycle and has an ending time before a start time of the CCA for the next common GF transmission cycle.

Example embodiment 230. The base station of Example embodiment 221, wherein the one or more processors execute the instructions to:

transmit a scheduling grant to an ED within the GF ED group to grant the ED T/F resources for grant-based uplink transmission within another set of T/F resources that does not overlap with the GF ED group-specific T/F resources for grant-free uplink transmission.

Example embodiment 231. The base station of Example embodiment 230, wherein the scheduling grant includes information indicating the other set of T/F resources in which the grant-based uplink transmission is to be made and a type of CCA to be used to access the other set of T/F resources for grant-based uplink transmission.

Example embodiment 232. The base station of Example embodiment 230, wherein the base station pre-emptively blanks a grant-based maximum channel occupancy time (MCOT) to temporarily accommodate upcoming GF transmissions from the GF ED group by instructing the GFG EDs to limit their upcoming GF transmissions to an indicated length or to use a pre-configured default length.

Example embodiment 233. The base station of Example embodiment 187, wherein the one or more processors execute the instructions to:

multi-cast a grant-free group (GFG) common time-alignment signal for the group of EDs to use to time-align their potential GF uplink transmissions, the GFG common time-alignment signal being multi-cast by the base station to the group of EDs on T/F resources of the unlicensed spectrum sub-band following a successful listen-before talk (LBT) CCA indicating the T/F resources are available.

Example embodiment 234. The base station of Example embodiment 233, wherein the one or more processors execute the instructions to periodically multi-cast the GFG common time-alignment signal according to a target GF cycle periodicity.

Example embodiment 235. The base station of Example embodiment 234, wherein the one or more processors execute the instructions to:

after a first LBT CCA for the T/F resources of the unlicensed spectrum fails in advance of a target GF cycle period, perform a second LBT CCA within the target GF cycle period at a start time in advance of a second GFG common time-alignment point within the target GF cycle period; and in response to the second LBT CCA succeeding, multi-cast the GFG common time-alignment signal to the group of EDs to use to time-align their potential GF uplink transmissions in accordance with the second GFG common time-alignment point within the target GF cycle period.

Example embodiment 236. The base station of Example embodiment 233, wherein the GFG common time-alignment signal comprises a GFG feedback message that includes, for each of one or more EDs in the group, an information field that includes Ack/Nack feedback related to one or more transport blocks transmitted by the ED within an earlier grant-free uplink transmission.

Example embodiment 237. The base station of Example embodiment 187, wherein the one or more processors execute the instructions to:

receive grant-free uplink transmissions on the GF ED group-specific T/F resources of the unlicensed spectrum from at least a subset of the EDs in the group, the grant-free uplink transmissions from different EDs in the group being at least partially separated on the GF ED group-specific T/F resources in terms of at least one of: a time domain, a frequency domain, a code domain, a power domain, and a space domain.

Example embodiment 238. The base station of Example embodiment 237, wherein two or more of the grant-free uplink transmissions from the GF ED group at least partially collide on the GF ED group-specific T/F resources of the unlicensed spectrum.

Example embodiment 239. The base station of Example embodiment 237, wherein the one or more processors execute the instructions to:

transmit GF resource configuration information to configure one or more EDs of a second GF ED group for GF uplink transmission in the unlicensed spectrum, the GF resource configuration information for the second GF ED group comprising GF ED group-specific resource configuration information for the second GF ED group indicating a second set of GF ED group-specific T/F resources for GF uplink transmission, wherein the second set of GF ED group-specific T/F resources for the second GF ED group is non-overlapping with the first set of GF ED group-specific T/F resources for the first GF ED group to support contention-free GF uplink transmission across the two GF ED groups.

Example embodiment 240. The base station of Example embodiment 237, wherein the one or more processors execute the instructions to receive uplink control signaling at the start of at least one of the grant-free uplink transmissions.

Example embodiment 241. The base station of Example embodiment 187, wherein the one or more processors execute the instructions to:

multi-cast a group-specific grant-free group (GFG) feedback message to the group of EDs on T/F resources of the unlicensed spectrum.

Example embodiment 242. The base station of Example embodiment 241, wherein the group-specific GFG feedback message is multi-cast to the group of EDs after a last grant-free uplink burst from one of the EDs in the group ends and within a maximum channel occupancy time (MCOT).

Example embodiment 243. The base station of Example embodiment 242, wherein the group-specific GFG feedback message comprises, for each of one or more EDs in the group, an information field that includes Acknowledgement/Negative Acknowledgement (Ack/Nack) feedback related to one or more transport blocks transmitted by the ED within a grant-free uplink burst during the MCOT in which the GFG Ack/Nack feedback message is multi-cast and/or related to one or more transport blocks transmitted by the ED within previous grant-free uplink bursts.

Example embodiment 244. The base station of Example embodiment 241, wherein the group-specific GFG feedback message is multi-cast to the group of EDs as part of a GFG common time-alignment message, the GFG feedback message comprising, for each of one or more EDs in the group, an information field that includes Ack/Nack feedback related to one or more transport blocks transmitted by the ED within one or more most recent grant-free uplink bursts preceding the GFG Ack/Nack feedback message.

Example embodiment 245. The base station of Example embodiment 236, wherein the group-specific GFG feedback message comprises, for the group of EDs, at least one of: dynamic closed loop link adaptation commands; and closed loop power control commands.

Example embodiment 246. The base station of Example embodiment 187, wherein the one or more processors execute the instructions to:
receive, from an ED in the group of EDs on time-frequency resources of the unlicensed spectrum, an indication that the ED will be using a modulation and coding scheme (MCS) for a grant-free uplink transmission that differs from a pre-configured MCS; and
decode one or more transport blocks received in the grant-free uplink transmission from the ED based on the MCS that differs from the pre-configured MCS.

Example embodiment 247. The base station of Example embodiment 246, wherein the one or more processors execute the instructions to receive the indication via any one of:
a physical uplink control channel (PUCCH) carrying uplink control information (UCI) at the beginning of the grant-free uplink transmission;
a front-loaded pilot or demodulation reference signal (DMRS); and
uplink radio resource configuration (RRC) signaling transmitted by the ED using the pre-configured MCS before starting transmission of the grant-free uplink burst using the MCS that differs from the pre-configured MCS.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to NR and LTE terminology. However, the embodiments disclosed herein are not in any way limited to NR or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for communicating in a wireless communication network, the method comprising:
receiving, by an electronic device (ED), configuration information from a base station, the configuration information specifying parameters including at least a transmission cycle period for semi-static access of at least one channel of an unlicensed spectrum; and
transmitting, by the ED, one or more uplink transmissions over the at least one channel of the unlicensed spectrum in accordance with the transmission cycle period specified by the configuration information and a reference start time, wherein the ED determines the reference start time based on the transmission cycle period and a current timer value of any one of a system frame number (SFN), subframe number, or slot number.

2. The method of claim 1, wherein the configuration information further specifies a channel occupancy time (COT) duration limit, and wherein the transmitting the one or more uplink transmissions comprises:
transmitting, by the ED, the one or more uplink transmissions further in accordance with the COT duration limit.

3. The method of claim 1, wherein the reference start time is configured by the configuration information.

4. The method of claim 1, wherein the configuration information is received via a common configuration message.

5. The method of claim 1, wherein the configuration information is received via an ED-specific configuration message.

6. The method of claim 1, wherein all of the parameters specified by the configuration information are received via radio resource control (RRC) signaling.

7. The method of claim 1, wherein determination of the reference start time by the ED is further based on an offset parameter that is further specified by the configuration information, wherein the offset parameter is a value from 0 to (the transmission cycle period—1) in units of OFDM symbols, slots, or subframes.

8. The method of claim 1, wherein the configuration information further indicates whether time-frequency resources coinciding with a COT duration limit are permitted to be shared with downlink transmissions from the base station.

9. The method of claim 1, wherein the ED is further configured with grant-free time-frequency resource configuration information indicating a plurality of grant-free transmission opportunities within the transmission cycle period.

10. The method of claim 9, wherein the grant-free transmission opportunities include at least two grant-free transmission opportunities associated with different sets of parameters for accessing the at least one channel of the unlicensed spectrum.

11. The method of claim 9, wherein a grant-free uplink transmission includes uplink control information that is carried at a beginning of the grant-free uplink transmission.

12. The method of claim 11, wherein the uplink control information includes at least one channel access priority class (CAPC) parameter.

13. An electronic device (ED) comprising:
   at least one processor; and
   a non-transitory computer readable storage medium storing programming for execution by the at least one processor, the programming including instructions that cause the ED to:
      receive configuration information from a base station, the configuration information specifying parameters including at least a transmission cycle period for semi-static access of at least one channel of an unlicensed spectrum; and
      transmit one or more uplink transmissions over the at least one channel of the unlicensed spectrum in accordance with the transmission cycle period specified by the configuration information and a reference start time, wherein the ED determines the reference start time based on the transmission cycle period and a current timer value of any one of a system frame number (SFN), subframe number, or slot number.

14. The ED of claim 13, wherein the configuration information further specifies a channel occupancy time (COT) duration limit, and wherein the instructions that cause the ED to transmit the one or more uplink transmissions comprise instructions that cause the ED to:
   transmit the one or more uplink transmissions further in accordance with the COT duration limit.

15. The ED of claim 13, wherein the reference start time is configured by the configuration information.

16. The ED of claim 13, wherein the configuration information is received via a common configuration message.

17. The ED of claim 13, wherein the configuration information is received via an ED-specific configuration message.

18. The ED of claim 13, wherein all of the parameters specified by the configuration information are received via radio resource control (RRC) signaling.

19. A non-transitory computer readable storage medium storing instructions that, when executed by an apparatus, cause the apparatus to:
   receive configuration information from a base station, the configuration information specifying parameters including at least a transmission cycle period for semi-static access of at least one channel of an unlicensed spectrum; and
   transmit one or more uplink transmissions over the at least one channel of the unlicensed spectrum in accordance with the transmission cycle period specified by the configuration information and a reference start time, wherein the apparatus determines the reference start time based on the transmission cycle period and a current timer value of any one of a system frame number (SFN), subframe number, or slot number.

* * * * *